United States Patent
Ratnam et al.

(10) Patent No.: US 11,811,563 B2
(45) Date of Patent: Nov. 7, 2023

(54) ANALOG CHANNEL ESTIMATION TECHNIQUES FOR BEAMFORMER DESIGN IN MASSIVE MIMO SYSTEMS

(71) Applicant: UNIVERSITY OF SOUTHERN CALIFORNIA, Los Angeles, CA (US)

(72) Inventors: Vishnu Vardhan Ratnam, Los Angeles, CA (US); Andreas F. Molisch, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/045,214

(22) PCT Filed: Apr. 3, 2019

(86) PCT No.: PCT/US2019/025587
§ 371 (c)(1),
(2) Date: Oct. 5, 2020

(87) PCT Pub. No.: WO2019/195426
PCT Pub. Date: Oct. 10, 2019

(65) Prior Publication Data
US 2021/0167996 A1    Jun. 3, 2021

Related U.S. Application Data

(60) Provisional application No. 62/652,056, filed on Apr. 3, 2018.

(51) Int. Cl.
*H04L 25/02* (2006.01)
*H04B 7/0452* (2017.01)
*H04L 27/26* (2006.01)

(52) U.S. Cl.
CPC ....... *H04L 25/0204* (2013.01); *H04B 7/0452* (2013.01); *H04L 27/2649* (2013.01)

(58) Field of Classification Search
CPC .................................................. H04L 25/0204
(Continued)

(56) References Cited

U.S. PATENT DOCUMENTS 9,071,474 B1 *   6/2015   Zhang ................... H04L 1/0045
2003/0071925 A1 *   4/2003   Kanno ................... H03D 7/165
                                                                348/726

(Continued)

FOREIGN PATENT DOCUMENTS

KR   10-2013-0119788 A   11/2013
WO   2017/004546 A1   1/2017

OTHER PUBLICATIONS

Bogale, T.E. et al., "Hybrid Analog-Digital Channel Estimation and Beamforming: Training-Throughput Tradeoff," arXiv:1509.05091v2, (cs.IT), Oct. 9, 2015 [https://arxiv.org/pdf/1509.05091.pdf, 41 pgs.

(Continued)

*Primary Examiner* — Lihong Yu
(74) *Attorney, Agent, or Firm* — Brooks Kushman P.C.

(57) ABSTRACT

Novel channel estimation techniques that can be performed solely in the analog domain are provided. The techniques use continuous analog channel estimation (CACE), periodic analog channel estimation (PACE), and multiantenna frequency shift reference (MAFSR). These techniques provide sufficient channel knowledge to enable analog beamforming at the receiver while significantly reducing the estimation overhead. These schemes involve transmission of a reference tone of a known frequency, either continuously along with the data (CACE, MAFSR) or in a separate phase from data (PACE). Analysis of the methods show that sufficient receiver beamforming gain can be achieved in sparse chan- (Continued)

nels by building the beamformer using just the amplitude and phase estimates of the reference tone from each receiver antenna.

41 Claims, 17 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2004/0029543 A1* | 2/2004 | Steele | H04B 1/7101 |
| | | | 455/137 |
| 2004/0121753 A1 | 6/2004 | Sugar et al. | |
| 2004/0201415 A1* | 10/2004 | Amano | H03D 3/001 |
| | | | 329/315 |
| 2008/0004078 A1 | 1/2008 | Barratt et al. | |
| 2008/0233879 A1* | 9/2008 | Sasaki | H04L 27/3836 |
| | | | 455/42 |
| 2016/0329949 A1* | 11/2016 | Cloutier | H04B 7/0885 |
| 2017/0331604 A1* | 11/2017 | Zirwas | H04B 7/0626 |
| 2017/0338874 A1* | 11/2017 | Pratt | H04B 7/0862 |

OTHER PUBLICATIONS

International Search Report and Written Opinion dated Jul. 30, 2019 for PCT/US2019/025587, 14 pgs.

* cited by examiner

Sparse Channel

Dense stochastic channel

1-Mean: $1 - E|\int_{T_1}^{T_2} \frac{e^{j\theta(t)}}{D_2 T_{cs}} dt|$

Variance: $E[|\int_{T_1}^{T_2} \frac{e^{j\theta(t)}}{D_2 T_{cs}} dt| - e^{-\frac{Var(\theta)}{2}}]^2$ With noise suppression With narrow band pass filter

ANALOG CHANNEL ESTIMATION TECHNIQUES FOR BEAMFORMER DESIGN IN MASSIVE MIMO SYSTEMS

CROSS-REFERENCE TO RELATED APPLICATIONS

This application is the U.S. national phase of PCT Appln. No. PCT/US2019/025587 filed Apr. 3, 2019, which claims the benefit of U.S. Provisional Application No. 62/652,056 filed Apr. 3, 2018, the disclosures of which are hereby incorporated in their entirety by reference herein.

TECHNICAL FIELD

In at least one aspect, the present invention is related to transmission in multiple-input-multiple-output systems.

BACKGROUND

Massive multiple-input-multiple-output (MIMO) systems, where the transmitter (TX) and/or receiver (RX) are equipped with a large array of antenna elements, are considered a key enabler of 5G cellular technologies due to the massive beamforming and/or spatial multiplexing gains they offer. This technology is especially attractive at millimeter (mm) wave and terahertz (THz) frequencies, where the massive antenna arrays can be built with small form factors, and where the resulting beamforming gain can help compensate for the large channel attenuation. Despite the numerous benefits, full complexity massive MIMO transceivers, where each antenna has a dedicated up/down-conversion chain, are hard to implement in practice. This is due to the cost and power requirements of the up/down-conversion chains—which include expensive and power hungry circuit components such as the analog-to-digital converters (ADCs) and digital-to-analog converters. A key solution to reduce the implementation costs of massive MIMO while retaining many of its benefits is Hybrid Beamforming, wherein a massive antenna array is connected to a smaller number of up/down-conversion chains via the use of analog hardware, such as phase-shifters and switches. While being comparatively cost and power efficient, the analog hardware can focus the transmit/receive power into the dominant channel directions, thus minimizing the performance loss in comparison to full complexity transceivers. In this paper, we focus on a special case of hybrid beamforming with only one up/down-conversion chain (for the in-phase and quadrature-phase signal components each), referred to as analog beamforming.

A major challenge for analog beamforming (and also hybrid beamforming in general) is the acquisition of channel state information (CSI) required for beamforming, referred henceforth as rCSI. Such rCSI may include, for example, average channel parameters or instantaneous parameters, and is commonly obtained by transmitting known signals (pilots) at the TX and performing channel estimation (CE) at the RX at least once per rCSI coherence time—which is the duration for which the rCSI remains approximately constant. Since one down-conversion chain has to be time multiplexed across the RX antennas for CE in analog beamforming, several pilot re-transmissions are required for rCSI acquisition. As an example, exhaustive CE approaches require $O(M_{tx} M_{rx})$ pilots per rCSI coherence time, where $M_{tx}$, $M_{rx}$ are the number of TX and RX antennas, respectively and $O(\cdot)$ represents the scaling behavior in big-'oh' notation. Such a large pilot overhead may consume a significant portion of the time-frequency resources when the time for which rCSI remains constant is short, such as in vehicle-to-vehicle channels, in systems using narrow TX/RX beams, e.g., massive MIMO systems, or in channels with large carrier frequencies (high Doppler) and high blocking probabilities, e.g., at mm-wave, THz frequencies. The overhead also increases system latency and makes the initial access (IA) procedure cumbersome. As a solution, several fast CE approaches have been proposed in literature, which are discussed below assuming $M_{tx}=1$ for convenience. Side information aided CE approaches utilize spatial/temporal statistics of rCSI to reduce the pilot overhead. Compressed sensing based CE approaches exploit the sparse nature of the channel to reduce the number of pilots per coherence time up to $O[L \log(M_{rx}/L)]$, where L is the channel sparsity level. Iterative angular domain CE uses progressively narrower search beams at the RX to reduce the required pilot transmissions to $O(\log M_{rx})$.

Approaches that utilize side information to improve iterative angular domain CE or perform angle domain tracking have also been considered. Sparse ruler based approaches exploit the possible Toeplitz structure of the spatial correlation matrix to reduce pilots to $O(\sqrt{M_{rx}})$. Since the required pilots still scale with $M_{rx}$ in these approaches, they are only partially successful in reducing the CE overhead. Furthermore, since some of these approaches require side information and/or prior timing/frequency synchronization, they may not be applicable for the IA process. Some approaches also require a long rCSI coherence time that spans the pilot re-transmissions and/or are only applicable for certain antenna array configurations and channel models. Finally, to reduce the impact of the transient effects of analog hardware on CE, the multiple pilots may have to be temporally spaced apart, thus potentially increasing the overhead and latency.

The main reason for the overhead is that conventional CE approaches require processing in the digital domain, while the RX has only one down-conversion chain. Prior to the growth of digital hardware and digital processing capabilities, some legacy systems used an alternate RX beamforming approach in single path channels, that does not require digital CE. In this approach, an analog phase locked loop (PLL) is used to recover the received signal carrier at each RX antenna, and the recovered carrier is then used for down-converting the received signal at that antenna to baseband. Since the carrier and data suffer the same inter-antenna phase shift (in single path channels), the down-conversion leads to compensation of this phase shift, enabling coherent combining of the signals from each antenna (i.e., beamforming). As this approach does not involve digital processing or pilots, it shows potential in solving the high CE overhead encountered with digital CE. Since carrier recovery can also be interpreted as estimation of the channel phase at the carrier frequency using analog hardware, we shall refer to this class of techniques as analog channel estimation (ACE). The delay domain counterpart of this approach was also explored for single antenna ultra-wideband systems, referred to as transmit reference schemes. However, such legacy ACE systems were mainly proposed for space communication and hence only supported single path channels. Additionally, recovering the carrier at the RX via a PLL is difficult at the low signal-to-noise ratios (SNRs) and high frequencies encountered in mm-wave/THz systems, and leads to a high RX phase-noise, i.e., random fluctuation in the instantaneous frequency of the recovered carrier that degrades system performance.

Accordingly, there is a need for improved, cost effective ACE architectures.

SUMMARY

In at least one aspect, a MIMO system having a continuous analog channel estimation (CACE) receiver is provided. The MIMO system includes a transmitter (TX) that transmits a transmitted signal that includes a data signal combined with a predetermined reference signal. The system also includes a receiver (RX) that includes a plurality of antennas wherein each antenna receives the transmitted signal and outputs an associated received signal. The receiver further includes a baseband conversion processor that either contains an independent oscillator or recovers the transmitted reference signal including either or both of the signal amplitude and phase. Each associated received signal is then multiplied with the independent oscillator/recovered reference signal and with its quadrature component in the analog domain, resulting in processor output signals that are low-pass signals with at least partially compensated inter-antenna phase shift. The RX further may include an optional amplitude and phase compensation processor that adjusts outputs from the baseband conversion processor via analog phase shifters. The amplitude and phase compensation processor may utilize the baseband reference signal in the outputs from the baseband conversion processor as control signals to the phase-shifters, to further compensate the inter-antenna phase-shifts in the outputs from the baseband conversion processor. The RX also includes an analog adder that sums outputs signals from either the bandpass conversion processor or the optional amplitude and phase compensation processor as a summed signal output thereby emulating signal combining and beamforming without the RX applying explicit channel estimation.

In another aspect, a MIMO system having a periodic analog channel estimation (PACE) receiver is provided. The MIMO system includes a TX that transmits a transmitted signal that is a predetermined reference signal during a beamforming design phase and a data signal during a data transmission phase. The reference signal can be a reference tone with a predetermined frequency. The MIMO system also includes a RX that includes a plurality of antennas wherein each antenna receives the transmitted signal and outputs an associated received signal. The receiver also includes a phase and amplitude estimator circuit that recovers the reference signal during an a beamforming design phase and then multiplies each associated received signal during a beamforming design phase with the recovered reference signal and a quadrature component of the reference signal in the analog domain to form a plurality of in-phase-derived control signals and a plurality of quadrature-derived control signals with each antenna having an associated in-phase-derived control signal and an associated quadrature-derived control signal. The receiver also includes a plurality of variable gain phase shifters with each antenna having an associated variable gain phase-shifter wherein the associated variable gain phase shifter of each antenna receives the associated in-phase-derived (baseband) control signal and the associated quadrature-derived (baseband) control signal through which the data signal is processed during a data transmission phase. An analog adder sums outputs from the plurality of the variable gain phase shifters as a summed signal output.

In another aspect, a non-coherent MIMO system that applies a multiantenna frequency shift reference (MAFSR) receiver is provided. The MIMO system includes a transmitter (TX) that transmits a transmitted signal that includes a data signal combined with a predetermined reference signal. The reference signal can be a reference tone having a predetermined frequency. The MIMO system also includes a receiver (RX). The receiver includes a plurality of antennas wherein each antenna receives the transmitted signal and outputs an associated received signal. There receiver also includes a plurality of bandpass filters wherein each antenna is associated with a bandpass filter and each bandpass filter receives a corresponding associated received signal and outputs an associated filtered received signal. A squaring circuit squares each associated filtered received signal to form associated squared received signals, wherein each antenna is associated with a squaring circuit. The squared outputs involve, among other signals, a product between the reference signal and data signals with the inter-antenna phase shift compensated. Finally, an analog adder that adds the squared received signals from all antennas to produce a summed signal.

In another aspect, a novel transmission scheme (CACE) for low-complexity massive MIMO systems, that does not require phase-shifters or explicit CSI estimation at the RX is provided.

In another aspect, a novel transmission scheme (CACE) for low-complexity massive MIMO systems, that only requires base band phase-shifters and does not require explicit CST estimation at the RX is provided.

In another aspect, a novel transmission scheme (CACE) for low-complexity massive MIMO systems, that can mitigate the impact of oscillator phase noise.

In another aspect, an RX architecture for the CACE scheme and characterization of the achievable throughput in a wide-band channel, for a single spatial data-stream, is provided.

In still another aspect, a near-optimal power allocation for data streams and an 1A procedure for CACE is provided.

In another aspect, a novel beamforming scheme (e.g., PACE aided beamformer) that enables receive beamforming in massive MIMO systems with reduced hardware and energy cost is provided, which alleviates one or more problems of the prior art. In PACE the TX transmits a reference signal, which may be a sinusoidal tone at a known frequency, during periodic beamformer design phases. A carrier recovery circuit, such as a phase-locked loop (PLL), is used to recover the reference signal at one or a plurality of antennas. This recovered reference signal, and it's quadrature component, are then used to estimate the phase off-set and amplitude of the reference signal at each RX antenna, via a bank of 'filter, sample and hold' circuits (represented as integrators in FIG. 3). At each antenna, the phase and amplitude estimates are used to control a variable gain phase-shifter, thus updating the RX analog beam. During the data transmission phase, the received signals pass through these phase-shifters, are summed, down-converted, sampled and demodulated. As the phase and amplitude estimation is done in the analog domain, O(1) pilots are sufficient to perform RX beamforming. Additionally, the power from multiple channel multi-path components (MPCs) may be accumulated, thereby increasing the system diversity against MPC blocking. Note that by providing an option for externally controlling the inputs to the phase-shifters, the proposed architecture can also support digital CE. Furthermore, the same variable gain phase-shifts can be used for transmit beamforming on the reverse link. Multiple implementations of such single-chain PACE receivers can receive multiple data streams if they use orthogonal reference signals. While the proposed architecture is also applicable in narrow-band scenarios, the detailed discussion below shall use as example a wide-band scenario, though this should not be interpreted as a restriction of the applicability of the patented methods.

In another aspect, a novel PACE technique, that enables RX analog beamforming with low CE overhead is provided.

In another aspect, a novel PACE technique, that requires only one reference recovery circuit is provided.

In another aspect, a novel PACE technique with a reference recovery circuit that can extract the reference signal from multiple antennas is provided.

In yet another aspect, a novel PACE technique, that does not require continuous transmission of the reference signal is provided.

In still another aspect, a receiver architecture that supports the PACE technique, and characterizes the achievable system throughput in a wide-band channel is provided.

In another aspect, a non-coherent MIMO MA-FSR receiver architecture that does not require an oscillator at the receiver, and can perform beamforming with low CE overhead is provided.

In another aspect, a MIMO MA-FSR receiver architecture that suppresses transmit oscillator phase noise is provided.

In still another aspect, an MA-FSR scheme with a reference signal and data signals design is provided that ensures the product of the data signal with itself does not cause interference to the product between the reference signal and data signal at the outputs of the squaring circuits.

BRIEF DESCRIPTION OF THE DRAWINGS

In FIG. 13A, we plot $$1 - \mathbb{E}\left|\int_{T_1}^{T_2} \frac{e^{-j\theta(t)}}{D_2 T_{cs}} dt\right|$$

for simulations and $$1 - e^{-\frac{Var(\theta_1)}{2}}$$

for analytic approximation. We assume $A_1^{(r)}=1$, $A_5^{(r)}=0.7e^{j\pi/3}$, $A_{15}^{(r)}=0.5e^{-j\pi/3}$ and the remaining parameters are from Table 1.

Figure 14A:
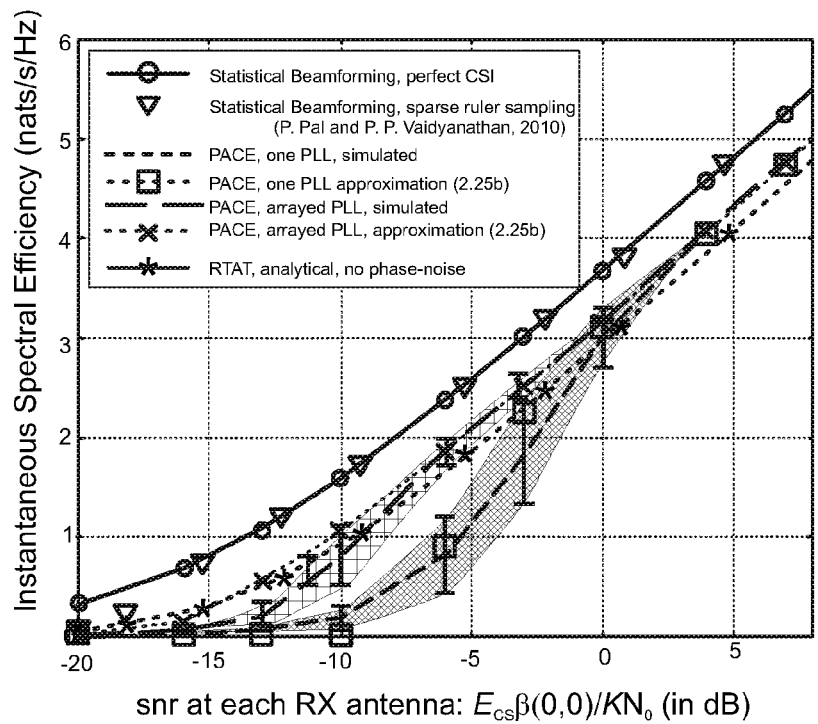
Figure 14B:
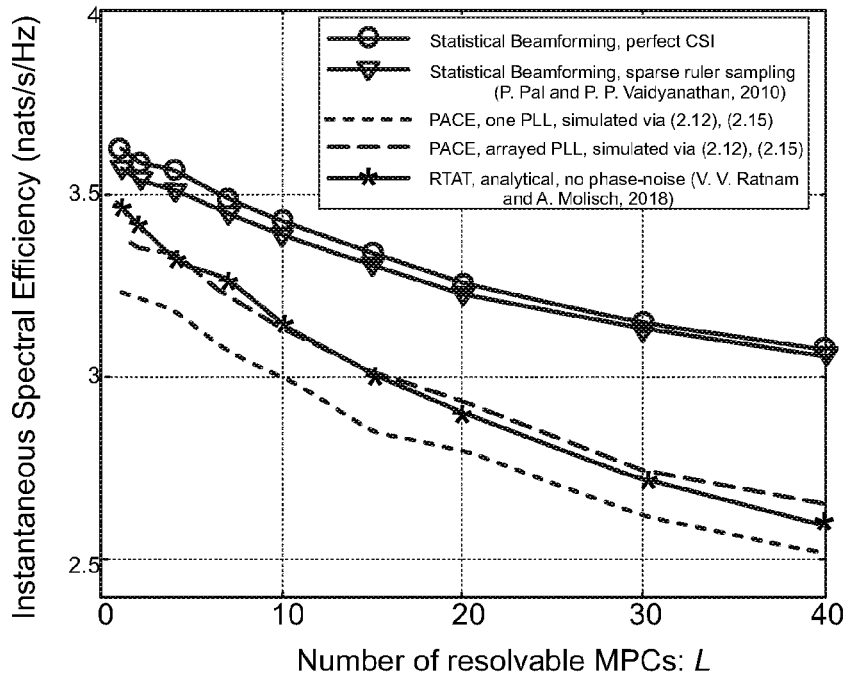

FIGS. 14A and 14B: Comparison of iSE for PACE based beamforming and other schemes versus SNR and number of MPCs. Here $E^{(r)}=20E_{cs}/K$, $E_k^{(d)}=E_{cs}/K \forall k \in \mathcal{K}$ and the PLL parameters are from Table 1. For FIG. 14B we use $$\frac{\beta(0,0)E_{cs}}{KN_0} = 1.$$

Figure 15:
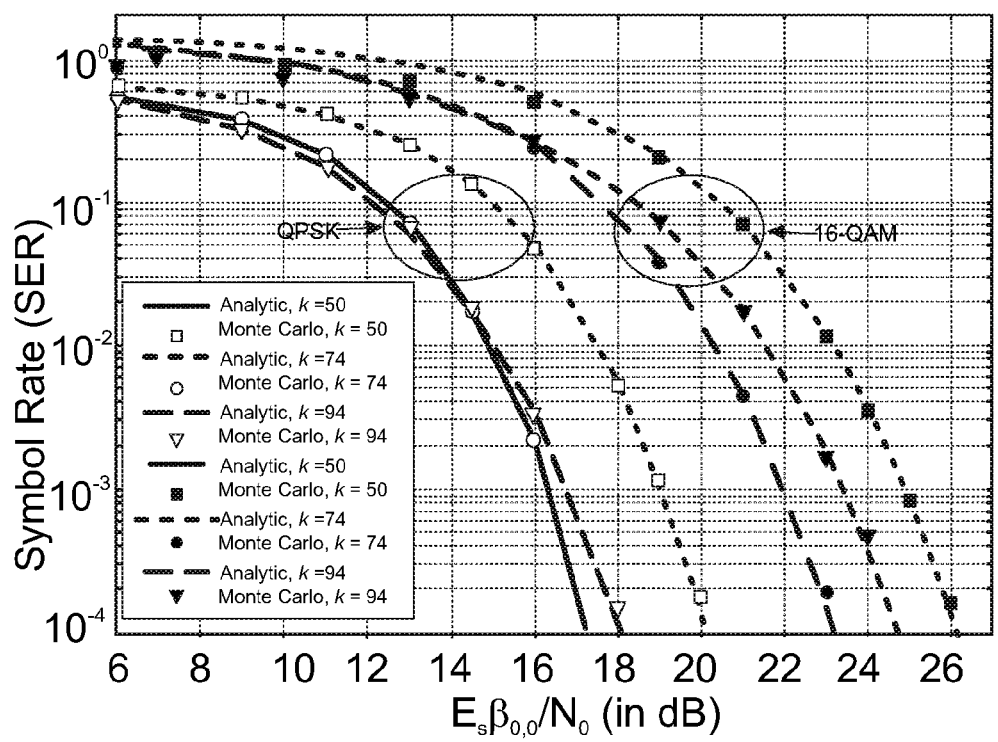

FIG. 15: SER for data streams k=50,74,94 of an MA-FSR RX with QAM modulation (K=50, $E_r=E_s/2$, $E_d^{(k)}=E_s/(2|\mathcal{K}|)$, K=50, g=5).

Figure 16:
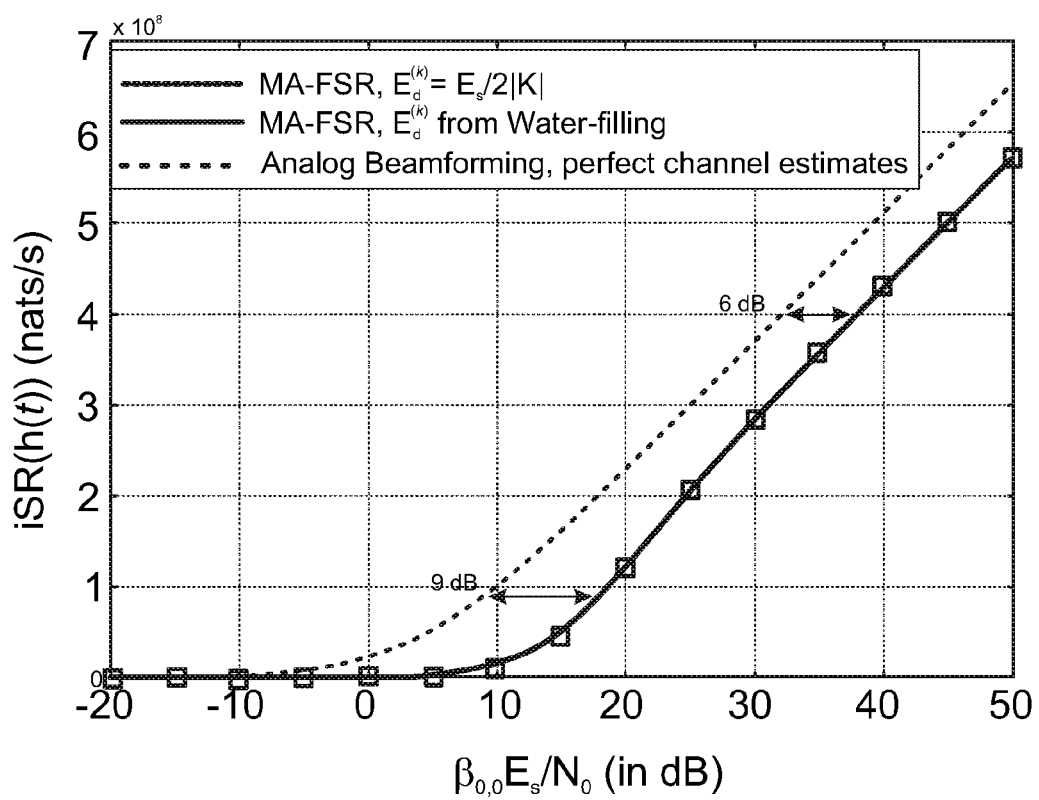

FIG. 16: Comparison of the iSR (without channel estimation overhead) of MA-FSR and analog beamforming (a) For MA-FSR, $E_r=E_s/2$, K=128 and g=5 (b) For analog beamforming, we only use the subcarriers $\{0, \ldots, K-g-1\}$.

Figure 17A:
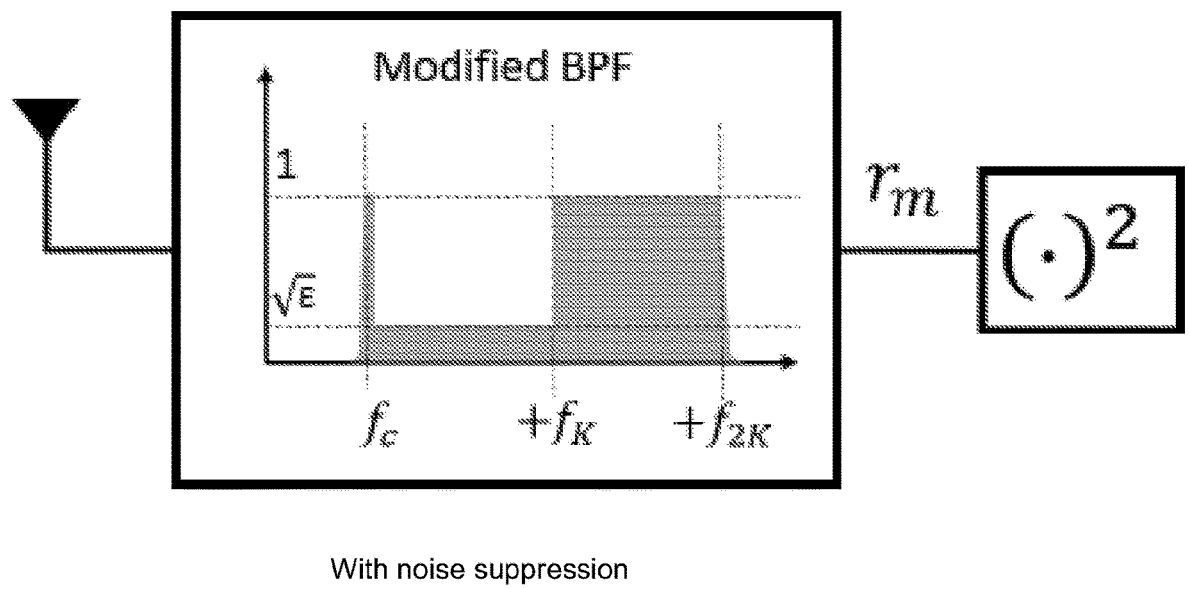
Figure 17B:
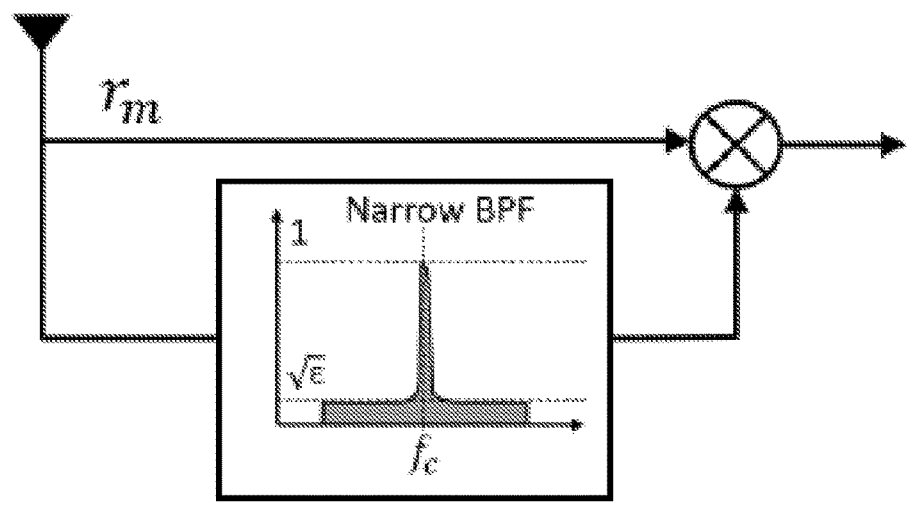

FIGS. 17A and 17B: MA-FSR designs with improved performance. A) with noise suppression. B) with narrow band pass filter.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Abbreviations

"ACE" means analog channel estimation.
"aCSI" means average channel state information.
"ADC" means analog-to-digital converters.
"BS" means base-station.
"DAC" means digital-to-analog converters.
"IA" means initial access.
"MA-FSR" means multi-antenna frequency shift reference
"MIMO" means multiple-input-multiple-output.
"MPC" means multi-path components.
"OFDM" means orthogonal frequency division multiplexing.
"CACE" means continuous analog channel estimation
"PACE" means periodic analog channel estimation.
"rCSI" means required channel state information.
"RTAT" means reference tone aided transmission.
"SNR" means signal-to-noise ratio.
"TX" means transmitter.
"RX" means receiver.
"UE" means user equipment.
"aBD" mean analog beamformer design phase With reference to FIGS. 1 and 2, a MIMO system and in particular a CACE system implementing continuous analog channel estimation aided beamforming is provided. MIMO system 10 or 10' includes transmitter 12 that transmits a transmitted signal that includes a data signal and a continuously transmitted reference signal. Typically, the reference signal is, but is not restricted to be, a sinusoidal reference tone having a predetermined frequency. In a refinement, transmitter 12 transmits the transmitted signal by orthogonal frequency division multiplexing. Receiver 14 includes a plurality of antennas $18^i$ where i is an integer from 1 to $M_{rx}$ the number of antennas. Each antenna $18^i$ receives the transmitted signal and outputs an associated received signal $s_{rx,i}(t)$. The baseband conversion processor 20 either contains an independent oscillator or recovers the transmitted reference signal including either or both of the signal amplitude and phase, and then multiplies each associated received signal with the independent oscillator/or the recovered reference signal and with its quadrature component in the analog domain, resulting in processor output signals. The baseband conversion processor 20 output signals are essentially lowpass signals with at least partially compensated inter-antenna phase shifts. The RX may also contain an optional amplitude and phase compensation processor 22 for phase and amplitude adjustment of the signals outputted from baseband conversion processor 20 via the use of analog phase shifters. The amplitude and phase compensation processor 22 may utilize the baseband reference signal in the outputs from the baseband conversion processor 20 as control signals to the phase-shifters, to further compensate the inter-antenna phase-shifts in the outputs from the baseband conversion processor. Analog adder 24 sums the baseband conversion processor 20's output signals or the optional amplitude and phase compensation processor 22's output signals as a summed signal output (i.e., $Re(\omega_{LPF}(t))$ and $Im(\omega_{LPF}(t))$) thereby emulating signal combining and beamforming without the receiver applying explicit channel estimation. In a refinement, analog adder 24 applies a weight sum when summing the processor output signals. Advantageously, the sparse nature of wireless channels is exploited to ensure a large beamforming gain after the summed signal output. Moreover, MIMO system 10 or 10' can suppress the phase noise of transmit and receive oscillators.

Figure 1:
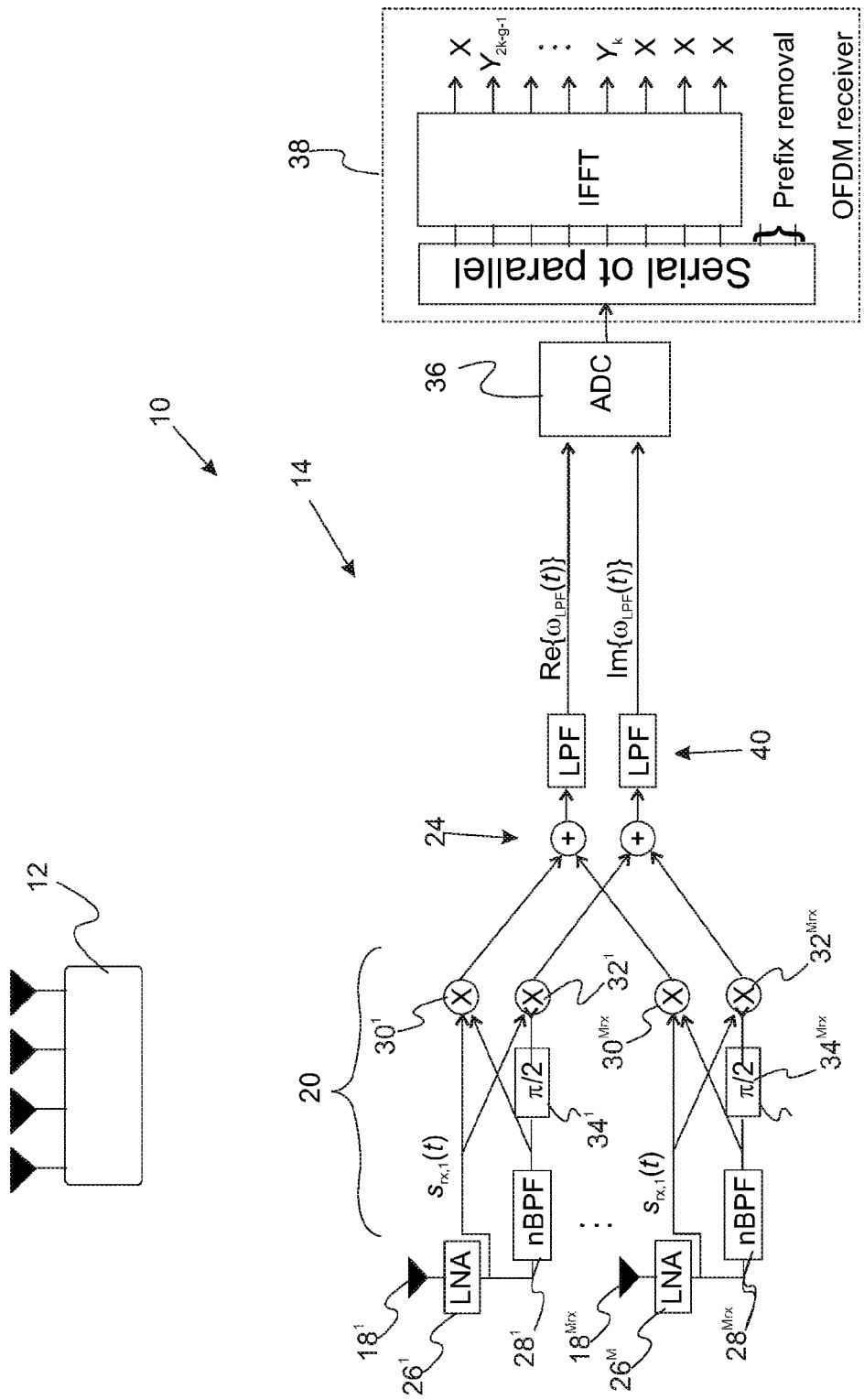
FIG. 1: Block diagram for a MIMO system with a multi-antenna CACE receiver.
Figure 2:
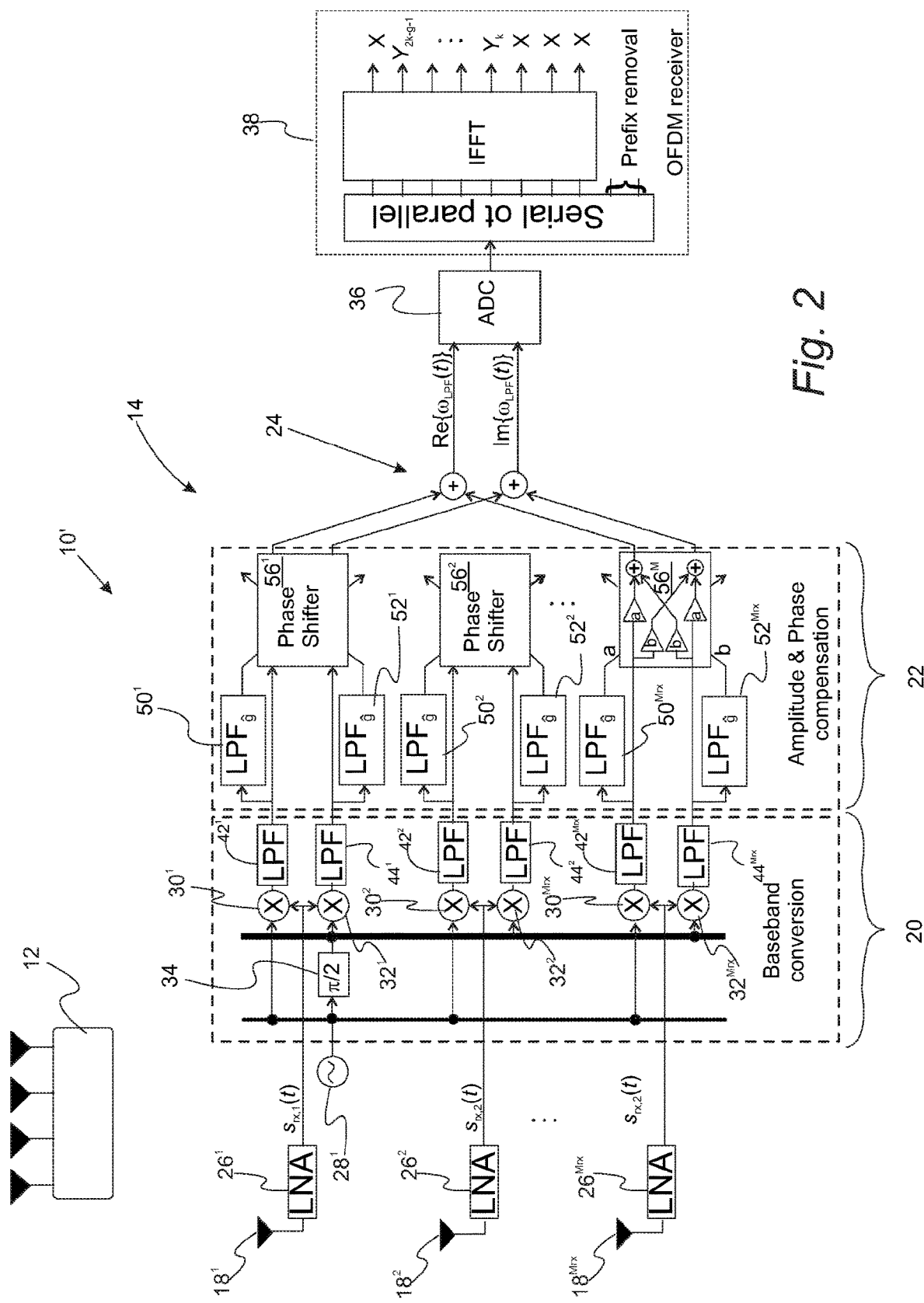
FIG. 2: Block diagram for a MIMO system with a multi-antenna CACE receiver

Still referring to FIGS. 1 and 2, in a variation, MIMO system 10 or 10' includes a plurality of low noise amplifiers 26 with each antenna $18^i$ having an associated low noise amplifier $26^i$ that outputs the associated received signal. The associated low noise amplifier $26^i$ of each antenna $18^i$ receives and amplifies associated received signal to form an amplified associated received signal $s_{rx,i}(t)$. Baseband conversion processor 20 may either include one or more reference signal recovery circuits 28 (in FIG. 1) or may include an RX local oscillator 28' (in FIG. 2). In a refinement illustrated in FIG. 1, each antenna $18^i$ has an associated reference recovery circuit $28^i$. The associated reference recovery circuit $28^i$ of each antenna $18^i$ isolates and recovers the received reference signal as an associated isolated reference signal from the associated amplified received signal. In a refinement illustrated in FIG. 1, each associated reference recovery circuit $28^i$ includes a narrow band pass filter and/or an injection locked oscillator and/or a phase locked loop followed by an optional variable gain amplifier. Sufficient frequency separation may be provided between the transmitted reference signal and data signals to enable the reference recovery. Baseband conversion processor 20 also includes a plurality of first mixers 30 with each antenna $18^i$ having an associated first mixer $30^i$. The associated first mixer $30^i$ of each antenna $18^i$ multiplies the associated isolated reference signal (in FIG. 1) or the local oscillator output 28' (in FIG. 2) with the associated received signal to produce an associated in-phase-derived output signal. Baseband conversion processor 20 also includes a plurality of second mixers $32^i$ with each antenna $18^i$ having an associated second mixer $32^i$. The associated second mixer $32^i$ of each antenna multiplies a quadrature component of the associated isolated reference signal or local oscillator output with the associated received signal to produce a quadrature-derived output signal. In a refinement, the quadrature component of the associated isolated reference signal can be formed by 90° phase shifters, illustrated as $34^i$ in FIGS. 1 and 34 in FIG. 2. Characteristically, the in-phase-derived output signal and the quadrature-derived output signal are the processor output signals.

In the variation depicted in FIG. 1, MIMO system 10 includes a low pass filter and/or downconverter 40 that receives the in-phase-derived output signal and the quadrature-derived output signal and outputs a baseband signal (which is a low pass filtered summed signal output). The baseband signal is sampled by Analog to digital converter 36 and then demodulated by OFDM demodulator 38 that demodulates the bandpass signal.

In the variation depicted in FIG. 2, low pass filters $42^i$ filter outputs from mixers $30^i$ while low pass filters $44^i$ filters outputs from mixers $32^i$ prior to signals being provided to amplitude and phase compensation 22. Filters $42^i$ and filters $44^i$ extract the baseband signal and filter out noise from the associated in-phase-derived output signals and the associated quadrature-derived output signals from the mixer outputs $30^i$ and $32^i$. In particular, the amplitude and phase compensation processor includes these lowpass filters to filter the in-phase and quadrature output signals from a baseband processor to generate the in-phase derived and quadrature-derived control signals to be used for the associated phase shifters. Amplitude and phase compensation circuit 22 provides phase and amplitude adjustment of the plurality of in-phase-derived output signals and the plurality of quadrature-derived output signals from baseband conversion processor 20. The amplitude and phase compensation circuit 22 involves a low pass filter $50^i$ at each antenna i, that receives an in-phase-derived output signal and outputs an in-phase-derived control signal. Similarly, low pass filter $52^i$ receives a quadrature-derived output signal and outputs a quadrature-derived control signal. These control signals correspond to the baseband reference signals in the baseband outputs from filters $42^i$ and $44^i$. Amplitude and phase compensation 22 also includes a plurality of variable gain phase-shifters 56 with each antenna $18^i$ having an associated variable gain phase-shifter $56^i$. The associated variable gain phase-shifter $56^i$ of each antenna $18^i$ receives from filters $50^i$ and $52^i$ the associated in-phase-derived control signal and the associated quadrature-derived control signal, through which the data signal is processed during a data transmission phase. Analog adder 24 sums outputs from the plurality of the variable gain phase-shifters as a summed signal output (i.e., baseband signal with $\text{Re}(\omega_{LPF}(t))$ and $\text{Im}(\omega_{LPF}(t))$).

Figure 3:
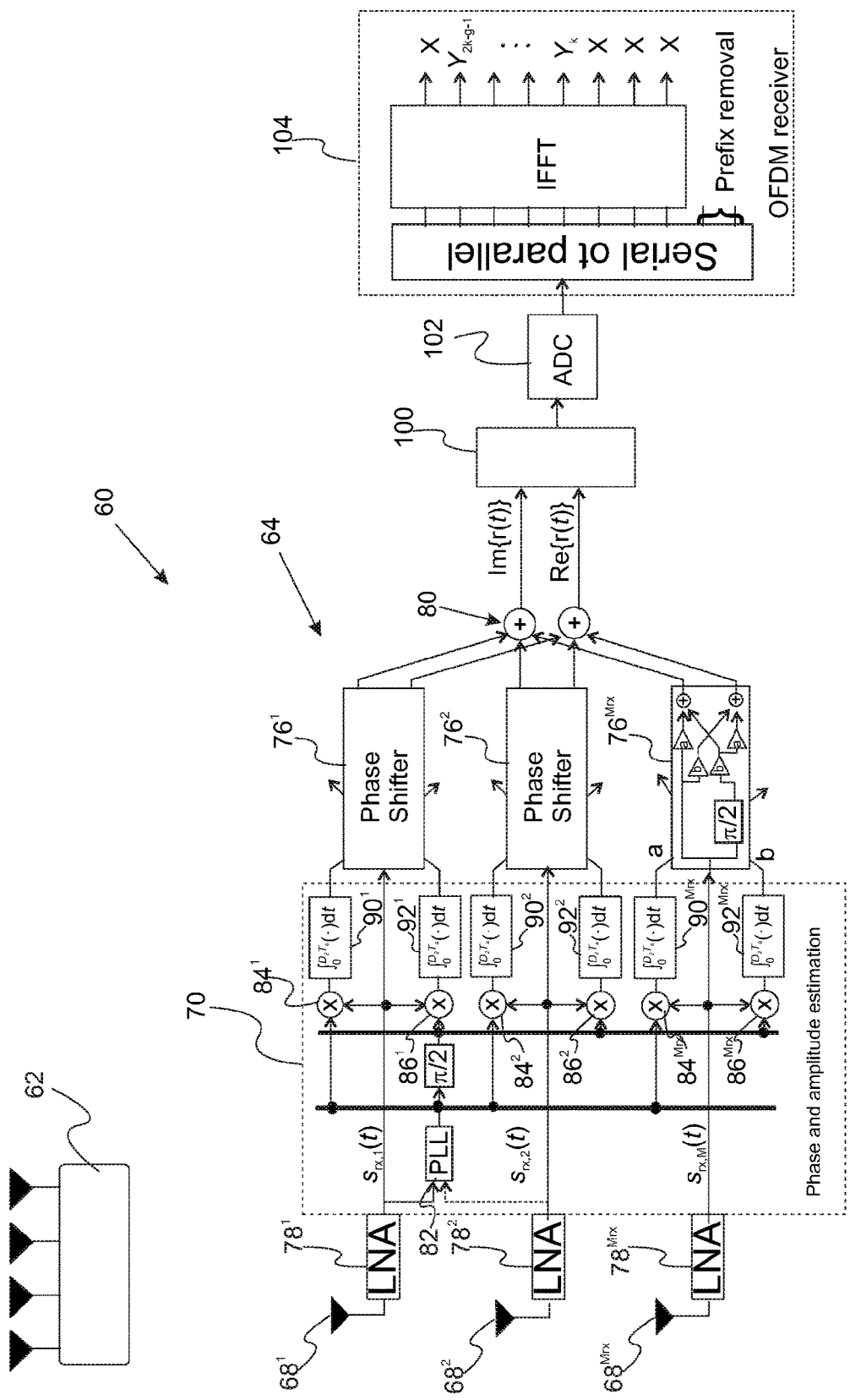
FIG. 3: Block diagram for a MIMO system with a multi-antenna PACE receiver.

With reference to FIG. 3, a schematic illustration of a system a MIMO system implementing periodic analog channel estimation (PACE) aided beamforming is provided. MIMO system 60 includes transmitter 62 that transmits a transmitted signal that includes a data signal during a data transmission phase and includes a reference signal during the beamformer design phase. Typically, the reference signal is, but is not restricted to be, a sinusoidal tone having a predetermined frequency. Moreover, this system does not require continuous transmission of the reference signal. In a refinement, transmitter 62 transmits the transmitted signal by orthogonal frequency division multiplexing. Receiver 64 includes a plurality of antennas $68^i$ where i is an integer from 1 to $M_{rx}$ the number of antennas. Each antenna $68^i$ receives the transmitted signal and outputs an associated received signal. Phase and amplitude estimator 70 recovers the reference signal during a beamformer design phase and then multiplies each associated received signal with the recovered reference tone and a quadrature component of the reference tone in the analog domain to form a plurality of in-phase-derived baseband control signals and a plurality of quadrature-derived baseband control signals with each antenna having an associated in-phase-derived control signal and an associated quadrature-derived control signal. Receiver 64 also includes a plurality of variable gain phase-shifters 76 with each antenna $68^i$ having an associated variable gain phase-shifter $76^i$. The associated gain phase-shifter $76^i$ of each antenna $68^i$ receives the associated in-phase-derived control signal and the associated quadrature-derived control signal through which the data signal is processed during a data transmission phase. An analog adder 80 sums outputs from the plurality of the variable gain phase-shifters as a summed signal output. In a refinement, analog adder 80 applies a weight sum when summing the processor output signals. Advantageously, the sparse nature of wireless channels is exploited to ensure a large beamforming gain after the summed signal output.

Still referring to FIG. 3, in a variation, MIMO system 60 includes a plurality of low noise amplifiers 78 with each antenna $68^i$ having an associated low noise amplifier $78^i$. The associated low noise amplifier $78^i$ of each antenna $68^i$ receives and amplifies associated received signal to form an amplified associated received signal.

Still referring to FIG. 3, in a variation, the phase and amplitude estimator 70 includes a reference tone recovery circuit 82 that recovers and isolates the reference signal as an isolated reference signal from the associated received signal of a single antenna (e.g., the first antenna $68^i$) during a beamformer design phase. In another variant, the reference recovery circuit 82 may recover the isolated reference signal from received signals from a plurality of antennas (see FIG. 4). In a refinement, reference recovery circuit 82 includes a narrow band pass filter and/or an injection locked oscillator and/or a phase locked loop followed by an optional variable gain amplifier. In the example depicted in FIG. 3, the reference tone recovery circuit 82 is a phase locked loop. The phase and amplitude estimator 70 also includes a plurality of first mixers 84 with each antenna having an associated first mixer $84^i$. The associated first mixer $84^i$ of each antenna multiplies the isolated reference tone with the associated received signal $s_{rx,i}(t)$ to produce an associated in-phase-derived output signal. The phase and amplitude estimator 70 also includes a plurality of second mixers 86 with each antenna having an associated second mixer $86^i$. The associated second mixer $86^i$ of each antenna $68^i$ multiplies a quadrature component of the isolated reference signal with the associated received signal $s_{rx,i}(t)$ to produce an associated quadrature-derived output signal. The phase and amplitude estimator 70 also includes plurality of first 'filter, sample and hold' circuits 90 with each antenna having an associated first filter, sample and hold circuit $90^i$. The associated first filter, sample and hold circuit $90^i$ of each antenna $68^i$ receives the associated in-phase-derived output signal and outputs the associated in-phase-derived control signal for phase shifter $76^i$. The phase and amplitude estimator 70 also has a plurality of second 'filter, sample and hold' circuits with each antenna having an associated second filter, sample and hold circuit $92^i$. The associated second filter, sample and hold circuit $92^i$ of each antenna $68^i$ receives the associated quadrature-derived output signal and outputs the associated quadrature-derived control signal. The filter sample and hold circuits, low pass filter the outputs from mixers $84^i$ and $86^i$, and sample the corresponding filtered outputs. In one variant, such filter, sample and hold circuits can be implemented by a low pass filter followed by a low sampling rate ADC. In another variant, the filter, sample and hold circuits can be implemented by an integrate and hold circuit. The data signals received at each antenna $68^i$ during the data transmission phase are phase shifted by the phase shifters $76^i$, whose control signals are determined by the filter, sample and hold circuit $90^i$ and $92^i$ outputs from the preceding beamformer design phase. Advantageously, the system of FIG. 3 can perform receive beamforming without digital channel estimation.

Figure 4:
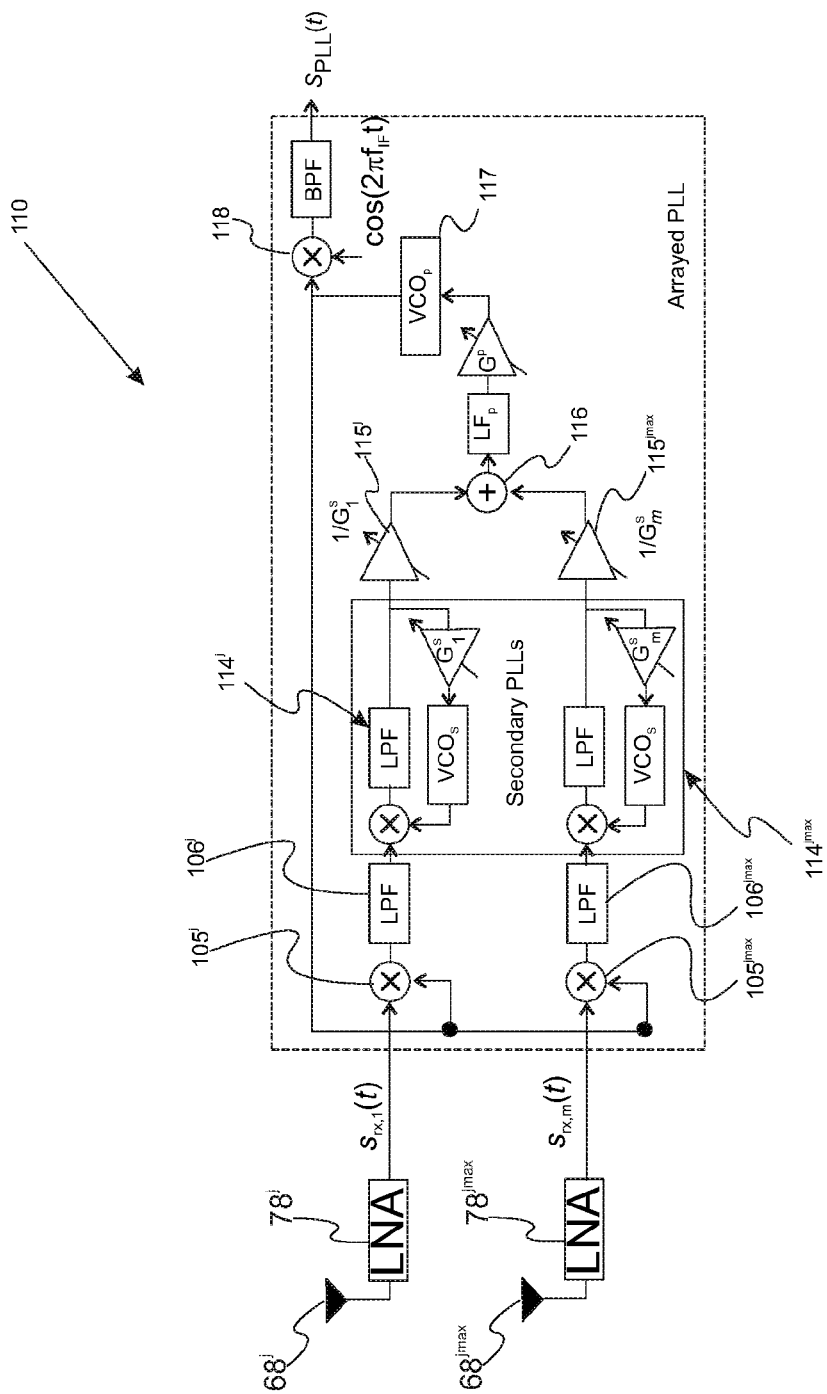
FIG. 4: Block diagram of weighted carrier arraying for reference tone recovery.

In a refinement, the reference signal can be recovered from one antenna or a plurality of antennas. FIG. 4 depicts a weighted carrier array subsystem 110 for reference tone recovery from a subset of the plurality of antennas. Each antenna of the subset is designated by $68^j$ where j is a label for the antennas in the subset. Subsystem 110 includes a plurality of first mixers 105, with each antenna $68^j$ connected to subsystem 110 having an associated first mixer $105^j$. Subsystem 110 also includes a primary voltage controlled oscillator (VCO) 117, with a nominal oscillation frequency that may be same or different from the reference signal frequency. The first mixer $105^j$ at antenna $68^j$ multiplies the received signals from antenna $68^j$ with the output from the VCO 117 to derive an associated intermediate frequency signal. Subsystem 100 also includes a plurality of first low pass filters 106, with each antenna $68^j$ connected to subsystem 110 having an associated first low-pass filter 106 that filters the intermediate frequency output signal from mixer $105^j$ from noise and other high frequency components. Subsystem 110 also includes a plurality of secondary phase locked loops, with each antenna 68 connected to subsystem 110 having an associated secondary phase locked loop $114^j$ that locks to the intermediate frequency output signal associated with first low pass filter $106^j$. In one refinement depicted in FIG. 4, each secondary phase locked loop $114^j$ includes a secondary variable gain amplifier, a secondary mixer and a secondary VCO with nominal oscillation frequency approximately equal to the intermediate frequency signal. The secondary PLLs convert the intermediate frequency output signals at the associated first low pass filter outputs to base-band with at least partially compensated inter-antenna phase shift. The outputs from the secondary PLLs are further weighted by a plurality of variable gain amplifiers, with each secondary VCO having an associated variable gain amplifier $115^j$. The weighted base-band signals from the secondary PLLs are combined using an adder 116 to obtain a base-band combined control signal with enhanced signal to noise ratio. The base-band control signal from the adder 116 is used as a control signal to control the oscillation frequency of the primary VCO 117. Due to the enhanced signal to noise ratio, the primary VCO output may recover the transmitted reference signal with a lower accumulation of channel noise and phase noise. Subsystem 110 may also include an optional second mixer 118 that takes as an input the output of the primary VCO 117, and provides an output signal a frequency shifted version of the primary VCO output, to better match the reference signal frequency.

In a variation, MIMO system 60 includes a low pass filter and/or downconverter 100 that receives as input the summed signal output and outputs a baseband signal. The baseband signal is sampled by Analog to digital converter 102 to form a digital baseband signal. The digital baseband signal is then demodulated by OFDM demodulator 104 that demodulates the bandpass signal.

Figure 5:
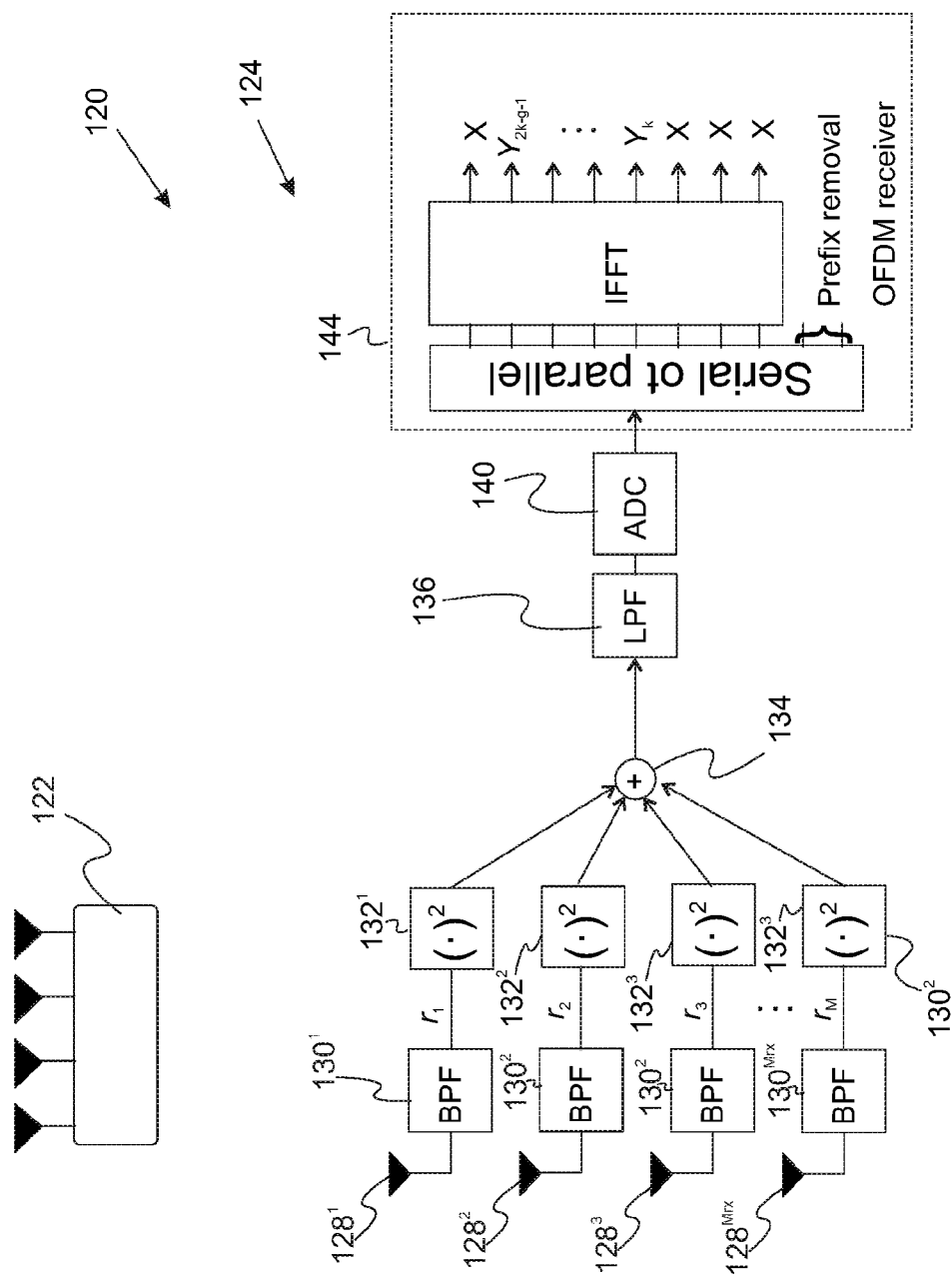
FIG. 5: Block diagram for a MIMO system with a multi-antenna frequency shift reference (MA-FSR) receiver.

With reference to FIG. 5, a non-coherent MIMO system using a multiantenna frequency shift reference (MA-FSR) receiver is provided. MIMO system 120 includes transmitter 122 that transmits a transmitted signal that includes a data signal and a reference signal. Typically, the reference signal is, but is not restricted to be, a sinusoidal tone having a predetermined frequency. In a refinement, transmitter 122 transmits the transmitted signal by orthogonal frequency division multiplexing. Receiver 124 includes a plurality of antennas $128^i$ where i is an integer from 1 to $M_{rx}$ the number of antennas. Each antenna $128^i$ receives the transmitted signal and outputs an associated received signal which passes through band pass filter $130^i$ that leaves the associated received signal un-distorted while suppressing out-of-band noise. Squaring circuit $132^i$ squares each associated received signal to form associated squared received signals. The squared outputs involve, among other signals, a product between the reference signal and data signals with the inter-antenna phase shift compensated. Analog adder 134 adds the squared received signals to produce a summed signal $r_{sq}(t)$. Low pass filter 136 filters the summed signal to form a low pass filtered signal. The low pass filtered signal is sampled by ADC 140 and OFDM demodulation by OFDM demodulator 144 to extract the output signal corresponding to the product between the reference signal and data signals. Advantageously, the sparse nature of wireless channels is exploited to ensure a large beamforming gain after the summed signal output. The system of this embodiment can suppress the phase noise of the transmit oscillator. Advantageously, this embodiment, does not require an oscillator at the receiver.

With reference to FIG. 5, the reference signal and data signals are designed such that the product of the data signal with itself does not cause interference to the product between the reference signal and data signal at the outputs of the squaring circuit $132^i$. In one variant, this is implemented by allowing the reference signal to occupy an even numbered OFDM sub-carrier, while all data signals occupy odd numbered OFDM sub-carriers or vice versa.

With respect to the systems of FIGS. 1-5, the occurrence and potential suppression of phase noise should be considered. Phase noise is an oscillator impairment, that causes an oscillator output instantaneous frequency to waver randomly. Therefore, in a conventional MIMO receiver, when the received signal is converted to base band by an oscillator, phase noise distorts the resulting base-band signal, causing degradation in performance. In CACE and MA-FSR based receivers, while this phase-noise induced distortion is random, the same distortion is applied to both the data and reference signals, since the data and reference signals are transmitted simultaneously. Thus, if the base-band reference signal is used to control the phase shifters 56 in the CACE system of FIG. 2, the distortion caused by the phase noise is implicitly undone at the phase shifter outputs. In a similar way, the baseband conversion circuit 20 for the CACE receiver in FIG. 1 and the squaring circuits $132^i$ in the MA-FSR receiver in FIG. 5, multiply the received data signal with the reference signal, prior to combining and demodulation. Since the phase noise distorts both the reference and data signals identically, their multiplication undoes the impact of the phase noise at the baseband conversion circuit output 20 in FIG. 1 and at the squaring circuit $132^i$ outputs in FIG. 5. Thus CACE and MA-FSR receivers provide resilience to oscillator phase noise.

The following examples illustrate the various embodiments of the present invention. Those skilled in the art will recognize many variations that are within the spirit of the present invention and scope of the claims.

1. Continuous Analog Channel Estimation Aided Beamforming for Massive MIMO Systems I. Introduction In this embodiment, a more generalized ACE approach for RX beamforming, called continuous ACE (CACE) is explored, that does not require carrier recovery at the RX, mitigates oscillator phase noise and works in multi-path channels. The latter is accomplished by exploiting not only phase of the carrier signal at the RX but also its amplitude. In CACE, a reference tone, i.e. a sinusoidal tone at a known frequency, is continuously transmitted along with the data by the TX as illustrated in FIG. 2. At the RX, the received signal at each antenna is converted to baseband by a bank of mixers and a local oscillator that is tuned (approximately) to the reference frequency, as illustrated in FIG. 2. The in-phase (I) and quadrature-phase (Q) components of the resulting baseband signal at each antenna are low-pass filtered, to extract the received signals corresponding to the reference, as illustrated in FIG. 1. These filtered outputs are then used to feed variable gain, baseband analog phase-shifters which generate the RX analog beam. The un-filtered baseband received signals at each antenna are processed by these phase-shifters, added and fed to a single ADC for demodulation. As shall be shown, this process emulates using the received signal for the reference as a matched filter for the received data signals, and it achieves a large RX beamforming gain in sparse, wide-band massive MIMO channels. This is because while the reference and data signals may have different frequencies and thus experience different channel responses, such channel responses exhibit a strong coupling across frequency. Furthermore since oscillator phase-noise affects both the reference and data similarly, the match filtering helps mitigate the phase-noise from the demodulation outputs. Unlike conventional analog beamforming, CACE aided beamforming also improves diversity against MPC blocking by combining the received signal power from multiple channel MPCs. Finally, no dedicated pilot symbols are required to update the RX analog beam, unlike with digital CE. The phase shifts from the receiver circuit can also be utilized for transmit beamforming on the reverse link. Furthermore, by providing an option for digitally controlling these phase-shifter inputs, the proposed architecture can also support conventional RX beamforming approaches when required. On the flip side, CACE may require additional analog hardware in comparison to conventional digital CE, including $2M_{rx}$ mixers and low-pass filters. Additionally, the accumulation of power from multiple MPCs, while improving diversity, may cause performance degradation in frequency selective channels, as shall be shown. Finally, the proposed approach in its suggested form does not support reception of multiple spatial data streams and can only be used for beamforming at one end of a communication link. This architecture is therefore more suitable for use at the user equipment (UEs). The possible extensions to multiple spatial stream reception shall be explored in future work. A different ACE technique that does not require continuous transmission of the reference, called PACE, is also described herein. While PACE prevents wastage of transmit resources on the reference, it suffers from an exponential degradation of performance due to phase-noise, unlike CACE. A third type of non-coherent ACE technique, called MA-FSR, that uses square law components at the RX was explored by us in [52]. While being resilient to phase-noise like CACE and having a low hardware cost, MA-FSR is a non-coherent technique that suffers from a poor bandwidth efficiency of 50%. It should be emphasized that CACE, PACE and MA-FSR are three different ACE schemes to help reduce CE overhead in massive MIMO systems, each having their unique advantages and RX architectures, and each requiring separate performance analysis techniques. The detailed analysis presented in this paper for CACE, in combination with the analysis of PACE and MA-FSR (also described herein), shall aid in a detailed comparison of these schemes for a specific application. The contributions of the present embodiment include:

1. A novel transmission technique called CACE and a corresponding RX architecture are proposed that enable RX beamforming without dedicated pilot symbol transmissions.
2. Analytically characterization of the achievable system throughput with CACE aided beamforming in a wideband channel.
3. In the process, the impact of the system phase-noise and the ability of CACE to suppress it are also analyzed.
4. Simulations under practically relevant channel models are presented to support the analytical results.

Notation: scalars are represented by light-case letters; vectors by bold-case letters; and sets by calligraphic letters. Additionally, $j=\sqrt{-1}$, $a^*$ is the complex conjugate of a complex scalar a, |a| represents the $\ell_2$-norm of a vector a, $A^T$ is the transpose of a matrix A and $A^\dagger$ is the conjugate transpose of a complex matrix A. Finally, $\mathbb{I}_a$ is an a×a identity matrix, $\mathbb{O}_{a,b}$ is the a×b all zeros matrix, $\mathbb{E}\{\}$ represents the expectation operator, $\stackrel{d}{=}$ represents equality in distribution, $\text{Re}\{\cdot\}/\text{Im}\{\cdot\}$ refer to the real/imaginary component, respectively, and $\mathcal{CN}(a, B)$ represents a circularly symmetric complex Gaussian vector with mean a and covariance matrix B.

II. General Assumptions and System Model

We consider a single cell system in downlink, where a $M_{tx}$ antenna base-station (BS) transmits data to multiple UEs simultaneously via spatial multiplexing. Since we mainly focus on the downlink, we shall use the terms BS/TX and UE/RX interchangeably. Each UE is assumed to have a hybrid architecture, with $M_{rx}$ antennas and one down-conversion chain, and it performs CACE aided RX beamforming. On the other hand, the BS may have an arbitrary architecture and it transmits a single spatial data-stream to each scheduled UE. For convenience, we consider the use of noise-less and perfectly linear antennas, filters, amplifiers and mixers at both the BS and the representative UE. We assume the downlink BS-UE communication to be divided into three stages: (i) Initial Access (IA)(ii) TX beamformer design—where the TX acquires rCSI for all the UEs and uses it to perform UE scheduling, TX beamforming and power allocation and (iii) Data transmission—wherein the BS transmits data signals and the scheduled UEs use CACE to adapt the RX beams and receive the data. Through a major portion of this paper, we assume that the IA and TX beamformer design have been performed apriori and shall focus on the data transmission stage. However in Section 5, we shall also discuss how CACE beamforming can help in stages (i) and (ii).

Figure 6:
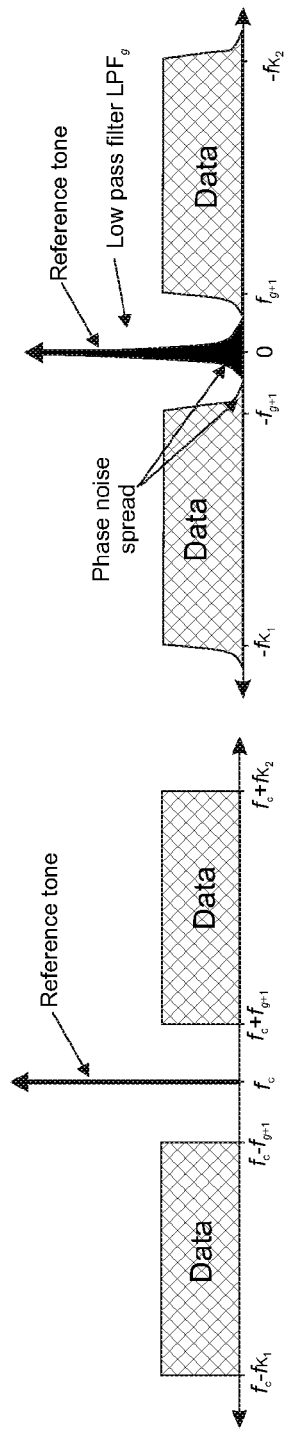
FIGS. 6A and 6B: An illustration of the transmit and receive signals with CACE aided beamforming. A) Transmit signal at TX antenna m; B) Baseband signal at RX antenna m.

In stage (iii), we assume the BS to transmit spatially orthogonal signals to the scheduled UEs to mitigate inter-user interference. This can be achieved, for example, by careful UE scheduling and/or via avoiding transmission to common channel scatterers (A. Adhikary, E. A. Safadi, M. K. Samimi, R. Wang, G. Caire, T. S. Rappaport, and A. F. Molisch, "Joint spatial division and multiplexing for mm-wave channels," IEEE Journal on Selected Areas in Communications, vol. 32, pp. 1239-1255, June 2014). For this system model and for a given TX beamformer and power allocation, we shall restrict the analysis to a single representative UE without loss of generality. The BS is assumed to transmit orthogonal frequency division multiplexing (OFDM) symbols to the representative UE, with $K=K_1+K_2+1$ sub-carriers indexed as $\mathcal{K}=\{-K_1, \ldots, K_2\}$. The 0-th sub-carrier is used as a reference tone, i.e., a pure sinusoidal signal with a pre-determined frequency, while data is transmitted on the $K_1$-g lower and $K_2$-g higher sub-carriers, represented by the index set $\{K_1, \ldots, -g-1, g+1, \ldots, K_2\}$. The 2g sub-carriers indexed as $\{-g, \ldots, -1, 1, \ldots, g\}$ are blanked to act as a guard band between the reference and data sub-carriers as illustrated in FIG. 6A, with g being a design parameter. Since the BS can afford an accurate oscillator, by ignoring its phase-noise, the complex equivalent transmit signal for the 0-th OFDM symbol of stage (iii) can then be expressed as:

$$\tilde{s}_{tx}(t) = \sqrt{\frac{2}{T_s}} t \left[ \sqrt{E^{(r)}} + \sum_{k \in \mathcal{K} \backslash \mathcal{G}} x_k e^{j2\pi f_k t} \right] e^{j2\pi f_c t}, \quad (1.1)$$

for $-T_{cp} \leq t \leq T_s$, where t is the $M_{tx} \times 1$ unit-norm TX beamforming vector for this UE (designed apriori in stage (ii)), $E^{(r)}$ is the energy-per-symbol allocated to the reference tone, $\mathcal{G} = \{-g, \ldots, 0, \ldots g\}$ defines the non-data sub-carriers, $x_k$ is the data signal on the k-th sub-carrier, $f_c$ is the reference frequency, $f_k = k/T_s$ represents the frequency offset of the k-th sub-carrier and $T_s$, $T_{cp}$ are the symbol duration and the cyclic prefix duration, respectively. Here we define the complex equivalent signal such that the actual (real) transmit signal is given by $s_{tx}(t) = \text{Re}\{\tilde{s}_{tx}(t)\}$. For the data sub-carriers ($k \in \mathcal{K} \backslash \mathcal{G}$), we assume the use of independent data streams with equal power allocation, and circularly symmetric Gaussian signaling, i.e., $x_k \sim \mathcal{CN}(0, E^{(d)})$. The transmit power constraint is then given by $E^{(r)} + (K - |\mathcal{G}|)E^{(d)} \leq E_s$, where $E_s$ is the total OFDM symbol energy (excluding the cyclic prefix). The channel to the representative UE is assumed to have L MPCs with the $M_{rx} \times M_{tx}$ channel impulse response matrix and its Fourier transform, respectively, given as (M. Akdeniz, Y. Liu, M. Samimi, S. Sun, S. Rangan, T. Rappaport, and E. Erkip, "Millimeter wave channel modeling and cellular capacity evaluation," *IEEE Journal on Selected Areas in Communications*, vol. 32, pp. 1164-1179, June 2014.19):

$$H(t) = \sum_{\ell=0}^{L-1} \alpha_\ell a_{rx}(\ell) a_{tx}(\ell)^\dagger \delta(t - \tau_\ell), \quad (1.2a)$$

$$\mathcal{H}(f) = \sum_{\ell=0}^{L-1} \ell \, a_{rx}(\alpha_\ell) a_{tx}(\ell)^\dagger e^{-j2\pi(f_c + f)\tau_\ell}, \quad (1.2b)$$

where $\alpha_\ell$ is the complex amplitude and $\tau_\ell$ is the delay and $a_{tx}(\ell)$, $a_{rx}(\ell)$ are the $M_{tx} \times 1$ TX and $M_{rx} \times 1$ RX array response vectors, respectively, of the $\ell$-th MPC. As an illustration, the $\ell$-th RX array response vector for a uniform planar array with $M_H$ horizontal and $M_V$ vertical elements ($M_{rx} = M_H M_V$) is given by $a_{rx}(\ell) = \bar{a}_{rx}(\psi_{azi}^{rx}(\ell), \psi_{ele}^{rx}(\ell))$, where $$[\bar{a}_{rx}(\psi_{azi}^{rx}, \psi_{ele}^{rx})]_{M_V h + v} = \exp\left\{ j2\pi \frac{\Delta_H h \sin(\psi_{azi}^{rx}) \sin(\psi_{ele}^{rx}) + \Delta_V (v-1) \cos(\psi_{ele}^{rx})}{\lambda} \right\}, \quad (1.3)$$

for $h \in \{0, \ldots, M_H - 1\}$ and $v \in (1, \ldots, M_V)$, $\psi_{azi}^{rx}(\ell)$, $\psi_{ele}^{rx}(\ell)$ are the azimuth and elevation angles of arrival for the $\ell$-th MPC, $\Delta_H$, $\Delta_V$ are the horizontal and vertical antenna spacings and $\lambda$ is the carrier wavelength. Expressions for $a_{tx}(\ell)$ can be obtained similarly. Note that in (1.2) we implicitly ignore the frequency variation of individual MPC amplitudes ($\alpha_0, \ldots, \alpha_{L-1}$) and the beam squinting effects (S. K. Garakoui, E. A. M. Klumperink, B. Nauta, and F. E. van Vliet, "Phased-array antenna beam squinting related to frequency dependency of delay circuits," in *European Microwave Conference*, pp. 1304-1307, October 2011.53), which are reasonable assumptions for moderate system bandwidths. It is emphasized that the complete channel response (including all MPCs) however still experiences frequency selective fading. To prevent inter-symbol interference, we let the cyclic prefix be longer than the maximum channel delay: $T_{cp} > \tau_{L-1}$. We also consider a generic temporal variation model, where the time for which MPC parameters $\{\alpha_\ell, a_{tx}(\ell), a_{rx}(\ell), \tau_\ell\}$ stay approximately constant is much larger than the symbol duration $T_s$. Finally, we do not assume any distribution prior or side information on $\{\alpha_\ell, a_{tx}(\ell), a_{rx}(\ell), \tau_\ell\}$.

Each RX antenna front-end is assumed to have a low noise amplifier (LNA) followed by a band-pass filter (BPF) that leaves the desired signal un-distorted but suppresses the out-of-band noise. The filtered signal is then converted to baseband using the in-phase and quadrature-phase components of an RX local oscillator, as depicted in FIG. 2. This oscillator is assumed to be independently generated at the RX (i.e., without locking to the received reference). While we model the RX oscillator to suffer from phase-noise, for ease of theoretical analysis we assume the mean RX oscillator frequency to be equal to the reference frequency $f_c$. This assumption shall be relaxed later in the simulation results in Section 6. Then, from (1.1)-(1.2), the received baseband signal for the 0-th OFDM symbol can be expressed as:

$$\tilde{s}_{rx,BB}(t) = \quad (1.4)$$

$$LPF\left\{ \sum_{\ell=0}^{L-1} \alpha_\ell a_{rx}(\ell) a_{tx}(\ell)^\dagger \tilde{s}_{tx}(t - \tau_\ell) \sqrt{2} \, e^{-j(2\pi f_c t + \theta(t))} \right\} + \tilde{w}(t) =$$

$$\frac{1}{\sqrt{T_s}} \left[ \mathcal{H}(0) t \sqrt{E^{(r)}} + \sum_{k \in \mathcal{K} \backslash \mathcal{G}} \mathcal{H}(f_k) t x_k e^{j2\pi f_k t} \right] e^{-j\theta(t)} + \tilde{w}(t)$$

for $0 \leq t \leq T_s$, where the Re/Im parts of $\tilde{s}_{rx,BB}(t)$ are the outputs corresponding to the in-phase and quadrature-phase components of the RX oscillator, $\theta(t)$ is the phase-noise process of the RX oscillator and $\tilde{w}(t)$ is the $M_{rx} \times 1$ complex equivalent, baseband, stationary, additive, vector Gaussian noise process, with individual entries being circularly symmetric, independent and identically distributed (i.i.d.), and having a power spectral density: $\mathcal{S}_w(f) = N_0$ for $-f_{K_1} \leq f \leq f_{K_2}$. Note that while (1.4) is obtained by assuming no TX phase-noise, the results can be generalized under some mild constraints by treating the TX phase-noise as a part of $\theta(t)$ (P. Mathecken, T. Riihonen, S. Werner, and R. Wichman, "Performance analysis of OFDM with wiener phase noise and frequency selective fading channel," IEEE Transactions on Communications, vol. 59, pp. 1321-1331, May 2011. We model the RX phase-noise $\theta(t)$ as a Wiener process, which is representative of a free running oscillator [L. Piazzo and P. Mandarini, "Analysis of phase noise effects in OFDM modems," IEEE Transactions on Communications, vol. 50, pp. 1696-1705, oct 2002; S. Wu, P. Liu, and Y. Bar-Ness, "Phase noise estimation and mitigation for OFDM systems." IEEE Transactions on Wireless Communications, vol. 5, pp. 3616-3625, December 2006; D. Petrovic, W. Rave, and G. Fettweis, "Effects of phase noise on OFDM systems with and without PLL: Characterization and compensation," IEEE Transactions on Communications, vol. 55, pp. 1607-1616, August 2007). In Appendix 1C, we also discuss how the results can be extended to phase-noise modeled as an Ornstein Uhlenbeck (OU) process, which is representative of an oscillator either locked to the received reference, or synthesized from a stable low frequency source (D. Petrovic, W. Rave, and G. Fettweis, "Effects of phase noise on OFDM systems with and without PLL: Characterization and compensation," IEEE Transactions on Communications, vol. 55, pp. 1607-1616, August 2007; A. Mehrotra, "Noise analysis of phase-locked loops," IEEE Transactions on Circuits and Systems I: Fundamental Theory and Applications, vol. 49, pp. 1309-1316, September 2002). For the Wiener model, $\theta(t)$ is a non-stationary Gaussian process which satisfies:

$$\frac{d\theta(t)}{dt} = w_\theta(t), \quad (1.5)$$

where $w_\theta(t)$ is a real white Gaussian process with variance $\sigma_\theta^2$. We assume the RX to have apriori knowledge of $\sigma_\theta$. As illustrated in FIG. 2, the baseband signal $\tilde{s}_{rx,m}(t)$ at each RX antenna m is passed through a low-pass filter to isolate the received reference signal. For convenience, this filter $LPF_{\hat{g}}$ is assumed to be an ideal rectangular filter having a cut-off frequency of $f_{\hat{g}}$, where $\hat{g} \leq g/2$. Neglecting the contribution of the data sub-carriers to the filtered outputs (which is accurate for low phase-noise i.e., $\sigma_\theta^2 \ll g/T_s$), these outputs can be expressed for $0 \leq t \leq T_s$ as:

$$\hat{s}_{rx,BB}(t) = \frac{1}{\sqrt{T_s}} \mathcal{H}(0) t \sqrt{E^{(r)}} A(t) + \hat{w}(t), \quad (1.6)$$

where we define $A(t) \triangleq LPF_{\hat{g}}\{e^{-j\Theta(t)}\}$ and $\hat{w}(t)$ is the $M_{rx} \times 1$ filtered Gaussian noise with power spectral density: $\mathcal{S}_w(f) = N_0$ for $-f_{\hat{g}} \leq f \leq f_{\hat{g}}$. An illustration of this filtering operation is provided in FIG. 6B. These filtered signals $\hat{s}_{rx,BB}(t)$ are used as the control signals to a variable gain phase-shifter array, through which the baseband received signal vector $\hat{s}_{rx,BB}(t)$ is processed, as shown in FIG. 2. We assume the filter cut-off frequency $\hat{g}/T_s$ to be small enough to allow the phase-shifters to respond to the slowly time varying control signals $\hat{s}_{rx,BB}(t)$. A more detailed discussion about $\hat{g}$ is considered in Sections 4 and 6. The phase-shifted outputs are then summed up and fed to an ADC that samples at $K/T_s$ samples/sec. This sampled output for the 0-th OFDM symbol can be expressed as:

$$y[n] = \hat{s}_{rx,BB}(nT_s/K)^\dagger \tilde{s}_{rx,BB}(nT_s/K) \quad (1.7)$$

$$= \frac{1}{T_s} t^\dagger \mathcal{H}(0)^\dagger \sqrt{E^{(r)}} \left[ \mathcal{H}(0) t \sqrt{E^{(r)}} + \sum_{k \in \mathcal{K}_{\mathcal{G}}} \mathcal{H}(f_k) t x_k e^{j2\pi k \frac{n}{K}} \right]$$

$$A^*[n] e^{-j\theta[n]} + \sqrt{\frac{1}{T_s}} w[n]^\dagger$$

$$\left[ \mathcal{H}(0) t \sqrt{E^{(r)}} + \sum_{k \in \mathcal{K}_{\mathcal{G}}} \mathcal{H}(f_k) t x_k e^{j2\pi k \frac{n}{K}} \right] e^{-j\theta[n]} +$$

$$\sqrt{\frac{1}{T_s}} t^\dagger \mathcal{H}(0)^\dagger \sqrt{E^{(r)}} \tilde{w}[n] A^*[n] + \hat{w}[n]^\dagger \tilde{w}[n],$$

where we define $$A[n] \triangleq A\left(\frac{nT_s}{K}\right), \theta[n] \triangleq \theta\left(\frac{nT_s}{K}\right), \tilde{w}[n] \triangleq \tilde{w}\left(\frac{nT_s}{K}\right) \text{ and}$$

$$\hat{w}[n] \triangleq \hat{w}\left(\frac{nT_s}{K}\right).$$

Conventional OFDM demodulation follows on y[n] to obtain the different OFDM sub-carrier outputs, as analyzed in Section 3.

III. Analysis of the Demodulation Outputs

Without loss of generality, we shall restrict the analysis to the representative 0-th OFDM symbol and thus, we only focus on $\{y[n] | 0 \leq n < K\}$. Note that the sampled, band-limited additive noise $\tilde{w}[n]$ and the sampled RX phase-noise $e^{-j\theta[n]}$ for $0 \leq n < K$ can be expressed using their normalized Discrete Fourier Transform (nDFT) expansions as:

$$\tilde{w}[n] = \sum_{k \in \mathcal{K}} W[k] e^{j2\pi kn/K}, \quad (1.8a)$$

$$e^{-j\theta[n]} = \sum_{k \in \mathcal{K}} \Omega[k] e^{j2\pi kn/K}, \quad (1.8b)$$

where $$W[k] = \frac{1}{K} \sum_{n=0}^{K-1} \tilde{w}[n] e^{-j2\pi kn/K} \text{ and}$$

$$\Omega[k] = \frac{1}{K} \sum_{n=0}^{K-1} e^{-j\theta[n]} e^{-j2\pi kn/K}$$

are the corresponding nDFT coefficients. Here nDFT is an unorthodox definition for Discrete Fourier Transform, where the normalization by K is performed while finding $W[k], \Omega[k]$ instead of in (1.8). These nDFT coefficients are periodic with period K and satisfy the following lemma:

Lemma 3.1 The nDFT coefficients of $e^{-j\theta[n]}$ for $0 \leq n < K$ satisfy:

$$\sum_{k \in \mathcal{K}} \Omega[k] \Omega[k + k_1]^* = \delta_{0,k_1}^K, \quad (1.9a)$$

$$\quad (1.9b)$$

$$\Delta_{k_1,k_2} \triangleq$$

$$\mathbb{E}\{\Omega[k_1]\Omega[k_2]^*\} \approx \frac{\delta_{k_1,k_2}^K}{K} \left[ \frac{1 - e^{-\left(\frac{\sigma_\theta^2 T_s - j4\pi k_1}{4}\right)}}{e^{\frac{\sigma_\theta^2 T_s - j4\pi k_1}{2K}} - 1} + \frac{1 - e^{-\left(\frac{\sigma_\theta^2 T_s + j4\pi k_1}{4}\right)}}{1 - e^{\frac{\sigma_\theta^2 T_s + j4\pi k_1}{2K}}} \right],$$

for arbitrary integers $k_1$, $k_2$, where $\delta_{a,b}^K = 1$ if a=b (mod K) or $\delta_{a,b}^K = 0$ otherwise.

Proof. See Appendix 1A.

Figure 7:
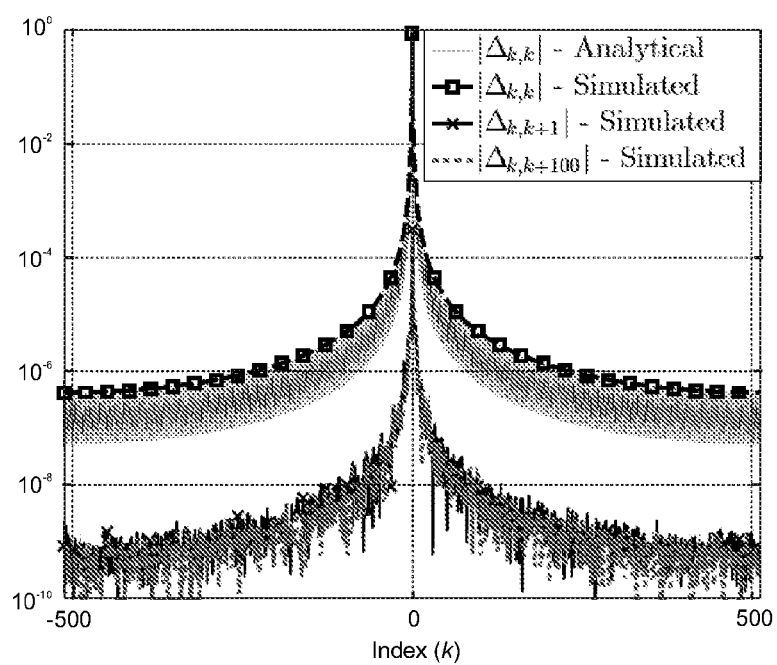
FIG. 7: Comparison of analytical (from Lemma 3.1) and simulated statistics of the nDFT coefficients of a sample RX phase-noise process with $T_s=1$ μs, $K_1=K_2+1=512$ and $\sigma_\theta=1/\sqrt{T_s}$. Simulations averaged over $10^6$ realizations.

To test the accuracy of the approximation in Lemma 3.1, the Monte-Carlo simulations of $\Delta_{k,k}$, $\Delta_{k,k+1}$ and $\Delta_{k,k+100}$ for a typical phase-noise process (−93 dBc/Hz at 10 MHz offset) are compared to (1.9b) in FIG. 7. As is evident from the results, (1.9b) is accurate for $k_1 = k_2$. Similarly, simulated $\Delta_{k,k+1}$, $\Delta_{k,k+100}$ values are ≈20 dB lower than $\Delta_{k,k}$ for all k, i.e., ≈0 as in (1.9b). The analogous version of Lemma 3.1 for phase-noise modeled as an OU process is presented in Appendix 1C. In a similar way, for nDFT coefficients of the channel noise we have:

Lemma 3.2 The nDFT coefficients of $\tilde{w}[n]$, i.e., $\{W[k] | \forall k\}$, are jointly Gaussian with:

$$\mathbb{E}\{W[k_1]W[k_2]^\dagger\} = \delta_{k_1,k_2}^K \frac{N_0}{T_s} \mathbb{1}_{M_{rx}}, \text{ and} \quad (1.10)$$

$$\mathbb{E}\{W[k_1]W[k_2]^T\} = \mathbb{O}_{M_{rx},M_{rx}},$$

for arbitrary integers $k_1$, $k_2$, where $\delta_{a,b}^K = 1$ if a=b (mod K) or $\delta_{a,b}^K = 0$ otherwise.

Proof. See Appendix 1B.

Note that using these nDFT coefficients, the low-pass filtered versions of $\tilde{w}[n]$ and $e^{-j\theta[n]}$ in (1.7) can be approximated as:

$$\hat{w}[n] \approx \sum_{k \in \hat{\mathcal{G}}} W[k] e^{j2\pi kn/K}, \qquad (1.11a)$$

$$A[n] \approx \sum_{k \in \hat{\mathcal{G}}} \Omega[k] e^{j2\pi kn/K}, \qquad (1.11b)$$

where $\hat{\mathcal{G}} = \{-\hat{g}, \ldots, \hat{g}\}$ and the approximations are obtained by replacing the linear convolution of $\tilde{s}_{rx,BB}(t)$ and the filter response $\mathrm{LPF}_{\hat{g}}\{\ \}$ with a circular convolution. This is accurate when the filter response has a narrow support, i.e., for $\hat{g} \gg 1$. The remaining results in this paper are based on the approximations in (1.9)-(1.11) and on an additional approximation discussed later in Remark 3.1. While we still use the $\leq$, $=$, $\geq$ operators in the following results for convenience of notation, it is emphasized that these equations are true in the strict sense only if the approximations in (1.9)-(1.11) and Remark 3.1 are met with equality. However simulation results are also used in Section VI to test the validity of these approximations. Substituting (8) and (11) into (7), the k-th OFDM demodulation output can be expressed as:

$$Y_k = \frac{T_s}{K} \sum_{n=0}^{K-1} y[n] e^{-j2\pi \frac{kn}{K}} \qquad (1.12)$$

$$= \sum_{\tilde{k} \in \tilde{\mathcal{G}}} t^\dagger \mathcal{H}(0)^\dagger \left( \sum_{\bar{k} \in \mathcal{K}_\mathcal{G}} \mathcal{H}(f_{\bar{k}}) t \sqrt{E^{(r)}} x_{\bar{k}} \Omega^*[\tilde{k}] \Omega[\tilde{k} + k - \bar{k}] + \right.$$

$$\mathcal{H}(0) t E^{(r)} \Omega^*[\tilde{k}] \Omega[\tilde{k} + k] \bigg) + \sum_{\tilde{k} \in \hat{\mathcal{G}}} \sqrt{T_s} \, W[k]^\dagger$$

$$\left( \mathcal{H}(0) t \sqrt{E^{(r)}} \, \Omega[\tilde{k} + k] + \sum_{\bar{k} \in \mathcal{K}_\mathcal{G}} \mathcal{H}(f_{\bar{k}}) t x_{\bar{k}} \Omega \right.$$

$$[k + \tilde{k} - \bar{k}] \bigg) + \sum_{\tilde{k} \in \tilde{\mathcal{G}}} \sqrt{T_s} \, t^\dagger \mathcal{H}(0) W[k + \tilde{k}]$$

$$\sqrt{E^{(r)}} \, \Omega^*[\tilde{k}] + T_s \sum_{\tilde{k} \in \hat{\mathcal{G}}} W^\dagger[\tilde{k}] W[k + \tilde{k}].$$

We shall split $Y_k$ as $Y_k = S_k + I_k + Z_k$ where $S_k$, referred to as the signal component, involves the terms in (1.12) containing $x_k$ and not containing the channel noise, $I_k$, referred to as the interference component, involves the terms containing $E^{(r)}$, $\{x_{\bar{k}} | \bar{k} \in \mathcal{K} \setminus \{k\}\}$ and not containing the channel noise, and $Z_k$, referred to as the noise component, containing the remaining terms. These signal, interference and noise components are analyzed in the following subsections.

A. Signal Component Analysis

From (1.12), the signal component for $k \in \mathcal{K} \setminus \mathcal{G}$ can be expressed as:

$$S_k = M_{rx} \beta_{0,k} \sqrt{E^{(r)}} x_k [\Sigma_{\tilde{k} \in \hat{\mathcal{G}}} |\Omega[\tilde{k}]|^2], \qquad (1.13)$$

where we define $\beta_{k_1, k_2} \triangleq t^\dagger \mathcal{H}(k_1)^\dagger \mathcal{H}(k_2) t / M_{rx}$. Since $\hat{\mathcal{G}} \subset \mathcal{K}$, note that $\Sigma_{\tilde{k} \in \hat{\mathcal{G}}} |\Omega[\tilde{k}]|^2 < 1$ from Lemma 3.1, i.e., the phase-noise causes some loss in power of the signal component. However this loss is much smaller than in PACE (V. V. Ratnam and A. F. Molisch, "Periodic analog channel estimation aided beamforming for massive MIMO systems," IEEE Transactions on Wireless Communications, 2019, accepted) or digital CE based beamforming, where only $|\Omega[0]|$ contributes to the signal component unless additional phase-noise compensation is used. As is evident from (1.13), CACE based beamforming utilizes the (filtered) received signal vector corresponding to the reference tone as weights to combine the received signal vector corresponding to the data sub-carriers, i.e., it emulates imperfect maximal ratio combining (MRC). The imperfection is because the reference tone and the k-th data stream pass through slightly different channels owing to the difference in their modulating frequencies. However the resulting loss in beamforming gain is expected to be small for sparse channels, i.e., for $L \ll M_{rx}$, $M_{rx}$, as shall be shown in Sections IV and VI. The second moment of the signal component, averaged over the phase-noise and data symbols, can be computed as:

$$\mathbb{E}\{|S_k|^2\} = M_{rx}^2 |\beta_{0,k}|^2 E^{(r)} E^{(d)} \mathbb{E}\{[\Sigma_{\tilde{k} \in \hat{\mathcal{G}}} |\Omega[\tilde{k}]|^2]^2\} \geq M_{rx}^2 |\beta_{0,k}|^2 E^{(r)} E^{(d)} \mu(0, \hat{g})^2 \qquad (1.14)$$

where we define $\mu(a, \hat{g}) \triangleq \Sigma_{\tilde{k} \in \hat{\mathcal{G}}} \Delta_{a+\tilde{k}, a+\tilde{k}}$, and (114) follows from Jensen's inequality and (1.9b).

B. Interference Component Analysis

From (1.12), the interference component for $k \in \mathcal{K} \setminus \mathcal{G}$ can be expressed as:

$$I_k = \Sigma_{\bar{k} \in \mathcal{K} \setminus [\mathcal{G} \cup \{k\}]} \Sigma_{\tilde{k} \in \hat{\mathcal{G}}} M_{rx} \beta_{0, \bar{k}} \sqrt{E^{(r)}} x_{\bar{k}} \Omega[\tilde{k}]^* \Omega[\tilde{k} + k - \bar{k}] + \Sigma_{\tilde{k} \in \hat{\mathcal{G}}} M_{rx} \beta_{0, 0} E^{(r)} \Omega[\tilde{k}]^* \Omega[\tilde{k} + k] \qquad (1.15)$$

As is clear from above, the demodulation output $Y_k$ for $k \in \mathcal{K} \setminus \mathcal{G}$ suffers inter-carrier interference (ICI) from other sub-carrier data streams due to the RX phase-noise. The first and second moments of $I_k$, averaged over the other sub-carrier data $\{\bar{k} \in \mathcal{K} \setminus [\mathcal{G} \cup \{k\}]\}$ and the phase-noise, can be expressed as:

$$\mathbb{E}\{I_k\} \stackrel{(1)}{=} \sum_{\tilde{k} \in \hat{\mathcal{G}}} M_{rx} \beta_{0,0} E^{(r)} \Delta_{\tilde{k}+k, \tilde{k}} = 0 \qquad (1.16a)$$

$$\mathbb{E}\{|I_k|^2\} \stackrel{(2)}{=} \qquad (1.16b)$$

$$\sum_{\bar{k} \in \mathcal{K} \setminus [\mathcal{G} \cup \{k\}]} M_{rx}^2 |\beta_{0, \bar{k}}|^2 E^{(r)} E^{(d)} \mathbb{E}\left\{ \left| \sum_{\tilde{k} \in \hat{\mathcal{G}}} \Omega[\tilde{k}]^* \Omega[\tilde{k} + k - \bar{k}] \right|^2 \right\} +$$

$$M_{rx}^2 |\beta_{0,0}|^2 [E^{(r)}]^2 \mathbb{E}\left\{ \left| \sum_{\tilde{k} \in \hat{\mathcal{G}}} \Omega[\tilde{k}]^* \Omega[\tilde{k} + k] \right|^2 \right\} \stackrel{(3)}{\leq}$$

$$\sum_{\bar{k} \in \mathcal{K} \setminus \{k\}} M_{rx}^2 |\beta_{max}|^2 E^{(r)} E^{(d)} \mathbb{E}\left\{ \left| \sum_{\tilde{k} \in \hat{\mathcal{G}}} \Omega[\tilde{k}]^* \Omega[\tilde{k} + k - \bar{k}] \right|^2 \right\} +$$

$$M_{rx}^2 |\beta_{max}|^2 [E^{(r)}]^2 \mathbb{E}\left\{ \left[ \sum_{\tilde{k} \in \hat{\mathcal{G}}} |\Omega[\tilde{k}]|^2 \right] \left[ \sum_{\tilde{k} \in \hat{\mathcal{G}}} |\Omega[\tilde{k} + k]|^2 \right] \right\} \stackrel{(4)}{\leq}$$

$$M_{rx}^2 |\beta_{max}|^2 E^{(r)} E^{(d)} \mathbb{E}$$

$$\left\{ \sum_{\tilde{k}, \hat{k} \in \hat{\mathcal{G}}} \Omega[\tilde{k}]^* \left[ \sum_{\bar{k} \in \mathcal{K} \setminus \{k\}} \Omega[\tilde{k} + k - \bar{k}] \Omega[\hat{k} + k - \bar{k}]^* \right] \Omega[\hat{k}] \right\} +$$

$$M_{rx}^2 \sum_{\tilde{k} \in \hat{\mathcal{G}}} |\beta_{max}|^2 [E^{(r)}]^2 \mathbb{E}\{|\Omega[\tilde{k} + k]|^2\} \stackrel{(5)}{=}$$

$$M_{rx}^2 |\beta_{max}|^2 E^{(r)} [E^{(d)} \mathbb{E}\left\{ \sum_{\tilde{k}, \hat{k} \in \hat{\mathcal{G}}} \Omega[\tilde{k}]^* \Omega[\hat{k}] - \left[ \sum_{\tilde{k} \in \hat{\mathcal{G}}} |\Omega[\tilde{k}]|^2 \right]^2 \right\} +$$

$$\sum_{\tilde{k} \in \hat{\mathcal{G}}} E^{(r)} \mathbb{E}\{|\Omega[\tilde{k} + k]|^2\} \stackrel{(6)}{\leq}$$

$$M_{rx}^2 |\beta_{max}|^2 E^{(r)} [E^{(d)} \mu(0, \hat{g})[1 - \mu(0, \hat{g})] + E^{(r)} \mu(k, \hat{g})]$$

where $\stackrel{(1)}{=}$, $\stackrel{(2)}{=}$ are obtained using the fact that $\{x_k | k \in \mathcal{K}\}$ have a zero-mean and are independently distributed; $\stackrel{(3)}{\leq}$ is obtained by defining $\beta_{max} \triangleq \max_{k \in \mathcal{K}} |\beta_{k,k}|$, observing $|\beta_{0,k}| \leq \beta_{max}$, and using $\mathcal{K} \setminus [\mathcal{G} \cup \{k\}] \subseteq \mathcal{K} \setminus \{k\}$ in first term and using the Cauchy-Schwarz inequality for the second term; $\stackrel{(4)}{\leq}$ follows by changing the summation order in the first term and by using (11) for the second term; $\stackrel{(5)}{=}$ follows by using $\Omega[k] = \Omega[k+K]$ and (11) for the first term and $\stackrel{(6)}{\leq}$ follows by using (12) and the Jensen's inequality. As shall be shown in Section VI, (21) may be a loose bound on ICI for lower subcarriers, i.e., $|k| \ll K$.

Remark 3.1 A tighter approximation for $\mathbb{E}\{|I_k|^2\}$ can be obtained by replacing $\mu(k,\hat{g})$ in (21) with $\tilde{\mu}(k,\hat{g}) \triangleq \Sigma_{\check{k}\in\hat{\mathcal{G}}} \Delta_{k+\check{k},\check{k}}\Delta_{k+\check{k},k+\check{k}}$.

This heuristic is obtained by assuming $\Omega[\dot{k}]$ and $\Omega[\ddot{k}+k]$ to be independently distributed for $\dot{k}, \ddot{k}\in\hat{\mathcal{G}}$ and $k\in\mathcal{K}\setminus\mathcal{G}$ in step $\overset{(2)}{=}$ of (21), but we skip the proof for brevity. As shall be verified in Section VI, Remark 3.1 offers a much better ICI approximation $\forall k$ and hence we shall use $\tilde{\mu}(k,\hat{g})$ instead of $\mu(k,\hat{g})$ in the forthcoming derivations in Section VI.

C. Noise Component Analysis

From (16), the noise component of $Y_k$ for $k\in\mathcal{K}\setminus\mathcal{G}$ can be expressed as:

$$Z_k = Z_k^{(1)} + Z_k^{(2)} + Z_k^{(3)}, \text{ where:} \quad (1.17)$$

$$Z_k^{(1)} = \Sigma_{\check{k}\in\hat{\mathcal{G}}}\sqrt{T_s}W[\check{k}]^\dagger(\mathcal{H}_{(0)}\sqrt{E^{(r)}}\Omega[k+\check{k}] + \Sigma_{\bar{k}\in\mathcal{K}\setminus\mathcal{G}} \mathcal{H}_{(f_{\bar{k}})}tx_{\bar{k}}^*\Omega[k+\check{k}-\bar{k}])$$

$$Z_k^{(2)} = \Sigma_{\ell=0}^{t-1}\Sigma_{\check{k}\in\hat{\mathcal{G}}}\sqrt{T_s}t^\dagger\mathcal{H}_{(0)}^\dagger W[k+\check{k}]\sqrt{E^{(r)}}\Omega^*[\check{k}]$$

$$Z_k^{(3)} = T_s\Sigma_{\check{k}\in\hat{\mathcal{G}}} W^\dagger[\check{k}]w[k+\check{k}]$$

Note that the noise consists of both signal-noise and noise-noise cross product terms. From Lemma 3.2, it can readily be verified that $\mathbb{E}\{Z_k\}=0$ and $\mathbb{E}\{Z_k^{(i)}[Z_k^{(j)}]^*\}=0$ for $i\neq j$, where the expectation is taken over the noise realizations. Thus the second moment of $Z_k$, averaged over the TX data, phase-noise and channel noise, can be expressed as $\mathbb{E}\{|Z_k|^2\}=\mathbb{E}\{|Z_k^{(1)}|^2\}+\mathbb{E}\{|Z_k^{(2)}|^2\}+\mathbb{E}\{|Z_k^{(3)}|^2\}$, where:

$$\mathbb{E}\{|Z_k^{(1)}|^2\} \overset{(1)}{=} \Sigma_{\check{k}\in\hat{\mathcal{G}}}N_0\mathbb{E}|\mathcal{H}_{(0)}\sqrt{E^{(r)}}\Omega[k+\check{k}] + \Sigma_{\bar{k}\in\mathcal{K}\setminus\mathcal{G}}\mathcal{H}_{(\bar{k})}tx_{\bar{k}}^*\Omega[k+\check{k}-\bar{k}]|^2 \overset{(2)}{=} \Sigma_{\check{k}\in\hat{\mathcal{G}}} M_{rx}N_0[\beta_{0,0}E^{(r)}\Delta_{k+\check{k},k+\check{k}} + \Sigma_{\bar{k}\in\mathcal{K}\setminus\mathcal{G}} \beta_{\bar{k},\bar{k}}E_{\bar{k}}^{(d)}\Delta_{k+\check{k}-\bar{k},k+\check{k}-\bar{k}}] \quad (1.18a)$$

$$\mathbb{E}\{|Z_k^{(2)}|^2\} \overset{(3)}{=} \Sigma_{\check{k}\in\hat{\mathcal{G}}}N_0|\mathcal{H}_{(0)}t|^2E^{(r)}\mathbb{E}\{|\Omega[\check{k}]|^2\} \overset{(4)}{=} \Sigma_{\check{k}\in\hat{\mathcal{G}}}M_{rx}\beta_{0,0}N_0E^{(r)}\Delta_{\check{k},\check{k}} \quad (1.18b)$$

$$\mathbb{E}\{|Z_k^{(3)}|^2\} = \Sigma_{\check{k},\check{k}\in\hat{\mathcal{G}}} T_s^2 \mathbb{E}\{W[\check{k}]^\dagger W[k+\check{k}]W[k+\check{k}]^\dagger W[\check{k}]\} \overset{(5)}{=} M_{rx}|\hat{\mathcal{G}}|N_0^2 \quad (1.18c)$$

where $|\hat{\mathcal{G}}|=2\hat{g}+1$, $\overset{(1)}{=},\overset{(3)}{=}$ follow from Lemma 3.2; $\overset{(2)}{=},\overset{(4)}{=}$ follow from (12), and $\overset{(5)}{=}$ follows from Lemma 3.2, (1.9b) and the result on the expectation of the product of four Gaussian random variables 9W. Bar and F. Dittrich, "Useful formula for moment computation of normal random variables with nonzero means," IEEE Transactions on Automatic Control, vol. 16, pp. 263-265, June 1971). From (1.18), we can then upper-bound the noise power as:

$$\mathbb{E}\{|Z_k|^2\} \leq M_{rx}\beta_{max}N_0[E^{(r)}+|\hat{\mathcal{G}}|E^{(d)}] + M_{rx}|\hat{\mathcal{G}}|N_0^2 \quad (1.19)$$

where we use the fact that $|\beta_{\bar{k},\bar{k}}|\leq\beta_{max}$, $\Sigma_{\check{k}\in\hat{\mathcal{G}}}[\Delta_{k+\check{k},k+\check{k}}+\Delta_{\check{k},\check{k}}]\leq 1$ for $k\in\mathcal{K}\setminus\mathcal{G}$ (as $\hat{g}\leq g/2$) and $\Sigma_{\bar{k}\in\mathcal{K}\setminus\mathcal{G}}\Delta_{k+\check{k}-\bar{k},k+\check{k}-\bar{k}}\leq 1$, from (0.9a).

IV. Performance Analysis

From (1.12)-(1.17), the effective single-input-single-output (SISO) channel between the k-th sub-carrier input and corresponding output can be expressed as:

$$Y_k = M_{rx}\beta_{0,k}\sqrt{E^{(r)}}[\Sigma_{\check{k}\in\hat{\mathcal{G}}}|\Omega[\check{k}]|^2]x_k + I_k + Z_k, \text{ for } k\in\mathcal{K}\setminus\mathcal{G} \quad (1.20)$$

where $I_k$ and $Z_k$ are analyzed in Sections III-B and III-C, respectively. As is evident from (1.20), the signal component suffers from two kinds of fading: (i) a frequency-selective and channel dependent slow fading component represented by $\beta_{0,k}$ and (ii) a frequency-flat and phase-noise dependent fast fading component, represented by $\Sigma_{\check{k}\in\hat{\mathcal{G}}}|\Omega[\check{k}]|^2$. The estimation of these fading coefficients is discussed later in this section. In this paper, we consider the simple demodulation approach where $x_k$ is estimated only from $Y_k$, and the $I_k, Z_k$ are treated as noise. For this demodulation approach, a lower bound to the signal-to-interference-plus-noise ratio (SINR) can be obtained from (1.14), (1.16b), Remark 3.1 and (1.19), as:

$$\gamma_k^{LB}(\beta) \triangleq \frac{M_{rx}|\beta_{0,k}|^2 E^{(r)}E^{(d)}\mu(0,\hat{g})^2}{M_{rx}|\beta_{max}|^2 E^{(r)}[E^{(d)}\mu(0,\hat{g})(1-\mu(0,\hat{g})) + E^{(r)}\tilde{\mu}(k,\hat{g})] + \beta_{max}N_0[E^{(r)}+|\hat{\mathcal{G}}|E^{(d)}] + |\hat{\mathcal{G}}|N_0^2} \quad (1.21)$$

where $\beta \triangleq \{\beta_{0,k}|\mathcal{K}\}$ and we use the fact that $\mathbb{E}\{|I_k+Z_k|^2\}=\mathbb{E}\{|I_k|^2\}+\mathbb{E}\{|Z_k|^2\}$.

Remark 4.1 If the RX array response vectors or the MPCs are mutually orthogonal i.e. $a_{rx}(\ell_1)^\dagger a_{rx}(\ell_2) = M_{rx}\delta_{\ell_1,\ell_2}^\infty$ then $\beta_{\check{k},\check{k}} = \Sigma_{\ell=0}^{t-1}|\alpha_\ell|^2|a_{rx}(\ell)^\dagger t|^2 e^{j2\pi(f_{\check{k}}-f_{\check{k}})\tau_\ell}$ and $\beta_{max} = \Sigma_{\ell=0}^{t-1}|\alpha_\ell|^2$.

The orthogonality of array response vectors is approximately satisfied if the MPCs are well separated and $M_{rx}\gg L$ (O. El Ayach, R. Heath, S. Abu-Surra, S. Rajagopal, and Z. Pi, "The capacity optimality of beam steering in large millimeter wave MIMO systems," in IEEE International Workshop on Signal Processing Advances in Wireless Communications (SPAWC), pp. 100-104, June 2012). From Remark 4.1, note that even without explicit CE at the RX $\gamma_k^{LB}(\beta)$ scales with $M_{rx}$ in the low SNR regime, which is a desired characteristic. While the ICI term also scales with $M_{rx}$, its contribution can be kept small in the desired SNR range by picking $\hat{g}$ such that $\mu(0,\hat{g})\approx 1$. In a similar way, with perfect knowledge of the fading coefficients at the RX, an approximate lower bound to the ergodic capacity can be obtained as:

$$C(\beta) \overset{(1)}{\geq} \frac{1}{K}\sum_{k\in\mathcal{K}\setminus\mathcal{G}}\mathbb{E}\Sigma_{\check{k}\in\hat{\mathcal{G}}}|\Omega[\check{k}]|^2 \quad (1.22)$$

$$\left\{\log\left[1 + \frac{M_{rx}^2|\beta_{0,k}|^2 E^{(r)}E^{(d)}\left[\sum_{\check{k}\in\hat{\mathcal{G}}}|\Omega[\check{k}]|^2\right]^2}{\mathbb{E}\{|I_k|^2 + |Z_k|^2|\sum_{\check{k}\in\hat{\mathcal{G}}}|\Omega[\check{k}]|^2\}}\right]\right\} \overset{(2)}{\approx}$$

$$\frac{1}{K}\sum_{k\in\mathcal{K}\setminus\mathcal{G}}(\log[\mathbb{E}\{|I_k|^2+|Z_k|^2\}+M_{rx}^2|\beta_{0,k}|^2 E^{(r)}E^{(d)}\mu(\hat{g})^2] - \log[\mathbb{E}\{|I_k|^2+|Z_k|^2\}]) \overset{(3)}{\geq}$$

$$\frac{1}{K}\sum_{k\in\mathcal{K}\setminus\mathcal{G}}\log[1+\gamma_k^{LB}(\beta)] \triangleq C_{approx}(\beta)$$

where $\overset{(1)}{\geq}$ is obtained by assuming $I_k, Z_k$ to be Gaussian distributed and using the expression for ergodic capacity (A. Goldsmith and P. Varaiya, "Capacity of fading channels with channel side information," IEEE Transactions on Information Theory, vol. 43, no. 6, pp. 1986-1992, 1997), $\overset{(2)}{\approx}$ follows by sending the outer expectation into the log(·) functions and $\overset{(3)}{\geq}$ follows from (1.14), (1.16b) and (1.19). While $\overset{(2)}{\approx}$ is an approximation, it typically yields a lower bound since $\text{Variance}\{\Sigma_{\check{k}\in\hat{\mathcal{G}}}|\Omega[\check{k}]|^2\}\leq\mu(0,\hat{g})[1-\mu(0,\hat{g})]\ll\mu(0,\hat{g})^2$ (from (1.9a) and (R. Bhatia and C. Davis, "A better bound on the variance," The American Mathematical Monthly, vol. 107, p. 353, April 2000).

Note that for demodulating $x_k$'s and achieving the above SINR and capacity, the RX requires estimates of $N_0$ and the SISO channel fading coefficients $\beta$ and $\Sigma_{k \in \hat{\mathcal{G}}} |\Omega[\dot{k}]|^2$. Since the RX has a good beamforming gain (1.21), the channel parameters $\beta$, $N_0$ can be tracked accurately at the RX with a low estimation overhead using pilot symbols and blanked symbols. These values, along with phase-noise parameter $\sigma_\theta$, can further be fed back to the TX for rate and power allocation. Note that since these pilots are only used to estimate the SISO channel parameters and not the actual MIMO channel, the advantages of simplified CE are still applicable for a CACE based RX. On the other hand, the low variance albeit fast varying component $\Sigma_{k \in \hat{\mathcal{G}}} |\Omega[\dot{k}]|^2$ can be estimated for every symbol using the 0-th sub-carrier output $Y_0$. It can be shown from (1.12) that $Y_0 = M_{rx} \beta_{0,0} E^{(r)} \Sigma_{k \in \hat{\mathcal{G}}} |\Omega[\dot{k}]|^2 + I_0 + M_{rx} |\hat{\mathcal{G}}| N_0 + Z_0$, where we have $\mathbb{E}\{|I_0|^2\} \leq \mathbb{E}\{|I_k|^2\}$ and $\mathbb{E}\{|Z_0|^2\} \leq 2 \mathbb{E}\{|Z_k|^2\}$ for any $k \in \mathcal{K} \setminus \mathcal{G}$. Thus $\Sigma_{k \in \hat{\mathcal{G}}} |\Omega[\dot{k}]|^2$ can be estimated from $Y_0$ with an $$SINR \geq \frac{E^r \gamma_k^{LB}(\beta)}{2E_{(d)}},$$

which is usually a large value.

A. Optimizing System Parameters

From (1.22), note that the approximate ergodic capacity $C_{approx}(\beta)$ is a decreasing function of g for $g \geq 2\hat{g}$. Thus a $C_{approx}(\beta)$ maximizing choice of g should satisfy $g = 2\hat{g}$. From (1.22) and (1.21), we can also lower bound $C_{approx}(\beta)$ as:

$$C_{approx}(\beta) \stackrel{(1)}{\geq} \frac{1}{K} \sum_{k \in \mathcal{K} \setminus \mathcal{G}} \log(|\beta_{0,k}|^2) + \frac{K - |\mathcal{G}|}{K} \log[\Xi(\beta)], \quad (1.23a)$$

where:

$$\Xi(\beta) \stackrel{(2)}{=} \frac{M_{rx} E^{(r)} E^{(d)} \mu(0, \hat{g})^2}{M_{rx} |\beta_{max}|^2 E^{(r)} \left(\frac{E_s}{K - |\mathcal{G}|}\right) \mu(0, \hat{g})[1 - \mu(0, \hat{g})] + \beta_{max} N_0 (E^{(r)} + |\hat{\mathcal{G}}| E^{(d)}) + |\hat{\mathcal{G}}| N_0^2}, \quad (1.23b)$$

(1)
$\geq$ follows from the fact that $\log(1 + \gamma_k^{LB}(\beta)) \geq \log(\gamma_k^{LB}(\beta))$ and by taking the summation over k in (1.22) into the denominator of the logarithm; and $\stackrel{(2)}{=}$ follows from the fact that $\Sigma_{k \in \mathcal{K} \setminus \mathcal{G}} \tilde{\mu}(k, \hat{g}) \leq \Sigma_{k \in \mathcal{K} \setminus \mathcal{G}} \mu(0, \hat{g}) \Delta_{k,k}$ and $E^{(d)}(K - |\mathcal{G}|) + E^{(r)} = E_s$. It can be verified that the numerator of $\Theta(\beta)$ is a differentiable, strictly concave function of $E^{(r)}$, while the denominator is a positive, affine function of $E^{(r)}$. Thus $\Theta(\beta)$ is a strictly pseudo-concave function of $E^{(r)}$ (S. Schaible, "Fractional programming," Zeitschrift für Operations Research, vol. 27, pp. 39-54, dec 1983), and the $C_{approx}(\beta)$ maximizing power allocation can be obtained by setting $$\frac{d\Xi(\beta)}{dE^{(r)}} = 0$$

as:

$$E_{opt}^{(r)} = E_s \frac{\sqrt{R^2 + QR} - R}{Q} \quad (1.24)$$

where $Q = M_{rx} |\beta_{max}|^2 [1 - \mu(0, \hat{g})] \mu(0, \hat{g}) E_s + \beta_{max} N_0 (K - |\hat{\mathcal{G}}| - |\mathcal{G}|)$ and $R = N_0 |\hat{\mathcal{G}}| [\beta_{max} + N_0 (K - |\mathcal{G}|) / E_s]$. As evident from (1.23b), $\hat{g}$ offers a trade-off between the phase-noise induced ICI and channel noise accumulation. While finding a closed form expression for (1.23b) maximizing $\hat{g}$ is intractable, it can be computed numerically by performing a simple line search over $1 \leq \hat{g} \leq \min\{K_1, K_2\}/2$, with $g = 2\hat{g}$ and $E^{(r)}$ as given by (1.24).

V. Initial Access, TX Beamforming and Uplink Beamforming

In this section we briefly discuss stages (i) and (ii) of downlink transmission (see Section 2), and uplink TX beamforming for CACE aided UEs. In the suggested IA protocol for stage (i), the BS performs beam sweeping along different angular directions, possibly with different beam widths, similar to the approach of 3GPP New Radio (NR). For each TX beam, the BS transmits primary (PSS) and secondary synchronization sequences (SSS) with the reference signal, in a form similar to (1.1). The UEs use CACE aided RX beamforming, and initiate uplink random access to the BS upon successfully detecting a PSS/SSS. As shall be shown in Section VI, the SINR expression (1.21) is resilient to frequency mismatches between TX and RX oscillators, and thus is also applicable for the PSS/SSSs where frequency synchronization may not exist. Since angular beam-sweeping is only performed at the BS, the IA latency does not scale with $M_{rx}$ and yet the PSS/SSS symbols can exploit the RX beamforming gain, thus improving cell discovery radius and/or reducing IA overhead. This is in contrast to digital CE at the UE, which would require sweeping through many RX beam directions for each TX direction, necessitating several repetitions of the PSS/SSS for each TX beam. During downlink stage (ii), note that scheduling of UEs, designing TX beamformer and allocation of power requires knowledge of $\{|\alpha_\ell|, a_{rx}(\ell)\}$ for all the UEs. Such rCSI can be acquired at the BS either by downlink CE with CSI feedback from the UEs or by uplink CE. The protocol for downlink CE with feedback is similar to the IA protocol, with the BS transmitting pilot symbols instead of PSS and SSS. Uplink CE can be performed by transmitting orthogonal pilots from the UEs omni-directionally, and using any of the digital CE algorithms from Section I at the BS. Note that CACE cannot be used at the BS since the pilots from multiple UEs need to be separated via digital processing.

Note that the phase shifts used for RX beamforming at a CACE aided UE in downlink, can also be used for transmit beamforming in the uplink. However since the reference signal is not available at the UE during uplink transmission in time division duplexing systems, a mechanism for locking these phase shift values from a previous downlink transmission stage is required (similar to (V. V. Ratnam and A. F. Molisch, "Periodic analog channel estimation aided beamforming for massive MIMO systems," IEEE Transactions on Wireless Communications, 2019, accepted to)). In contrast, frequency division duplexing can avoid such a mechanism due to continuous availability of the downlink reference, and consequently $\hat{s}_{rx,BB}(t)$.

VI. Simulation Results

For the simulations, we consider a single cell scenario with a λ/2-spaced 32×8 ($M_{tx}$=256) antenna BS and one representative UE with a λ/2-spaced 16×4 ($M_{rx}$=64) antenna array, having perfect timing synchronization to the BS, one down-conversion chain, and using CACE aided beamforming. The BS has apriori rCSI and transmits one spatial OFDM data stream with $T_s$=1 μs, $K_1$=$K_2$+1=512 and $f_c$=30 GHz along the strongest MPC, i.e., $t=a_{tx}(l)$ for $l$=argmax $x_\ell\{|\alpha_\ell|\}$. The UE oscillator has Wiener phase-noise with variance $\sigma_\theta^2$ known both to the BS and UE. The UE also has perfect knowledge of β, $N_0$ and $\Sigma_{k\in\mathcal{G}}|\Omega[k]|^2$.

For testing the validity of the analytical results, we first consider a sample sparse channel matrix H(t) with L=3, $\tau_\ell$={0,20,40}ns, angles of arrival $\psi_{azi}^{rx}$={0, π/6, −π/6}, $\psi_{ele}^{rx}$={0.45π, π/2, π/2} and effective amplitudes $$\frac{\alpha_\ell a_{tx}(\ell)^\dagger t}{\sqrt{\beta_{max}}} = \{\sqrt{0.6}, -\sqrt{0.3}, \sqrt{0.1}\}.$$

Figure 8:
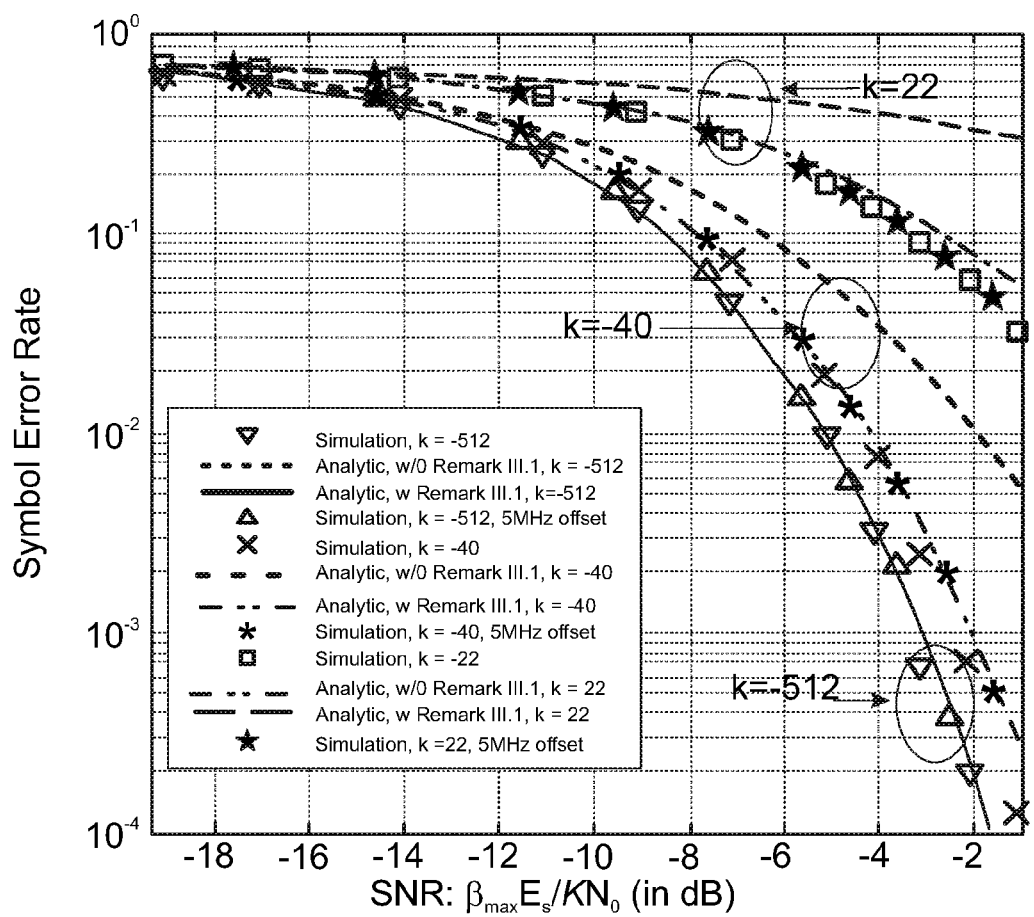
FIG. 8: Comparison of analytical SERs (from (1.28) with/without Remark 3.1) to simulated results, for different sub-carriers of a CACE receiver with Quadrature Phase Shift Keying. Simulations consider $\sigma_\theta^2=1/T_s$ (−93 dBc at 10 MHz offset), mean RX oscillator frequency of $f_c$ and $f_c+5$ MHz, and are obtained by averaging over $10^6$ realizations.
Figure 9:
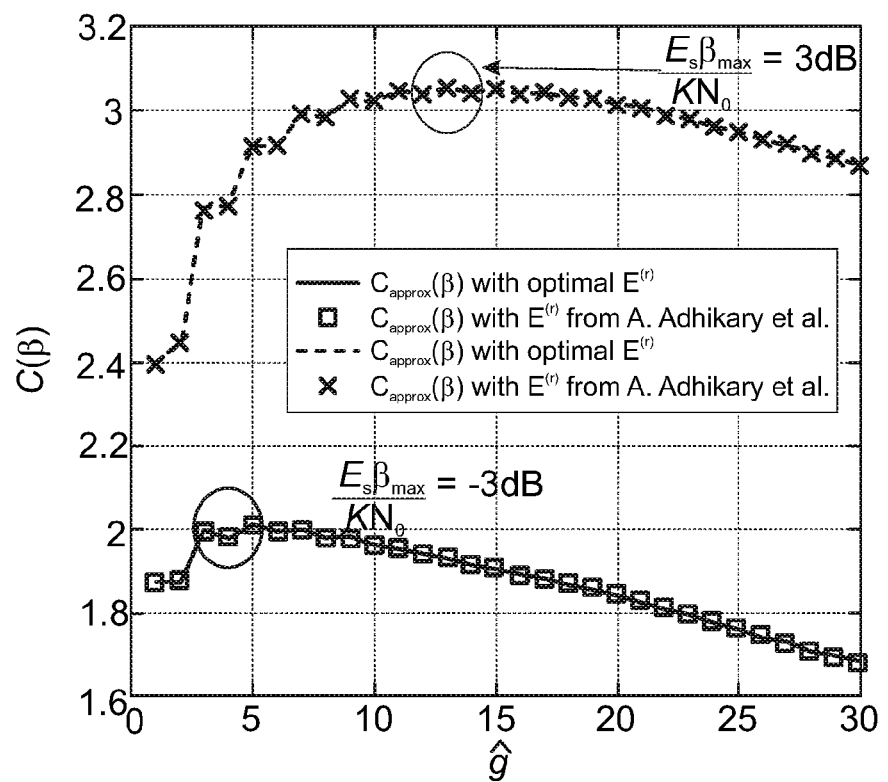
FIG. 9: Comparison of approximate capacity (from (29)) versus $\hat{g}$, with optimal choice of $E^{(r)}$ and $E^{(r)}$ chosen via (32), respectively, for $\sigma_\theta^2=1/T_s$ and $\beta_{max}E_s/KN_0=-3,3$ dB.

The UE uses $\hat{g}$=g/2=10, $\sigma_\theta^2$=1/$T_s$ and $E^{(r)}$, $E^{(d)}$ from (1.24). For this model, the symbol error rates (SERs) for the sub-carriers, obtained by Monte-Carlo simulations, are compared to the analytical SERs for a Gaussian channel with SINR given by (1.21) (with/without Remark 3.1) in FIG. 8. For the Monte-Carlo results, we use truncated sinc filters: $LPF_{\hat{g}}(t)$=sin($2\pi\hat{g}t/T_s$)/(πt) for $|t|\leq 2T_s/\hat{g}$. As observed from the results and also mentioned in Section III-B, the use of Remark 3.1 in (1.21) provides a tight SINR bound even for small |k|. We also observe that the SER for k=22 ($\approx\hat{g}$) is high due to the interference caused from the high power reference signal. However this interference diminishes very quickly with k, as evident from the SER for k=−40. While the mean RX oscillator frequency was assumed to be perfectly matched to the TX oscillator for the analytical results (see Section II), we also plot in FIG. 8 the case with a 5 MHz frequency mismatch. Results show a negligible degradation in performance, suggesting that the CACE design is resilient to frequency mismatches smaller than the filter bandwidth of $LPF_{\hat{g}}$. Due to the accuracy of the bounds in FIG. 8 and for computational tractability, we shall henceforth use (1.21) and (1.22) to quantify performance of CACE in the rest of the section. We next plot the $C_{approx}(\beta)$ from (1.24) as a function of $\hat{g}$ in FIG. 9, with (a) $C_{approx}(\beta)$ maximizing $E^{(r)}$ (obtained by exhaustive search over $0 \leq E^r \leq E_s$) and (b) $E^r$ chosen from (1.24), respectively. As observed from the results, the curves are very close, suggesting the accuracy of the power allocation in (1.24). While the poor system performance at lower $\hat{g}$ is due to phase-noise induced IC1, the poor performance at high $\hat{g}$ is due to noise accumulation and spectral efficiency reduction. We also note that the optimal $\hat{g}$ increases with SNR.

Figure 10A:
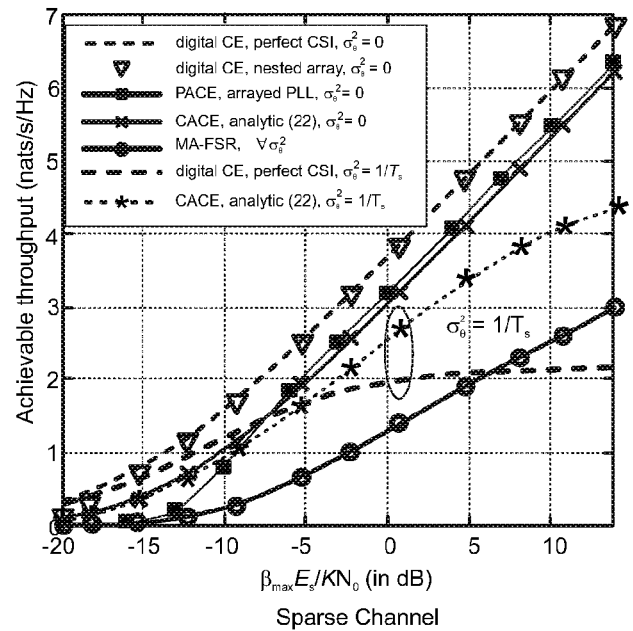
FIGS. 10A and 10B: Throughput of ACE schemes (PACE, CACE, MA-FSR) and of digital CE with either perfect rCSI or nested array sampling versus SNR and L. For PACE, the arrayed PLL from [51 V. V. Ratnam and A. F. Molisch, "Periodic analog channel estimation aided beamforming for massive MIMO systems," IEEE Transactions on Wireless Communications, 2019 . . . ] is used with identical parameters, and RX beamformer design phase lasts 6 symbols. For nested array sampling, horizontal(4,4) and vertical (2,2) nested arrays are used. A) sparse channels B) dense stochastic channels.

FIG. 10A compares the achievable throughput for beamforming with digital CE and different ACE schemes: CACE, PACE (V. V. Ratnam and A. F. Molisch, "Periodic analog channel estimation aided beamforming for massive MIMO systems," *IEEE Transactions on Wireless Communications,* 2019, accepted), MA-FSR (V. V. Ratnam and A. Molisch, "Multi-antenna FSR receivers: Low complexity, non-coherent, massive antenna receivers," in IEEE Global Communications Conference (GLOBECOM), December 2018), respectively for the sparse channel defined above. For digital CE, the RX beamformer is aligned with the largest eigenvector of the effective RX correlation matrix $$R_{rx}(t) = \frac{1}{K}\sum_{k\in\mathcal{K}}\mathcal{H}(f_k)^\dagger tt^\dagger \mathcal{H}(f_k)^\dagger$$

Figure 10B:
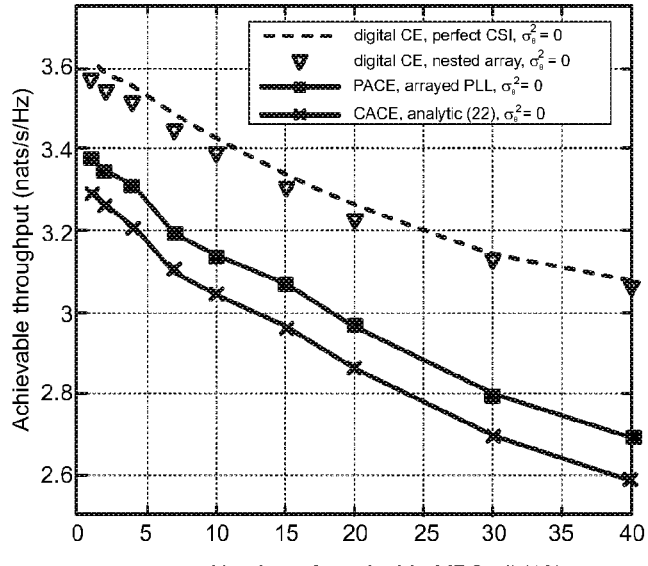

(P. Sudarshan, N. Mehta, A. Molisch, and J. Zhang, "Channel statistics-based RF pre-processing with antenna selection," IEEE Transactions on Wireless Communications, vol. 5, pp. 3501-3511, December 2006), which in turn is either (a) known apriori at BS or (b) is estimated by nested array based sampling (P. Pal and P. P. Vaidyanathan, "Nested arrays: A novel approach to array processing with enhanced degrees of freedom," IEEE Transactions on Signal Processing, vol. 58, pp. 4167-4181, August 2010). To decouple the loss in beamforming gain due to CE errors from loss due to phase-noise, we assume $\sigma_\theta\approx 0$. As is evident from FIG. 10A, PACE and CACE suffer only a ≤2 dB beamforming loss in compared to digital CE in sparse channels and above a threshold SNR. While CACE performs marginally worse than PACE at high SNR due to continuous transmission of the reference, unlike PACE it does not suffer from carrier recovery losses at low SNR. While MA-FSR performs poorly due to low bandwidth efficiency, it requires much simpler hardware then all other schemes. To demonstrate the phase-noise suppressing capability of CACE (and MA-FSR), we also plot the throughput of CACE (with optimal $\hat{g}$) and digital CE, with $\sigma_\theta^2$=1/$T_s$ and without any additional phase-noise mitigation. As is evident from the results, both CACE and MA-FSR aid in mitigating oscillator phase-noise in addition to enabling RX beamforming. To study the impact of more realistic channels and number of MPCs, we also consider a rich scattering stochastic channel in FIG. 10B, having L/10 resolvable MPCs and 10 sub-paths per resolvable MPC. All channel parameters are generated according to the 3GPP TR38.900 Rel 14 channel model (UMi NLoS scenario)(TR38.900, "Study on channel model for frequency spectrum above 6 GHz (release 14)," Tech. Rep. V14.3.1, 3GPP, 2017), with the resolvable MPCs and sub-paths modeled as clusters and rays, respectively. However to model the sub-paths of each MPC as unresolvable, we use an intra-cluster delay spread of 1 ns and an intra-cluster angle spread of π/50 (for all elevation, azimuth, arrival and departure). As observed, the loss in beamforming gain with L is only slightly higher for ACE schemes than digital CE.

Note that the throughputs in FIG. 10 do not include the CE overhead for PACE and digital CE. While nested array digital CE requires 21 dedicated pilot symbols ($\approx 2\sqrt{M_{rx}}$) for updating RX beamformer, PACE requires 6 symbols (O(1)) and CACE, MA-FSR only require a continuous reference tone. The corresponding overhead reduction can be significant when downlink CE with CSI feedback is used for rCSI acquisition at the BS (see Section V). For example, with exhaustive beam-scanning (C. Jeong, J. Park, and H. Yu, "Random access in millimeter-wave beamforming cellular networks: issues and approaches," IEEE Communications Magazine, vol. 53, pp. 180-185, January 2015) at the BS and an rCSI coherence time of 10 ms, the BS rCSI acquisition overhead reduces from 40% for nested array digital CE to 11% for PACE and $\approx|\mathcal{G}|/K$<5% for CACE.

VII. Conclusions

This paper proposes the use of a novel CE technique called CACE for designing the RX beamformer in massive MIMO systems. In CACE, a reference tone is transmitted along with the data signals. At each RX antenna, the received signal is converted to baseband, the reference component is isolated, and is used to control the analog phase-shifter through which the data component is processed. The resulting baseband phase-shifted signals from all the antennas are then added, and fed to the down-conversion chain. This emulates using the received signal for reference as a matched filter for data, and enables both RX beamforming and phase-noise cancellation. The performance analysis suggests that in sparse channels and for $\hat{g} \gg 1$, the SINR with CACE scales linearly with $M_{rx}$. The analysis and simulations also show that $\hat{g}$ yields a trade-off between phase-noise induced ICI and noise accumulation. Simulations suggest that CACE suffers only a small degradation in beamforming gain in comparison to digital CE based beamforming in sparse channels, and is resilient to TX-RX oscillator frequency mismatch. In comparison to other ACE schemes, CACE performs marginally worse than PACE at high SNR but performs much better at lower SNR. It also performs much better than MA-FSR, albeit at a higher RX hardware complexity. Finally, CACE also provides phase-noise suppression unlike most other CE schemes. The CE overhead reduction with CACE is significant, especially when downlink CE with feedback is required. The IA latency reduction with CACE aided beamforming is also discussed. While baseband phase shifters are sufficient for a CACE based RX unlike in conventional analog beamforming, $2M_{rx}$ mixers may be required for the baseband conversion at the RX; thus adding to the hardware cost.

APPENDIX 1.A

Proof of Lemma \refLemma_PN_properties. Note that from the definition of $\Omega[k]$, we have $$e^{-j\theta[n]} \xrightarrow{\mathcal{F}} \Omega[K] \text{ and } e^{j\theta[n]} \xrightarrow{\mathcal{F}} \Omega^*[-k],$$

where $\mathcal{F}$ represents the nDFT Operation. Then using convolution property of the nDFT, we have:

$$e^{-j\theta[n]} e^{j\theta[n]} \xrightarrow{\mathcal{F}} \sum_{a \in \mathcal{K}} \Omega[a]\Omega^*[a+k] \Rightarrow 1 \xrightarrow{\mathcal{F}} \sum_{a \in \mathcal{K}} \Omega[a]\Omega^*[a+k] \Rightarrow \delta_{0,k}^K = \sum_{a \in \mathcal{K}} \Omega[a]\Omega^*[a+k]$$

which proves property (1.9a). Property (1.9b) can be obtained as follows:

$$\Delta_{k_1,k_2} \triangleq \mathbb{E}\{\Omega[k_1]\Omega[k_2]^*\} = \frac{1}{K^2} \sum_{\tilde{n},\tilde{\tilde{n}}=0}^{K-1} \mathbb{E}\{e^{-j[\theta[\tilde{n}]-\theta[\tilde{\tilde{n}}]]}\}e^{-j2\pi\frac{[k_1\tilde{n}-k_2\tilde{\tilde{n}}]}{K}} \stackrel{(1)}{=}$$

$$\frac{1}{K^2} \sum_{\tilde{n},\tilde{\tilde{n}}=0}^{K-1} e^{-\frac{\sigma_\theta^2|\tilde{n}-\tilde{\tilde{n}}|T_s}{2K}} e^{-j2\pi\frac{[k_1\tilde{n}-k_2\tilde{\tilde{n}}]}{K}} \stackrel{(2)}{=}$$

$$\frac{1}{K^2} \sum_{\tilde{n}=0}^{K-1} \sum_{u=-\tilde{n}}^{K-1-\tilde{n}} e^{-\frac{\sigma_\theta^2|u|T_s}{2K}} e^{-j2\pi\frac{[k_1u+(k_1-k_2)\tilde{n}]}{K}} \stackrel{(3)}{\approx}$$

$$\frac{1}{K^2} \sum_{\tilde{n}=0}^{K-1} \sum_{u=-K/2}^{K/2-1} e^{-\frac{\sigma_\theta^2|u|T_s}{2K}} e^{-j2\pi\frac{[k_1u+(k_1-k_2)\tilde{n}]}{K}} \stackrel{(4)}{=}$$

-continued $$\frac{\delta_{k_1,k_2}^K}{K}\left[\frac{1-e^{-\left(\frac{\sigma_\theta^2 T_s - j4\pi k_1}{4}\right)}}{e^{-\frac{\sigma_\theta^2 T_s - j4\pi k_1}{2K}} - 1} + \frac{1-e^{-\left(\frac{\sigma_\theta^2 T_s + j4\pi k_1}{4}\right)}}{1-e^{-\frac{\sigma_\theta^2 T_s + j4\pi k_1}{2K}}}\right]$$

where $\stackrel{(1)}{=}$ follows by using the expression for the characteristic function of the Gaussian random variable $\theta[\tilde{n}]-\theta[\tilde{\tilde{n}}]$; $\stackrel{(2)}{=}$ follows by defining $u = \tilde{n} - \tilde{\tilde{n}}$ and $\stackrel{(3)}{\approx}$ follows by changing the inner summation limits which is accurate for $\sigma_\theta^2 T_s \gg 1$ and $\stackrel{(4)}{=}$ follows from the expression for the sum of a geometric series.

APPENDIX 1B

Proof of Lemma \refLemma_N_properties. Note that each component of $\tilde{w}(t)$ is independent and identically distributed as a circularly symmetric Gaussian random process. Hence its nDFT coefficients, obtained as $$W[k] = \frac{1}{K}\sum_{n=0}^{K-1} \tilde{w}(nT_s/K) e^{-j2\pi\frac{kn}{K}}$$

are also jointly Gaussian and circularly symmetric. For these coefficients at RX antennas a, b we obtain:

$$\mathbb{E}\{W_a[k_1]W_b[k_2]\} = \tag{1.26}$$

$$\frac{1}{K^2} \sum_{n_1,n_2=1}^{K} \mathbb{E}\{\tilde{w}_a(n_1T_s/K)\tilde{w}_b(n_2T_s/K)\} e^{-j2\pi\frac{k_1n_1+k_2n_2}{K}} = 0$$

$$\mathbb{E}\{W_a[k_1]W_b^*[k_2]\} =$$

$$\frac{1}{K^2} \sum_{n_1,n_2=1}^{K} \mathbb{E}\{\tilde{w}_a(n_1T_s/K)\tilde{w}_b(n_2T_s/K)^*\} e^{-j2\pi\frac{k_1n_1-k_2n_2}{K}} =$$

$$\frac{\delta_{a,b}^\infty}{K^2} \sum_{n_1,n_2=1}^{K} R_{\tilde{w}}([n_1-n_2]T_s/K) e^{-j2\pi\frac{k_1n_1-k_2n_2}{K}} = \delta_{a,b}^\infty \delta_{k_1,k_2}^K N_0/T_s$$

where we use the auto-correlation function of the channel noise at any RX antenna as: $R_{\tilde{w}}(t) = N_0 \sin(\pi K t/T_s)\exp\{-j\pi(K_1-K_2)t/T_s\}/\pi t$.

APPENDIX 1C

Here we model the RX phase-noise $\theta(t)$ as a zero mean Ornstein-Uhlenbeck (OU) process (J. L. Doob, "The brownian movement and stochastic equations," The Annals of Mathematics, vol. 43, p. 351, April 1942), which is representative of the output of a type-1 phase-locked loop with a linear phase detector (A. Viterbi, Principles of coherent communication. McGraw-Hill series in systems science, McGraw-Hill, 1966; D. Petrovic, W. Rave, and G. Fettweis, "Effects of phase noise on OFDM systems with and without PLL: Characterization and compensation," IEEE Transactions on Communications, vol. 55, pp. 1607-1616, August 2007; A. Mehrotra, "Noise analysis of phase-locked loops," IEEE Transactions on Circuits and Systems I: Fundamental Theory and Applications, vol. 49, pp. 1309-1316, September 2002). For such a model, $\theta(t)$ satisfies:

$$\frac{d\theta(t)}{dt} = -\eta_\theta \theta(t) + \sigma_\theta w_\theta(t) \quad (1.27)$$

where, $w_\theta(t)$ is a standard real white Gaussian process, and $\eta_\theta$, $\sigma_\theta$ are system parameters. From (6) it can be shown that $\theta(t)$ is a stationary Gaussian process (in steady state), with an auto-correlation function given by:

$$R_\theta(\tau) = \mathbb{E}\{\theta(t)\theta(t+\tau)\} = \frac{\sigma_\theta^2}{2\eta_\theta} e^{-\eta_\theta |\tau|}$$

(D. Petrovic, W. Rave, and G. Fettweis, "Effects of phase noise on OFDM systems with and without PLL: Characterization and compensation," *IEEE Transactions on Communications*, vol. 55, pp. 1607-1616, August 2007).

Lemma 10.1 For phase-noise modeled as an OU process we have:

$$\sum_{k \in \mathcal{K}} \Omega[k]\Omega[k+k_1]^* = \delta_{0,k_1}^K, \quad (1.28b)$$

$$\Delta_{k_1,k_2} \triangleq \mathbb{E}\{\Omega[k_1]\Omega[k_2]^*\} \approx \frac{\delta_{k_1,k_2}^K e^{-R_\theta[0]}}{K} \sum_{u=-\lfloor K/2 \rfloor}^{\lfloor (K-1)/2 \rfloor} e^{R_\theta[u]} e^{-j2\pi \frac{k_1 u}{K}} \quad (1.28b)$$

for arbitrary integers $k_1$, $k_2$, where $\delta_{a,b}^K = 1$ if a=b (mod K) or $\delta_{a,b}^K = 0$ otherwise, and $$R_\theta[n] \triangleq \mathbb{E}\{\theta[\dot{n}]\theta[\dot{n}+n]\} = \frac{\sigma_\theta^2}{2\eta_\theta} e^{-\eta_\theta |nT_s/K|}.$$

Proof of Lemma \refLemma_OU_PN_properties. Note that from the definition of $\Omega[k]$, we have $$e^{-j\theta[n]} \xrightarrow{\mathcal{F}} \Omega[k] \text{ and}$$

$$e^{j\theta[n]} \xrightarrow{\mathcal{F}} \Omega^*[-k],$$

where $\mathcal{F}$ represents the nDFT Operation. Then using convolution property of the nDFT, we have:

$$e^{-j\theta[n]} e^{j\theta[n]} \xrightarrow{\mathcal{F}} \sum_{a \in \mathcal{K}} \Omega[a]\Omega^*[a+k] \Rightarrow 1 \xrightarrow{\mathcal{F}} \sum_{a \in \mathcal{K}} \Omega[a]\Omega^*[a+k] \Rightarrow \delta_{0,k}^K = \sum_{a \in \mathcal{K}} \Omega[a]\Omega^*[a+k]$$

which proves property (1.9a). Property (1.9b) can be obtained as follows:

$$\Delta_{k_1,k_2} \triangleq \mathbb{E}\{\Omega[k_1]\Omega[k_2]^*\} = \frac{1}{K^2} \sum_{\dot{n},\ddot{n}=0}^{K-1} \mathbb{E}\{e^{-j(\theta[\dot{n}]-\theta[\ddot{n}])}\} e^{-j2\pi \frac{[k_1\dot{n}-k_2\ddot{n}]}{K}} \overset{(1)}{=} \quad (1.29)$$

$$\frac{1}{K^2} \sum_{\dot{n},\ddot{n}=0}^{K-1} e^{-R_\theta[0]+R_\theta[\dot{n}-\ddot{n}]} e^{-j2\pi \frac{[k_1\dot{n}-k_2\ddot{n}]}{K}} \overset{(2)}{=}$$

$$\frac{1}{K^2} \sum_{\ddot{n}=0}^{K-1} \sum_{u=-\ddot{n}}^{K-1-\ddot{n}} e^{-R_\theta[0]+R_\theta[u]} e^{-j2\pi \frac{[k_1 u+(k_1-k_2)\ddot{n}]}{K}} \overset{(3)}{\approx}$$

$$\frac{1}{K^2} \sum_{\ddot{n}=0}^{K-1} \sum_{u=-\lfloor K/2 \rfloor}^{\lfloor (K-1)/2 \rfloor} e^{-R_\theta[0]+R_\theta[u]} e^{-j2\pi \frac{[k_1 u+(k_1-k_2)\ddot{n}]}{K}} =$$

$$\frac{\delta_{k_1,k_2}^K e^{-R_\theta[0]}}{K} \sum_{u=-\lfloor K/2 \rfloor}^{\lfloor (K-1)/2 \rfloor} e^{R_\theta[u]} e^{-j2\pi \frac{k_1 u}{K}}$$

where $\overset{(1)}{=}$ follows by using the expression for the characteristic function of the Gaussian random variable $\theta[\dot{n}] - \theta[\ddot{n}]$; $\overset{(2)}{=}$ follows by defining $u = \dot{n} - \ddot{n}$ and $\overset{(3)}{\approx}$ follows by using the fact that $R_\theta[u]$ has a limited support around u=0 and hence $R_\theta[u] \approx R_\theta[u-K] \approx 0$ for $u > (K-1)/2$. Note that since $e^{-R_\theta[0]+R_\theta[u]}$ is an auto-correlation function, its nDFT is non-negative, thus ensuring that $\Delta_{k_1,k_1} \geq 0$ in (1.29).

2. Periodic Analog Channel Estimation Aided Beamforming for Massive MIMO Systems I. Introduction In the present embodiment, a novel ACE scheme, referred to as periodic ACE (PACE) is provided. In this embodiment, the reference is transmitted judiciously, and its amplitude and phase are explicitly estimated to drive an RX phase shifter array. In contrast to CACE, PACE requires one carrier recovery circuit and $M_{rx}$ phase shifters (see FIG. 3) and can support both homo/heter-dyne reception. In PACE, the TX transmits a reference tone at a known frequency during each periodic RX beamformer update phase. One carrier recovery circuit, involving phase-locked loops (PLLs), is used to recover the reference tone from one or more antennas, as shown in FIG. 3. This recovered reference tone, and its quadrature component, are then used to estimate the phase off-set and amplitude of the received reference tone at each RX antenna, via a bank of 'filter, sample and hold' circuits (represented as integrators in FIG. 1). As shall be shown, these estimates are proportional to the channel response at the reference frequency. These estimates are used to control an array of variable gain phase-shifters, which generate the RX analog beam. During the data transmission phase, the wide-band received data signals pass through these phase-shifters, are summed and processed similar to conventional analog beamforming. As the phase and amplitude estimation is done in the analog domain, O(1) pilots are sufficient to update the RX beamformer. Additionally, the power from multiple channel MPCs is accumulated by this approach, increasing the system diversity against MPC blocking. Furthermore, the same variable gain phase-shifts can also be used for transmit beamforming on the reverse link. Finally, by providing an option for digitally controlling the inputs to the phase-shifters, the proposed architecture can also support conventional beamforming approaches.

On the flip side, PACE requires some additional analog hardware components, such as mixers and filters, in comparison to conventional digital CE. Additionally, the accumulation of power from multiple MPCs may cause frequency selective fading in a wide-band scenario, which can degrade performance. Finally, the proposed approach in its current suggested form does not support reception of multiple spatial data streams and can only be used for beamforming at one end of a communication link. This architecture is therefore more suitable for use at the user equipment (UEs). The possible extensions to multiple spatial stream reception shall be explored in future work. While the proposed architecture is also applicable in narrow-band scenarios, in this paper we shall focus on the analysis of a wide-band scenario where the repetition interval of PACE and beamformer update is of the order of aCSI coherence time, i.e. time over which the aCSI stays approximately constant (also called stationarity time in some literature). The contributions of the present embodiment include:

1. The development of a novel transmission technique, namely PACE, and a corresponding RX architecture that enable RX analog beamforming with low CE overhead.

2. To enable the RX operation, two novel reference recovery circuits are explored. These circuits are non-linear, making their analysis non-trivial. We provide an approximate analysis of their phase-noise and the resulting performance that is tight in the high SNR regime.

3. The achievable system throughput with PACE aided beamforming in a wide-band channel is analytically characterized.

4. Simulations with practically relevant channel models are used to support the analytical results and compare performance to existing schemes.

Notation: scalars are represented by light-case letters; vectors by bold-case letters; and sets by calligraphic letters. Additionally, $j=\sqrt{-1}$, a* is the complex conjugate of a complex scalar a, |a| represents the $\ell_2$-norm of a vector a and $A^\dagger$ is the conjugate transpose of a complex matrix A. Finally, $\mathbb{E}\{\}$ represents the expectation operator, $\otimes$ represents the Kronecker product, $\stackrel{d}{=}$ represents equality in distribution, $\mathrm{Re}\{\cdot\}/\mathrm{Im}\{\cdot\}$ refer to the real/imaginary component, respectively, $\mathcal{CN}(a,B)$ represents a circularly symmetric complex Gaussian vector with mean a and covariance matrix B, Exp{a} represents an exponential distribution with mean a and Uni{a, b} represents a uniform distribution in range [a, b].

II. PACE General Assumptions and System Model

We consider the downlink of a single-cell MIMO system, wherein one base station (BS) with $M_{tx}$ antennas transmits to several UEs with $M_{rx}$ antennas each. Since focus is on the downlink, we shall use abbreviations BS & TX and UE & RX interchangeably. Each UE is assumed to have one up/down-conversion chain, while no assumptions are made regarding the BS architecture.

Figure 11:
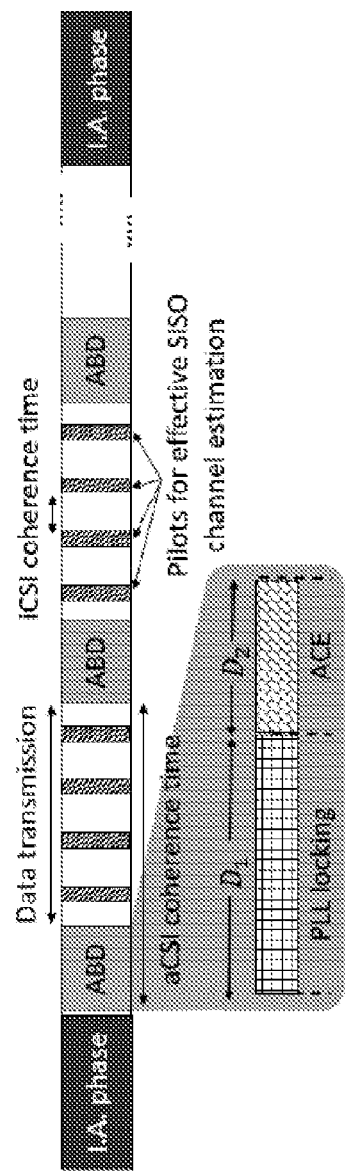
FIG. 11: An illustrative transmission block structure for the PACE scheme.

Here we assume the communication between the BS and UEs to involve three important phases: (i) initial access (IA)—where the BS and UEs find each other, timing/frequency synchronization is attained and spectral resources are allocated; (ii) analog beamformer design—where the BS and UEs obtain the required aCSI to update the analog precoding/combining beams; and (iii) data transmission. The relative time scale of these phases are illustrated in FIG. 11. Through most of this paper (Sections 2-4), we assume that the IA and beamformer design at the BS are already achieved, and we mainly focus on the beamformer design phase at the UE and the data transmission phase. Therefore we assume perfect timing and frequency synchronization between the BS and UE, and assume that the TX beamforming has been pre-designed based on aCSI at the BS. Later in Section V, we also briefly discuss how aCSI can be acquired at the BS, how IA can be performed and how the use of PACE can be advantageous in those phases.

The BS transmits one spatial data-stream to each scheduled UE, and all such scheduled UEs are served simultaneously via spatial multiplexing. Furthermore, the data to the UEs is assumed to be transmitted via orthogonal precoding beams, such that there is no inter-user interference. Under these assumptions and given transmit precoding beams and power allocation, we shall restrict the analysis to one representative UE without loss of generality. For convenience, we shall also assume the use of noise-less and perfectly linear antennas, filters, amplifiers and mixers at both the BS and UE. An analysis including the non-linear effects of these components is beyond the scope of this paper. The BS transmits orthogonal frequency division multiplexing (OFDM) symbols with K sub-carriers, indexed as $\mathcal{K}=\{-K_1, \ldots, K_2-1, K_2\}$ with $K_1+K_2+1=K$, to this representative UE. The BS transmits two kinds of symbols: reference symbols and data symbols. In a reference symbol, only a reference tone, i.e., a sinusoidal signal with a pre-determined frequency known both to the BS and UE, is transmitted on the 0-th subcarrier, and the remaining sub-carriers are all empty. On the other hand, in a data symbol all the K sub-carriers are used for data transmission. The purpose of the reference symbols is to aid PACE and beamformer design at the RX, as shall be explained later. Since the BS can afford an accurate oscillator, we shall assume that the BS suffers negligible phase noise. The $M_{tx} \times 1$ complex equivalent transmit signal for the 0-th symbol, if it is a reference or data symbol, respectively, can then be expressed as:

$$\tilde{s}_{tx}^{(r)}(t) = \sqrt{\frac{2}{T_{cs}}} t \sqrt{E^{(r)}} e^{j2\pi f_c t} \quad (2.1a)$$

$$\tilde{s}_{tx}^{(d)}(t) = \sqrt{\frac{2}{T_{cs}}} t \left[ \sum_{k \in \mathcal{K}} x_k^{(d)} e^{j2\pi f_k t} \right] e^{j2\pi f_c t}, \quad (2.1b)$$

for $-T_{cp} \leq t \leq T_s$, where t is the $M_{tx} \times 1$ unit-norm TX beamforming vector for this UE with |t|=1, $x_k^{(d)}$ is the data signal at the k-th OFDM sub-carrier, $j=\sqrt{-1}$, $f_c$ is the carrier/reference frequency, $f_k=k/T_s$ represents the frequency offset of the k-th sub-carrier, $T_{cs}=T_{cp}+T_s$ and $T_s$, $T_{cp}$ are the symbol duration and the cyclic prefix duration, respectively. Here we define the complex equivalent signal such that the actual (real) transmit signal is given by $s_{tx}^{(\cdot)}(t) = \mathrm{Re}\{\tilde{s}_{tx}(t)\}$. For the data symbols, we assume the use of Gaussian signaling with $E_k^{(d)} = \mathbb{E}\{|x_k|^2\}$, for each $k \in \mathcal{K}$. The total average transmit OFDM symbol energy (including cyclic prefix) allocated to the UE is defined as $E_{cs}$, where $E_{cs} \geq E^{(r)}$ and $E_{cs} \geq \sum_{k \in \mathcal{K}} E_k^{(d)}$. For convenience we also assume that $f_c$ is a multiple of $1/T_{cs}$, which ensures that the reference tone has the same initial phase in consecutive reference symbols. The channel to the representative UE is assumed to be sparse with L resolvable MPCs (L«$M_{tx}$, $M_{rx}$), and the corresponding $M_{rx} \times M_{tx}$ channel impulse response matrix is given as (M. Akdeniz, Y. Liu, M. Samimi, S. Sun, S. Rangan, T. Rappaport, and E. Erkip, "Millimeter wave channel modeling and cellular capacity evaluation," IEEE Journal on Selected Areas in Communications, vol. 32, pp. 1164-1179, June 2014):

$$H(t) = \sum_{\ell=0}^{L-1} \alpha_\ell \, a_{rx}(\ell) a_{tx}(\ell)^\dagger \delta(t - \tau_\ell), \quad (2.2)$$

where $\alpha_\ell$ is the complex amplitude and $\tau_\ell$ is the delay and $a_{tx}(\ell)$, $a_{rx}(\ell)$ are the TX and RX array response vectors, respectively, of the $\ell$-th MPC. As an illustration, the $\ell$-th RX array response vector for a uniform planar array with $M_H$ horizontal and $M_V$ vertical elements ($M_{rx}=M_H M_V$) is given by $a_{rx}(\ell) = \bar{a}_{rx}(\omega_{azi}^{rx}(\ell), \psi_{ele}^{rx}(\ell))$, where we define:

$$\bar{a}_{rx}(\psi_{azi}^{rx}, \psi_{ele}^{rx}) \triangleq \begin{bmatrix} 1 \\ e^{j2\pi \frac{\Delta_H \sin(\psi_{azi}^{rx}) \sin(\psi_{ele}^{rx})}{\lambda}} \\ e^{j2\pi \frac{\Delta_H (M_H-1)\sin(\psi_{azi}^{rx})\sin(\psi_{ele}^{rx})}{\lambda}} \end{bmatrix} \otimes \begin{bmatrix} 1 \\ e^{j2\pi \frac{\Delta_V \cos(\psi_{ele}^{rx})}{\lambda}} \\ e^{j2\pi \frac{\Delta_V (M_V-1)\cos(\psi_{ele}^{rx})}{\lambda}} \end{bmatrix}, \quad (2.3)$$

$\psi_{azi}^{rx}(\ell)$, $\psi_{ele}^{rx}(\ell)$ are azimuth and elevation angles of arrival for the $\ell$-th MPC, $\Delta_H$, $\Delta_V$ are the horizontal and vertical antenna spacings and A is the wavelength of the carrier signal. Expressions for $a_{tx}(\ell)$ can be obtained similarly. Note that in (2.2) we implicitly assume frequency-flat MPC amplitudes $\{\alpha_0, \ldots, \alpha_{L-1}\}$ and ignore beam squinting effects (S. K. Garakoui, E. A. M. Klumperink, B. Nauta, and F. E. van Vliet, "Phased-array antenna beam squinting related to frequency dependency of delay circuits," in European Microwave Conference, pp. 1304-1307, October 2011), which are reasonable assumptions for moderate system bandwidths. To prevent inter symbol interference, we also let the cyclic prefix be longer than the maximum channel delay: $T_{cp} > \tau_{L-1}$. To model a time varying channel, we treat $\{\alpha_\ell, a_{rx}(\ell), a_{tx}(\ell)\}$ as aCSI parameters, that remain constant within an aCSI coherence time and may change arbitrarily afterwards. However since the channel is more sensitive to delay variations, the MPC delays $\{\tau_0, \ldots, \tau_{L-1}\}$ are modeled as iCSI parameters that only remain constant within a shorter interval called the iCSI coherence time. Note that this time variation of delays is an equivalent representation of the Doppler spread experienced by the RX. Finally, we do not assume any distribution prior or side information on $\{\alpha_\ell, a_{rx}(\ell), a_{tx}(\ell), \tau_\ell\}$.

The RX front-end is assumed to have a low noise amplifier followed by a band-pass filter at each antenna element that leaves the desired signal un-distorted but suppresses the out-of-band noise. The $M_{rx} \times 1$ filtered complex equivalent received waveform for the 0-th symbol can then be expressed as:

$$\tilde{s}_{rx}^{(r)}(t) = \sum_{\ell=0}^{L-1} \alpha_\ell \, a_{rx}(\ell) a_{tx}(\ell)^\dagger \tilde{s}_{tx}^{(r)}(t - \tau_\ell) + \sqrt{2} \tilde{w}^{(r)}(t) e^{j2\pi f_c t} \quad (2.4)$$

for $0 \le t \le T_s$, where $(\cdot) = (r)/(d)$, $\tilde{w}^{(\cdot)}(t)$ is the $M_{rx} \times 1$ complex equivalent, baseband, stationary, additive, vector Gaussian noise process, with individual entries being circularly symmetric, independent and identically distributed (i.i.d.), and having a power spectral density: $S_w(f) = N_0$ for $-f_{K_1} \le f \le f_{K_2}$. During the data transmission phase, the $M_{rx} \times 1$ received data waveform $\tilde{s}_{rx}^{(d)}(t)$ is phase shifted by a bank of phase-shifters, whose outputs are summed and fed to a down-conversion chain for data demodulation, as in conventional analog beamforming. However unlike conventional CE based analog beamforming, the control signals to the phase-shifters are obtained using the reference symbols $\tilde{s}_{rx}^{(r)}(t)$ and using PACE, as shall be discussed in the next section.

III. Analog Beamformer Design at the Receiver

During each beamformer design phase, the BS transmits D consecutive reference symbols to facilitate PACE at the RX. This process involves two steps: locking a local RX oscillator to the received reference tone and using this locked oscillator to estimate the amplitude and phase-offsets at each antenna. Here locking refers to ensuring that the phase difference between the oscillator and the received reference tone is approximately constant. The first $D_1$ reference symbols are used for the former step and the remaining $D_2 = D - D_1$ symbols are used for the latter step. Therefore D is independent of $M_{rx}$ and is mainly determined by the time required for oscillator locking (see Remark 3.1). The first step shall be referred to as recovery of the reference tone and is analyzed in Section 3.1 and while the latter step is discussed in Section 3.2. As shall be shown both steps are significantly impaired by channel noise. Therefore in Section 3.3, we propose an improved architecture for reference tone recovery that provides better noise performance, albeit with a slightly higher hardware complexity. For convenience, we shall assume that the MPC delays do not change within the beamformer design phase, and are represented as $\{\hat{\tau}_0, \ldots, \hat{\tau}_{L-1}\}$ (see also Remark 3.2). However the delays may be different during the data transmission phase, as shall be considered in Section 4. Without loss of generality, assuming the first reference symbol to be the 0-th OFDM symbol, the complex equivalent RX signal for the D reference symbols at antenna m can be expressed as:

$$\tilde{s}_{rx,m}^{(r)}(t) = \sqrt{2} A_m^{(r)} e^{j2\pi f_c t} + \sqrt{2} \tilde{w}_m^{(r)}(t) e^{j2\pi f_c t} \text{ for} \quad (2.5)$$

$$0 \le t \le DT_{cs} - T_{cp}, \text{ where}$$

$$A_m^{(r)} \triangleq \sum_{\ell=0}^{L-1} \sqrt{\frac{1}{T_{cs}}} \alpha_\ell [a_{rx}(\ell)]_m a_{tx}(\ell)^\dagger t \sqrt{E^{(r)}} e^{-j2\pi f_c \tau_\ell}$$

is the amplitude of the reference tone at antenna m.

III-A Recovery of the Reference Tone—Using One PLL

Figure 12:
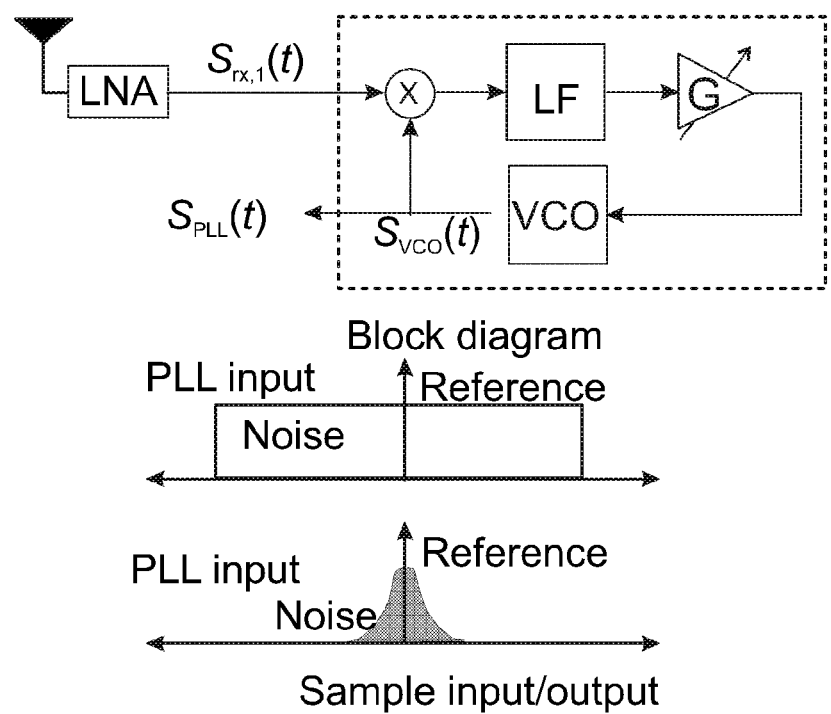
FIG. 12: Block diagram of the PLL at antenna 1 for reference recovery, and a sample illustration of its output.

For locking a local RX oscillator to the reference signal, we first consider the use of a type 2 analog PLL at RX antenna 1, as illustrated in FIG. 12. The PLL is a common carrier-recovery circuit—with a mixer, a loop low pass filter (LF) a variable loop gain (G) and a voltage controlled oscillator (VCO) arranged in a feedback mechanism—that can filter the noise from an input noisy sinusoidal signal (see S. C. Gupta, "Phase-locked loops," Proceedings of the IEEE, vol. 63, pp. 291-306, February 1975; A. Viterbi, Principles of coherent communication. McGraw-Hill series in systems science, McGraw-Hill, 1966) for more details).

Here LF is assumed to be a first-order active low-pass filter with a transfer function $\mathcal{LF}(s) = 1 + \epsilon/s$ and the loop gain G is assumed to adapt to the amplitude of the input such that $G|A_1^{(r)}|$=constant. For convenience, we also ignore the VCO's internal noise (A. Mehrotra, "Noise analysis of phase-locked loops," IEEE Transactions on Circuits and Systems I: Fundamental Theory and Applications, vol. 49, pp. 1309-1316, September 2002; D. Petrovic, W. Rave, and G. Fettweis, "Effects of phase noise on OFDM systems with and without PLL: Characterization and compensation," IEEE Transactions on Communications, vol. 55, pp. 1607-1616, August 2007). Without loss of generality, let the output of the VCO (i.e. the recovered reference tone) be expressed as:

$$s_{PLL}(t) = s_{vco}(t) = \sqrt{2} \cos[2\pi f_c t + \bar{\theta} + \theta(t)] \quad (2.6)$$

where $\theta(t)$ may be arbitrary and we define $\bar{\theta} \in (-\pi, \pi]$ such that $A_1^{(r)} e^{-j\bar{\theta}} = -j|A_1^{(r)}|$. Then the stochastic differential equation governing (2.6) for $0 \le t \le DT_{cs} - T_{cp}$ is given by [56 A. Viterbi, Principles of coherent communication. McGraw-Hill series in systems science, McGraw-Hill, 1966.]:

$$2\pi f_c + \frac{d\theta(t)}{dt} = LF\{\text{Re}\{\tilde{s}_{rx,1}(t)\}\sqrt{2}\cos[2\pi f_c t + \bar{\theta} + \theta(t)]\}G + 2\pi f_{vco} \quad (2.7)$$

$$= LF\{\text{Re}[A_1^{(r)} e^{-j[\bar{\theta}+\theta(t)]} + \tilde{w}_1^{(r)}(t) e^{-j[\bar{\theta}+\theta(t)]}]\}G + 2\pi f_{vco}$$

where $f_{vco}$ is the free running frequency of the VCO with no input, we use (2.5) and assume $f_c$ is much larger than the bandwidth of LF. In this subsection, we are interested in finding the time required for locking ($D_1 T_{cs}$), i.e., for $\theta(t)$ to (nearly) converge to a constant and characterizing the distribution of the PLL output $s_{PLL}(t)$, or equivalently $\theta(t)$, during the last $D_2$ reference symbols when the PLL is locked to the reference tone. The first part is answered by the following remark:

Remark 3.1 For the PLL considered, the phase lock acquisition time is $$\approx \frac{1}{\epsilon}\left(\frac{2\pi(f_c - f_{vco})}{|A_1^{(r)}|G}\right)^2 \quad (2.5)$$

in the no noise scenario (S. C. Gupta, "Phase-locked loops," Proceedings of the IEEE, vol. 63, pp. 291-306, February 1975; A. Viterbi, Principles of coherent communication. McGraw-Hill series in systems science, McGraw-Hill, 1966). Thus $\epsilon$ and $|A_1^{(r)}|G$ must be of the orders of $1/T_s$ and $2\pi|f_c-f_{vco}|$ respectively, to keep Dt small.

Numerous techniques (D. Messerschmitt, "Frequency detectors for PLL acquisition in timing and carrier recovery," IEEE Transactions on Communications, vol. 27, pp. 1288-1295, September 1979; Y. Venkataramayya and B. S. Sonde, "Acquisition time improvement of PLLs using some aiding functions," Indian Institute of Science Journal, vol. 63, pp. 73-88, March 1981) have been proposed to further reduce the lock acquisition time, which are not explored here for brevity. In the locked state, it can be shown that θ(t) suffers from random fluctuations due to the input noise $\tilde{w}_1^{(r)}(t)$ in (2.7), and that θ(t) (modulo 2π) is approximately a zero mean random process (S. C. Gupta, "Phase-locked loops," Proceedings of the IEEE, vol. 63, pp. 291-306, February 1975; A. Viterbi, Principles of coherent communication. McGraw-Hill series in systems science, McGraw-Hill, 1966). This fluctuation manifests as phase noise of $s_{PLL}(t)$. While several attempts have been made to characterize the locked state θ(t) (see (S. C. Gupta, "Phase-locked loops," Proceedings of the IEEE, vol. 63, pp. 291-306, February 1975; A. Viterbi, Principles of coherent communication. McGraw-Hill series in systems science, McGraw-Hill, 1966.] and references therein), closed form results are available only for a few simple scenarios that are not applicable here. Therefore, for analytical tractability, we linearize (2.7) using the following widely used approximations (A. Viterbi, Principles of coherent communication. McGraw-Hill series in systems science, McGraw-Hill, 1966):

1. We neglect cycle slips and assume that the deviations of θ(t) about its mean value are small, such that $e^{-j\theta(t)} \approx 1 - j\theta(t)$ in the locked state.

2. We assume that the distribution of the baseband noise process $\tilde{w}_1^{(r)}(t)$ is invariant to multiplication with $e^{-j[\bar{\theta}+\theta(t)]}$, i.e., $\hat{w}_1^{(r)}(t) \triangleq \tilde{w}_1^{(r)}(t)e^{-j[\bar{\theta}+\theta(t)]}$ is also a Gaussian noise process with power spectral density $S_w(f)$.

Approximation 1 is accurate in the locked state and in the large SNR regime, while Approximation 2 is accurate when the noise bandwidth is much larger than the loop filter bandwidth (A. Viterbi, Principles of coherent communication. McGraw-Hill series in systems science, McGraw-Hill, 1966; A. J. Viterbi, "Phase-locked loop dynamics in the presence of noise by Fokker-Planck techniques," Proceedings of the IEEE, vol. 51, pp. 1737-1753, December 1963]. Using these approximations and the definition of $\bar{\theta}$, we can linearize (2.7) as:

$$\frac{d\theta_L(t)}{dt} = LF\left\{-|A_1^{(r)}|\theta_L(t) + \frac{\hat{w}_1^{(r)}(t) + [\hat{w}_1^{(r)}(t)]^*}{2}\right\}G - 2\pi[f_c - f_{vco}] \quad (2.8)$$

where we replace θ(t) by $\theta_L(t)$ to denote use of the linear approximation. Note that for sufficient SNR, $\theta(t) \stackrel{d}{\approx} \theta_L(t)$ (modulo 2π) during the last $D_2$ reference symbols. Assuming $\theta_L(0)=0$ and the PLL input to be 0 for t≤0 and taking the Laplace transform on both sides of (2.8), we obtain:

$$s\Theta_L(s) = G\mathcal{LF}(s)\left[-|A_1^{(r)}|\Theta_L(s) + \frac{\hat{W}_1^{(r)}(s) + [\hat{W}_1^{(r)}(s^*)]^*}{2}\right] - \frac{2\pi[f_c - f_{vco}]}{s} \quad (2.9)$$

where $\Theta_L(s)$ and $\hat{W}_1^{(r)}(s)$ are the Laplace transforms of $\theta_L(t)$ and $\hat{w}_1^{(r)}(t)$, respectively. It can be verified using the final value theorem that the contribution of the last term on the right hand side of (2.9) vanishes for t»0 (i.e., in locked state). Therefore ignoring this term in (2.9), we observe that $\theta_L(t)$ is a zero mean, stationary Gaussian process (A. Mehrotra, "Noise analysis of phase-locked loops," IEEE Transactions on Circuits and Systems I: Fundamental Theory and Applications, vol. 49, pp. 1309-1316, September 2002), in the locked state. Furthermore, the locked state power spectral density, auto-correlation function and variance of $\theta_L(t)$ can then be computed, respectively, as:

$$S_{\theta_L}(f) = \mathbb{E}|\Theta_L(j2\pi f)|^2 \quad (2.10)$$

$$\frac{|G|^2(4\pi^2 f^2 + \epsilon^2)S_w(f)}{2\left\|-4\pi^2 f^2 + G(j2\pi f + \epsilon)|A_1^{(r)}|\right\|^2}$$

$$\mathcal{R}_{\theta_L}(\tau) = \int_{-\infty}^{\infty} S_{\theta_L}(f)e^{j2\pi f \tau}df \quad (2.11)$$

$$\approx \frac{|G|^2 N_0}{4}\left[\frac{a^2-\epsilon^2}{a(a^2-b^2)}e^{-a|\tau|} + \frac{b^2-\epsilon^2}{b(b^2-a^2)}e^{-b|\tau|}\right]$$

$$\text{Var}\{\theta_L(t)\} = \mathcal{R}_{\theta_L}(0) \le N_0 \frac{|A_1^{(r)}|G+\epsilon}{4|A_1^{(r)}|^2}, \quad (2.12)$$

where $2a = G|A_1^{(r)}| + \sqrt{G^2|A_1^{(r)}|^2 - 4G|A_1^{(r)}|\epsilon}$, $2b = G|A_1^{(r)}| - \sqrt{G^2|A_1^{(r)}|^2 - 4G|A_1^{(r)}|\epsilon}$, (2.12)-(2.13) follow from finding the inverse Fourier transform via partial fraction expansion and the final expressions follow by observing that $S_w(f) \le N_0$ for all f. Since $\theta_L(t)$ is stationary and Gaussian in locked state, note that its distribution is completely characterized by (2.10)-(2.11).

III-B Phase and Amplitude Offset Estimation

This subsection analyzes the procedure for reference signal phase and amplitude offset estimation at each RX antenna. As illustrated in FIG. 3, the PLL signal from antenna 1 is fed to a π/2 phase shifter to obtain its quadrature component. From (2.7), the in-phase and quadrature-phase components of the PLL signal for $D_1 T_{cs} - T_{cp} \le t \le DT_{cs} - T_{cp}$ can be expressed together as:

$$\tilde{s}_{PLL}(t) = \sqrt{2}e^{j[2\pi f_c t + \bar{\theta} + \theta(t)]}. \quad (2.13)$$

At each RX antenna, the received reference signal is multiplied by the in-phase and quadrature-phase components of the PLL signal, and the resulting outputs are fed to 'filter, sample and hold' circuits. This circuit involves a low pass filter with a bandwidth of $\approx 1/(D_2 T_{cs})$, followed by a sample and hold circuit that samples the filtered output at the end of the D reference symbols. For convenience, in this paper we shall approximate this 'filter, sample and hold' by an integrate and hold operation as depicted in FIG. 3. Representing the 'filter, sample and hold' outputs corresponding to the in-phase and quadrature-phase components of the PLL output as real and imaginary respectively, the $M_{rx} \times 1$ complex sample and hold vector can be approximated as:

$$I_{PACE} \approx \frac{1}{D_2} \int_{T_1}^{T_2} \text{Re}\{\tilde{s}_{rx}^{(r)}(t)\}\tilde{s}_{PLL}^*(t)dt = \quad (2.14)$$

$$\frac{1}{D_2} \int_{T_1}^{T_2} \left[ \sqrt{\frac{1}{T_{cs}}} \hat{\mathcal{H}}(0) t \sqrt{E^{(r)}} e^{-j[\bar{\theta}+\theta(t)]} + \hat{w}^{(r)}(t) \right] dt,$$

where $$\frac{1}{D_2}$$

is a scaling factor, $T_1 \triangleq D_1 T_{cs} - T_{cp}$, $T_2 \triangleq DT_{cs} - T_{cp}$, $\hat{\mathcal{H}}$ $(f_k) \triangleq \sum_{\ell=0}^{L-1} \alpha_\ell\, a_{rx}(\ell)a_{rx}(\ell)^\dagger e^{-j2\pi(f_c+f_k)\tilde{\tau}_\ell}$ is the $M_{rx} \times M_{rx}$ frequency-domain channel matrix for the k-th subcarrier during beamformer design phase and $\hat{w}^{(r)}(t) \triangleq \tilde{w}^{(r)}(t)e^{-j[\bar{\theta}+\theta(t)]}$ is an $M_{rx} \times 1$ i.i.d. Gaussian noise process vector with power spectral density $\mathcal{S}_w(f)$ (see Approximation 2).

Note that in locked state ($T_1 \leq t \leq T_2$), we have $\theta(t) \stackrel{d}{\approx} \theta_L(t)$ (modulo $2\pi$), as per approximations 1 and 2. Furthermore from (2.11), the auto-correlation function of $\theta_L(t)$ decays exponentially with a time constant of $O(1/G|A_1^{(r)}|)$. Therefore, for $G|A_1^{(r)}| \gg 1/(D_2 T_{cs})$, $I_{PACE}$ experiences enough independent realizations of $\theta(t)$. Therefore replacing the integral in (2.14) with an expectation over VCO phase noise, we have:

$$I_{PACE} \stackrel{(1)}{\approx} \sqrt{T_{cs}} \hat{\mathcal{H}}(0)t\sqrt{E^{(r)}}\, e^{-j\bar{\theta}}\mathbb{E}\{e^{-j\theta_L(t)}\} + \int_{T_1}^{T_2} \frac{\hat{w}^{(r)}(t)}{D_2} dt \stackrel{(2)}{=} \quad (2.15)$$

$$\sqrt{T_{cs}} \hat{\mathcal{H}}(0)t\sqrt{E^{(r)}}\, e^{-j\bar{\theta}} e^{-\frac{\text{Var}\{\theta_L(t)\}}{2}} + \sqrt{T_{cs}}\, \hat{w}^{(r)},$$

where $\stackrel{(1)}{\approx}$ follows from the fact that $\theta(t) \stackrel{d}{\approx} \theta_L(t)$ (modulo $2\pi$) in locked state, $\stackrel{(2)}{=}$ follows by defining $$\hat{w}^{(r)} \triangleq \frac{1}{D_2 \sqrt{T_{cs}}} \int_{T_1}^{T_2} \hat{w}^{(r)}(t)dt$$

and by using the characteristic function for the stationary Gaussian process $\theta_L(t)$. Since $\hat{w}^{(r)}(t)$ is i.i.d. Gaussian with a power spectral density $\mathcal{S}_w(f)$, it can be verified that $\hat{w}^{(r)} \sim \mathcal{CN}[\mathbf{0}_{M_{rx} \times 1}, (N_0/D_2)\mathbb{I}_{M_{rx}}]$ when $$\frac{1}{D_2}$$

«$K_1$, $K_2$. From (2.15), note that the signal component of the sample and hold output $I_{PACE}$ is directly proportional to the channel matrix at the reference frequency. The outputs are used as a control signals to the RX phase-shifter array, to generate the RX analog beam to be used during the data transmission phase. From (2.15) and (2.12), note that either $D_2$ or $|A_1^{(r)}|$ can be increased, to reduce the impact of noise $\hat{w}^{(r)}$ on the analog beam. Since $|A_1^{(r)}|$ is a non-decreasing function of $E^{(r)}$ (see (2.5)), this implies that $E^{(r)}$ should be kept as large as possible while satisfying $E^{(r)} \leq E_{cs}$ and meeting the spectral mask regulations.

Figure 13A:
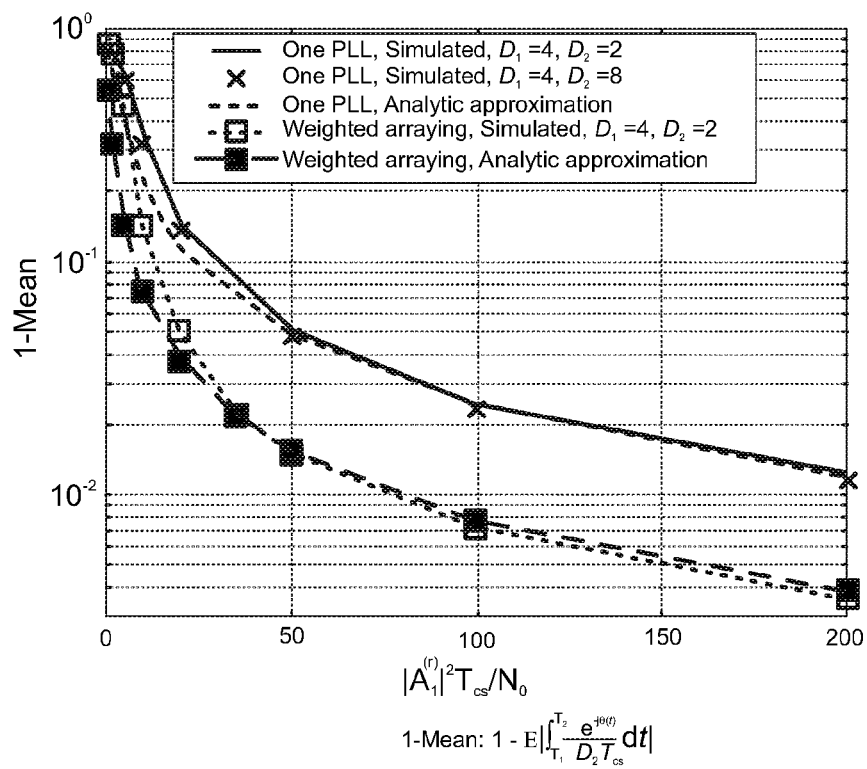
FIGS. 13A and 13B: Accuracy of the analytical approximation for the filter, sample and hold outputs in (15) versus SNR for the one PLL and weighted arraying architectures.
Figure 13B:
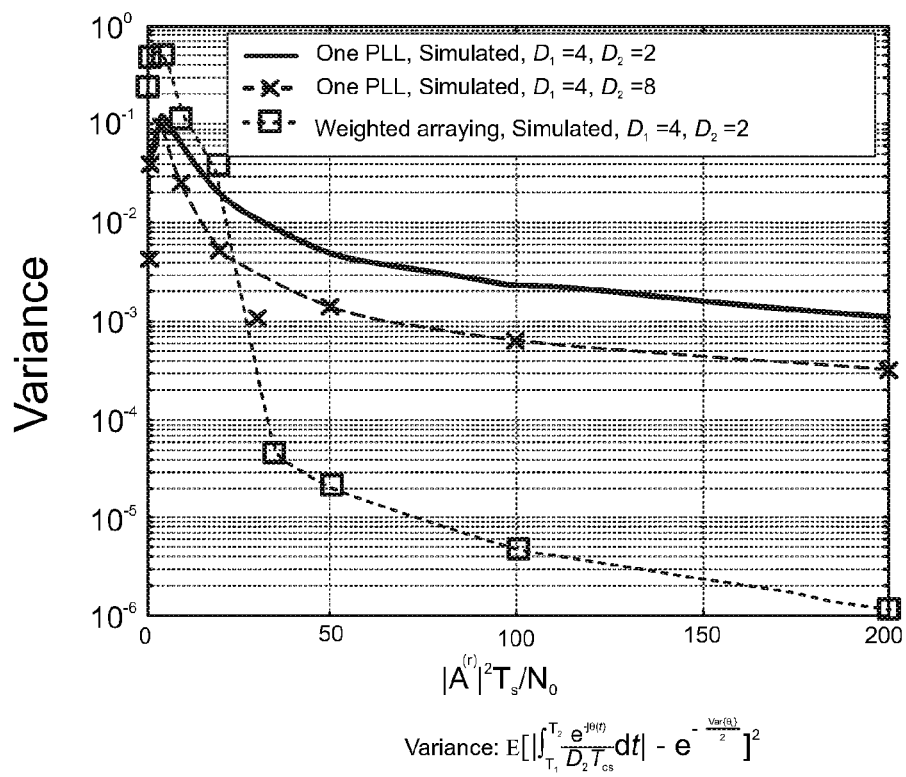

Note that the results in this section are based on several approximations, including the linear phase noise analysis in Section 3.1. To test the accuracy of these results, the numerical values of $|\int_{T_1}^{T_2} e^{-j\theta(t)}dt|/D_2 T_{cs}$, obtained by simulating realizations of $\theta(t)$ from (2.7), are compared to its analytic approximation $$e^{-\frac{\text{Var}\{\theta_L(t)\}}{2}}$$

in FIG. 13. Note that this comparison reflects the accuracy of the approximation in (2.15). As is evident from FIG. 13, (2.15) is accurate above a certain SNR. Additionally, since $I_{PACE}$ decays exponentially with $\text{Var}\{\theta_L(t)\}$ (see (2.15)), we observe from FIG. 13A that the mean integrator output drops drastically below a certain threshold SNR. As shall be shown in Section 4, such a drop in the mean causes a sharp degradation in the system performance below this threshold SNR. Therefore in the next subsection we propose a better reference recovery circuit, called weighted carrier arraying, that reduces the SNR threshold.

TABLE 1

One PLL and weighted arraying simulation parameters.

| Parameter | Value | Parameter | Value |
|---|---|---|---|
| $f_c$ | 30 GHz | $\epsilon$ | $4/T_s$ |
| $f_c - f_{vco}$ | 5 MHz | $f_{1F}$ | 1 GHz |
| $T_s$ | 1 μs | $f_c - f_{1F} - f_{vco}^p$ | 5 MHz |
| $T_{cp}$ | 0.1 μs | $\mathcal{M}$ | {1, 5, 15} |
| $K_1$ | 512 | $\mu$ | $2\pi/T_s$ |
| $K_2$ | 511 | $G^p|A_{rss}^{(r)}|^2/\mu$ | $\pi|f_c - f_{1F} - f_{vco}^p|$ |
| $G|A_1^{(r)}|$ | $\pi|f_c - f_{vco}|$ | $\epsilon^p$ | $4/T_s$ |

Remark 3.2 The preceding derivations assumed that the MPC delays are identical for the D reference symbols. However since the PLL continuously tracks the RX signal and phase/amplitude estimation at each antenna is performed simultaneously, these results are valid even if the delays change slowly within the beamformer design phase.

Remark 3.3 The RX phase-shifter array or the down-conversion chain are not utilized during the D reference symbols of the beamformer design phase. Therefore, data reception is also possible during these D reference symbols in parallel, as long as a sufficient guard band between the data sub-carriers and the reference sub-carrier is provided (similar to (2.27)) to reduce impact on the PLL performance.

Note that in a multi-cell scenario, use of the same reference tone in adjacent cells can cause reference tone contamination, i.e., $I_{PACE}$ may contain components corresponding to the channel from a neighboring BS. This is analogous to pilot contamination in conventional CE approaches (T. Marzetta, "Noncooperative cellular wireless with unlimited numbers of base station antennas," IEEE Transactions on Wireless Communications, vol. 9, pp. 3590-3600, November 2010), and can be avoided by using different, well-separated reference frequencies in adjacent cells.

III-C. Recovery of the Reference Tone—Using Weighted Carrier Arraying

For reducing the PLL SNR threshold and improving performance, in this subsection we propose a new reference recovery technique called weighted carrier arraying, as illustrated in FIG. 4. Apart from a main primarily PLL, weighted carrier arraying has secondary PLLs at a subset $\mathcal{M}$ of antennas, which compensate for the inter-antenna phase shift. The resulting phase compensated signals from the $\mathcal{M}$ antennas are weighted, combined and tracked by the primary PLL, which operates at a higher SNR and with a wider loop bandwidth than the secondary PLLs. Note that this architecture can be interpreted as a generalization of the carrier recovery process in (P. Thompson, "Adaptation by direct phase-shift adjustment in narrow-band adaptive antenna systems," IEEE Transactions on Antennas and Propagation, vol. 24, pp. 756-760, September 1976; C. Golliday and R. Huff, "Phase-locked loop coherent combiners for phased array sensor systems," IEEE Transactions on Communications, vol. 30, pp. 2329-2340, October 1982; J. H. Schrader, "Receiving system design for the arraying of independently steerable antennas," IRE Transactions on Space Electronics and Telemetry, vol. SET-8, pp. 148-153, June 1962; J. H. Schrader, "A phase-lock receiver for the arraying of independently directed antennas," IEEE Transactions on Antennas and Propagation, vol. 12, pp. 155-161, March 1964) that allows weighted combining. We shall next analyze the performance of this arrayed PLL in the locked state. However, an analysis of the transient behavior and lock acquisition time of this design is beyond the scope of this paper.

In FIG. 4, LPF/BPF refer to low-pass and band-pass filters with wide bandwidths, designed only to remove the unwanted side-band of the mixer outputs. Without loss of generality, we express the outputs of the primary and secondary VCOs as:

$$s_{vco}^P(t) = \sqrt{2} \cos[2\pi(f_c - f_{IF})t + \theta(t)]$$

$$s_{vco,m}^s(t) = \sqrt{2} \cos[2\pi f_{1F}t + \bar{\phi}_m + \phi_m(t)], m \in \mathcal{M}$$

respectively, where $\theta(t)$, $\phi_m(t)$ are arbitrary, $f_{IF}$ is the common free running frequency of the secondary VCOs, and $\bar{\phi}_m$ are such $A_m^{(r)} e^{-j[\bar{\phi}_m]} = -j|A_m^{(r)}|$ for all $m \in \mathcal{M}$. Now similar to Section 3.1, from (2.5) the differential equation governing the secondary PLL at antenna $m \in \mathcal{M}$ can be expressed as:

$$\frac{d\phi_m(t)}{dt} = \text{Re}\Big[A_m^{(r)} e^{-j[\bar{\phi}_m + \phi_m(t) + \theta(t)]} + \tilde{w}_m^{(r)}(t) e^{-j[\bar{\phi}_m + \phi_m(t) + \theta(t)]}\Big] \frac{G_m^s}{\sqrt{2}} = \quad (2.16)$$

$$\text{Re}[-j|A_m^{(r)}|e^{-j[\phi_m(t) + \theta(t)]} + \hat{w}_m^{(r)}(t)] \frac{G_m^s}{\sqrt{2}}$$

where we define $\hat{w}_m^{(r)}(t) \triangleq \tilde{w}_m^{(r)}(t) e^{-j[\bar{\phi}_m + \phi_m(t) + \theta(t)]}$ and $G_m^s$ is the loop gain of the secondary VCO at antenna m. Similarly, for the primary VCO we have:

$$2\pi(f_c - f_{1F}) + \frac{d\theta(t)}{dt} = \quad (2.17)$$

$$LF\Big\{\sum_{m \in \mathcal{M}} \text{Re}[-j|A_m^{(r)}|e^{-j[\phi_m(t) + \theta(t)]} + \hat{w}_m^{(r)}(t)] \frac{1}{G_m^s}\Big\} \frac{G^P}{\sqrt{2}} + 2\pi f_{vco}^P$$

where $f_{vco}^P$ is the free running frequency of the primary VCO, $G^P$ is the loop gain and $LF_p$ is an active low pass filter with transfer function $LF_p(s) = (1 + \epsilon^p/s)$. Similar to Section 3.1, to obtain the locked state distribution of $\theta(t)$ we shall rely on the linear PLL analysis by using: 1) $e^{-j[\phi_m(t) + \theta(t)]} \approx 1 - j[\phi_m(t) + \theta(t)]$, which is accurate in the high SNR locked state where $\phi_m(t) + \theta(t) \ll 1$ and 2) $\hat{w}_m^{(r)}(t) \stackrel{d}{\approx} \tilde{w}_m^{(r)}(t)$, which is accurate for a wide noise bandwidth. Using these approximations in (2.16)-(2.17) with zero initial conditions and taking Laplace transforms, we obtain:

$$s\Phi_m^L(s) = \Big(-|A_m^{(r)}|[\Phi_m^L(s) + \Theta_L(s)] + \frac{\tilde{w}_m^{(r)}(s) + [\tilde{w}_m^{(r)}(s^*)]^*}{2}\Big) \frac{G_m^s}{\sqrt{2}} \quad (2.18a)$$

-continued $$s\Theta_L(s) = \quad (2.18b)$$

$$LF(s) \sum_{m \in \mathcal{M}} \Big[-\frac{|A_m^{(r)}|}{G_m^s}[\Phi_m^L(s) + \Theta_L(s)] + \frac{\tilde{w}_m^{(r)}(s) + [\tilde{w}_m^{(r)}(s^*)]^*}{2G_m^s}\Big]$$

$$\frac{G^P}{\sqrt{2}} + \frac{2\pi(f_{IF} + f_{vco}^P - f_c)}{s}$$

where $\hat{W}_m^{(r)}(s)$, $\Theta_L(s)$ and $\Phi_m^L(s)$ are the Laplace transforms of $\hat{w}_m^{(r)}(t)$, linear approximation $\theta_L(t)$ and linear approximation $\phi_m^L(t)$, respectively. We assume that the loop gains of the PLLs adapt to the amplitudes of the input such that $|A_m^{(r)}|G_m^s = \mu \forall m \in \mathcal{M}$ and $\sum_{m \in \mathcal{M}} G^P |A_m^{(r)}|^2 =$ constant. Then solving the system of equations in (2.18), we obtain:

$$\Big[s + \sum_{m \in \mathcal{M}} \frac{(s + \epsilon^P)|A_m^{(r)}|^2 G^P}{\mu(\sqrt{2}s + \mu)}\Big]\Theta_L(s) = \quad (2.19)$$

$$\sum_{m \in \mathcal{M}} \frac{(s + \epsilon^P)(\hat{w}_m^{(r)}(s) + [\hat{w}_m^{(r)}(s^*)]^*)|A_m^{(r)}|G^P}{2\mu(\sqrt{2}s + \mu)} +$$

$$\frac{2\pi(f_{IF} + f_{vco}^P - f_c)}{s}$$

It can be verified using the final value theorem that the last term in (2.19) only contributes a constant phase shift for $t \gg 0$ (in locked state), say $\bar{\theta}_L$. Thus, using steps similar to Section III-A, we can obtain the locked state power spectral density and variance of the time varying part of $\theta_L(t)$, i.e., $\theta_L(t) - \bar{\theta}_L$, as:

$$S_{\theta_L - \bar{\theta}_L}(f) = \frac{N_0 |A_{rss}^{(r)} G^P|^2}{2} \Big|\frac{(s + \epsilon^P)}{s\mu(\sqrt{2}s + \mu) + (s + \epsilon^P)|A_{rss}^{(r)}|^2 G^P}\Big|_{s = j2\pi f}^2 \quad (2.20)$$

$$\text{Var}\{\theta_L(t)\} = \frac{(|A_{rss}^{(r)}|^2[G^P/\mu] + \sqrt{2}\epsilon^P)[G^P/\mu]N_0}{4\sqrt{2}(\mu + |A_{rss}^{(r)}|^2[G^P/\mu])} \leq \quad (2.21)$$

$$\frac{(|A_{rss}^{(r)}|^2[G^P/\sqrt{2}\mu] + \epsilon^P)N_0}{4|A_{rss}^{(r)}|^2},$$

where $[A_{rss}^{(r)}]^2 = \sum_{m \in \mathcal{M}} |A_m^{(r)}|^2$. Comparing (2.21) to (2.12), note that the PLL phase noise is essentially reduced by the maximal ratio combining gain corresponding to the $\mathcal{M}$ antennas. As this variation in $\theta_L(t)$ manifests as phase noise of $s_{PLL}(t)$ in FIG. 4, the 'filter, sample and hold' outputs with weighted carrier arraying can be obtained by using (2.21) in (2.15). The accuracy of the resulting approximation is studied via simulations in FIG. 13.

IV. Data Transmission

During the data transmission phase, OFDM symbols of type (1 b) are transmitted and the corresponding received signals are processed via the phase-shifter array with $I_{PACE}$ as the control signals. Without loss of generality, again assuming the 0-th OFDM symbol as a representative data symbol, the combined data signal at the RX for $0 \leq t \leq T_s$ can be expressed as:

$$R(t) =$$

$$\frac{1}{\sqrt{2}} I_{PACE}^\dagger \Big[\sum_{\ell=0}^{L-1} \sum_{k \in \mathcal{K}} \sqrt{\frac{2}{T_{cs}}} \alpha_\ell a_{rx}(\ell) a_{tx}(\ell)^\dagger I x_k e^{j2\pi(f_c + f_k)(t - \tau_\ell)} +$$

-continued $$\sqrt{2}\,\tilde{w}^{(d)}(t)e^{j2\pi f_c t}\Bigg]$$

where the $1/\sqrt{2}$ is a scaling constant for convenience and we assume that the MPC delays for this representative data symbol are $\{\tau_0, \ldots, \tau_{L-1}\}$. This phase shifted and combined signal R(t) is then converted to baseband by a separate RX oscillator, and any resulting phase noise is assumed to be mitigated via some digital phase noise compensation techniques (D. Petrovic, W. Rave, and G. Fettweis, "Effects of phase noise on OFDM systems with and without PLL: Characterization and compensation," IEEE Transactions on Communications, vol. 55, pp. 1607-1616, August 2007; P. Robertson and S. Kaiser, "Analysis of the effects of phasenoise in orthogonal frequency division multiplex (OFDM) systems," in IEEE International Conference on Communications (ICC), vol. 3, pp. 1652-1657 vol. 3, June 1995; S. Wu, P. Liu, and Y. Bar-Ness, "Phase noise estimation and mitigation for OFDM systems," IEEE Transactions on Wireless Communications, vol. 5, pp. 3616-3625, December 2006; S. Randel, S. Adhikari, and S. L. Jansen, "Analysis of RF-pilot-based phase noise compensation for coherent optical OFDM systems," IEEE Photonics Technology Letters, vol. 22, pp. 1288-1290, September 2010). Therefore neglecting the down-conversion phase noise, the resulting baseband signal can be expressed as $R_{BB}(t)=R(t)e^{-j2\pi f_c t}$. This signal is then sampled and OFDM demodulation follows. The OFDM demodulation output for the k-th subcarrier ($k\in \mathcal{K}$) is then given by:

$$Y_k = \frac{1}{K}\sum_{u=0}^{K-1} R_{BB}\left(\frac{uT_s}{K}\right) e^{-j\frac{2\pi ku}{K}} \quad (2.22)$$

$$= \frac{1}{\sqrt{T_{cs}}} I_{PACE}^\dagger \mathcal{H}(f_k) t x_k + \frac{1}{\sqrt{T_{cs}}} I_{PACE}^\dagger \tilde{W}^{(d)}[k]$$

where $\mathcal{H}(f_k) \triangleq \sum_{\ell=0}^{L-1} \alpha_\ell\, a_{rx}(\ell\,)a_{tx}(\ell\,)^\dagger\, e^{-j2\pi(f_c+f_k)\tau_\ell}$ is the $M_{rx} \times M_{tx}$ frequency domain channel matrix for the k-th data subcarrier and $$\tilde{W}^{(d)}[k] \triangleq \frac{\sqrt{T_{cs}}}{K}\sum_{u=0}^{K-1} \tilde{w}^{(d)}\left(\frac{uT_s}{K}\right) e^{-j\frac{2\pi ku}{K}},$$

with $\tilde{W}^{(d)}[k]$ being independently distributed for each $k\in \mathcal{K}$ as $\tilde{W}^{(d)}[k] \sim \mathcal{CN}_{\ell}[\mathbb{O}_{M_{rx}\times 1}, (N_0 T_{cs}/T_s) \mathbb{I}_{M_{rx}}]$. Note from (1.15) that $I_{PACE}^\dagger$ is similar (with appropriate scaling), but not identical, to the MRC beamformer for the k-th sub-carrier: $t^\dagger \mathcal{H}(f_k)^\dagger$. The mismatch is due to the beamforming noise $\hat{W}^{(r)}$ and because the reference symbols and the k-th sub-carrier data stream pass through slightly different channels, owing to the difference in sub-carrier frequencies and the MPC delays ($\hat{\tau}_\ell \neq \tau_\ell$). Consequently, the beamformer $I_{PACE}$ only achieves imperfect MRC, leading to some loss in performance and causing the effective channel coefficients $I_{PACE}^\dagger \mathcal{H}(f_k)t$ to vary with the sub-carrier index k, i.e., the system experiences frequency-selective fading. Furthermore, since the MPC delays $\{\tau_0, \ldots, \tau_{L-1}\}$ change after every iCSI coherence time, so may these channel coefficients. As depicted in FIG. 11, we assume that the TX transmits pilot symbols within each iCSI coherence time to facilitate estimation of these coefficients $\{I_{PACE}^\dagger \mathcal{H}(f_k)t | k\in \mathcal{K}\}$ at the RX. Since these pilots are used only to estimate the effective single-input-single-output (SISO) channel and not the actual MIMO channel, the corresponding overhead is small and shall be neglected here. Assuming perfect estimates of these channel coefficients, from (2.22) the effective SNR for the k-th sub-carrier, and the instantaneous system spectral efficiency (iSE), respectively, can be expressed as:

$$\gamma_k^{PACE}(\hat{W}^{(r)}, H(t)) \triangleq \frac{|I_{PACE}^\dagger \mathcal{H}(f_k) t|^2 E_k^{(d)}}{\|I_{PACE}\|^2 N_0 T_{cs}/T_s} \quad (2.23)$$

$$iSE^{PACE}(\hat{W}^{(r)}, H(t)) \triangleq \sum_{k\in \mathcal{K}} \frac{1}{K} \log\left(1 + \gamma_k^{PACE}(\hat{W}^{(r)}, H(t))\right), \quad (2.24)$$

where we neglect the cyclic prefix overhead in (2.24) for convenience. Note that the iSE maximizing data power allocation $\{E_k^{(d)} | k\in \mathcal{K}\}$ can be obtained via water-filling across the sub-carriers. While the exact expressions for (2.23)-(2.24) are involved, their expectations with respect to $I_{PACE}$ can be bounded, as stated by the following theorem.

Theorem 4.1 If the RX array response vectors for the channel MPs are mutually orthogonal, i.e., $a_{rx}(\ell\,)^\dagger a_{rx}(i) = 0$ for $\ell \neq i$, the effective SNR and iSE, averaged over the beamformer noise $\hat{W}^{(r)}$, can be bounded as in (2.25)

$$\gamma_k^{PACE}(H(t)) \gtrsim \frac{M_{rx} E^{(r)} e^{-\text{Var}\{\theta_L(t)\}} |\beta(f_c, f_k)|^2 E_k^{(d)}}{\beta(0,0)\frac{N_0}{D_2} E_k^{(d)} + \beta(0,0)\frac{N_0 T_{cs}}{T_s} E^{(r)} e^{-\text{Var}\{\theta_L(t)\}} + \frac{[N_0]^2 T_{cs}}{D_2 T_s}} \quad (2.25a)$$

$$iSE^{PACE}(H(t)) \gtrsim \quad (2.25b)$$

$$\sum_{k\in \mathcal{K}} \frac{1}{K}\log\left(1 + \frac{M_{rx} E^{(r)} e^{-\text{Var}\{\theta_L(t)\}} |\beta(f_c, f_k)|^2 E_k^{(d)}}{\beta(0,0)\frac{N_0}{D_2} E_k^{(d)} + \beta(0,0)\frac{N_0 T_{cs}}{T_s} E^{(r)} e^{-\text{Var}\{\theta_L(t)\}} + \frac{[N_0]^2 T_{cs}}{D_2 T_s}}\right),$$

where $\beta(\hat{f},\hat{i}) = \sum_{\ell=0}^{L-1} |\ell\,|^2 |a_{rx}(\alpha_\ell\,)^\dagger t|^2 e^{j[2\pi \hat{f}(\hat{\tau}_\ell - \tau_\ell) - 2\pi \hat{f}\tau_\ell]}$ and $\gtrsim$ represents a $\geq$ inequality at a high enough SNR such that the approximations in Section 3 are accurate.

Proof Substituting (2.15) in (2.22), and by treating the received signal component corresponding to $\tilde{W}^{(r)}$, i.e., $[\tilde{W}^{(r)}]^\dagger \mathcal{H}(f_k) t x_k$, as noise, we can obtain a lower bound to the mean SNR as:

$$\gamma_k^{PACE}(H(t)) \gtrsim \mathbb{E}_{\hat{W}^{(r)}}\left\{\frac{T_{cs}|t^\dagger \hat{\mathcal{H}}(f_0)^\dagger \mathcal{H}(f_k) t|^2 E_k^{(d)} E^{(r)} e^{-\text{Var}\{\theta_L(t)\}}}{\mathbb{E}_{x_k,\tilde{W}^d[k]}\left\{|I_{PACE}^\dagger \tilde{W}^d[k] + [\hat{W}^{(r)}]^\dagger \mathcal{H}(f_k) t x_k|^2\right\}}\right\}$$

$$\overset{(1)}{\geq} \frac{T_{cs}|t^\dagger \hat{\mathcal{H}}(f_0)^\dagger \mathcal{H}(f_k) t|^2 E_k^{(d)} E^{(r)} e^{-\text{Var}\{\theta_L(t)\}}}{\mathbb{E}_{\hat{W}^{(r)}}\left\{\|I_{PACE}\|^2 N_0 T_{cs}/T_s + |[\hat{W}^{(r)}]^\dagger \mathcal{H}(f_k) t|^2 E_k^{(d)}\right\}}$$

$$= \frac{|t^\dagger \hat{\mathcal{H}}(f_0)^\dagger \mathcal{H}(f_k) t|^2 E_k^{(d)} E^{(r)} e^{-\text{Var}\{\theta_L(t)\}}}{\text{denom.}}$$

-continued $$denom. = \left[t^\dagger \hat{\mathcal{H}}(f_0)^\dagger \hat{\mathcal{H}}(f_0)tE^{(r)}e^{-\text{Var}\{\theta_L(t)\}} + \frac{M_{rx}N_0}{D_2}\right]\frac{N_0 T_{cs}}{T_s} +$$

$$\frac{N_0}{D_2}t^\dagger \mathcal{H}(f_k)^\dagger \mathcal{H}(f_k)tE_k^{(d)}$$

$$\stackrel{(2)}{=} \frac{M_{rx}|\beta(f_c, f_k)|^2 E_k^{(d)} E^{(r)} e^{-\text{Var}\{\theta_L(t)\}}}{\beta(0,0)\frac{N_0 T_{cs}}{T_s}E^{(r)}e^{-\text{Var}\{\theta_L(t)\}} + \frac{N_0^2 T_{cs}}{D_2 T_s} + \frac{N_0}{D_2}\beta(0,0)E_k^{(d)}}, \quad (2.26)$$

where $\stackrel{(1)}{\geq}$ follows from the Jensen's inequality and $\stackrel{(2)}{=}$ from the orthogonality of the array response vectors. Similarly, by treating $[\hat{W}^{(r)}]^\dagger \mathcal{H}(f_k)tx_k$ as Gaussian noise independent of $x_k$, a lower bound on the mean iSE can be obtained as:

$$iSE^{PACE}(H(t)) \stackrel{\geq}{\approx}$$

$$E_{\hat{W}^{(r)}} \sum_{k \in \mathcal{K}} \frac{1}{|\mathcal{K}|}\log\left[1 + \frac{T_{cs}|t^\dagger \hat{\mathcal{H}}(f_0)^\dagger \mathcal{H}(f_k)t|^2 E_k^{(d)} E^{(r)} e^{-\text{Var}\{\theta_L(t)\}}}{\mathbb{E}_{x_k,\hat{W}^d[k]}\left\{|I_{PACE}^\dagger \tilde{W}^d[k] + [W^{(r)}]^\dagger \mathcal{H}(f_k)tx_k|^2\right\}}\right]$$

$$\geq$$

$$\sum_{k \in \mathcal{K}} \frac{1}{|\mathcal{K}|}\log\left[1 + \frac{M_{rx}|\beta(f_c, f_k)|^2 E_k^{(d)} E^{(r)} e^{-\text{Var}\{\theta_L(t)\}}}{\beta(0,0)\frac{N_0 T_{cs}}{T_s}E^{(r)}e^{-\text{Var}\{\theta_L(t)\}} + \frac{N_0^2 T_{cs}}{D_2 T_s} + \frac{N_0}{D_2}\beta(0,0)E_k^{(d)}}\right],$$

where we use similar steps to (2.26).

The array response orthogonality condition in Theorem 4.1 is satisfied if the scatterers corresponding to different MPCs are well separated and $M_{rx} \gg L$ (O. El Ayach, R. Heath, S. Abu-Surra, S. Rajagopal, and Z. Pi, "The capacity optimality of beam steering in large millimeter wave MIMO systems," in IEEE International Workshop on Signal Processing Advances in Wireless Communications (SPAWC), pp. 100-104, June 2012). Note that even though the RX does not explicitly estimate the array response vectors $a_{rx}(\ell)$ for the MPCs, we still observe an RX beamforming gain of $M_{rx}$ in (2.25a). The impact of imperfect MRC combining and the resulting frequency-selective fading is quantified by $\beta(f_c, f_k)$, where note that $|\beta(f_c, f_k)| \leq |\beta(0,0)|$. Another drawback of the fading is that it may cause a drastic drop in performance of the one PLL architecture in Section III-A if $|A_1^{(r)}|$—the reference signal strength at the antenna 1—falls in a fading dip, as is evident from (2.12) and (225). Note however that the weighted arraying architecture in Section 3.3 enjoys diversity against such fading by recovering the reference tone from multiple antennas $\mathcal{M}$.

V. Initial Access and aCSI Estimation at the BS

In this section we suggest how aCSI can be acquired at the BS during the TX beamformer design phase and also propose a sample IA protocol that can utilize PACE. Note that power allocation, user-scheduling and design of the TX beamformer t requires knowledge of the TX array response vectors and amplitudes $\{|\mathbb{I}|, a_{rx}(\ell)\}$ for the different UEs. Such aCSI can be acquired at the BS either via uplink CE, or by downlink CE with CSI feedback from the RX. Uplink CE can be performed by transmitting an orthogonal pilot from each UE omni-directionally, and using any of the digital CE algorithms from Section 1 at the BS. Note that PACE cannot be used at the BS since the pilots from multiple UEs need to be separated via digital processing. For downlink CE with feedback, the BS transmits reference signals sequentially along different transmit precoder beams (beam sweeping), with D reference symbols for each beam. The UEs perform PACE for each TX beam, and provide the BS with uplink feedback about the corresponding link strength for data transmission.

The suggested IA protocol is somewhat similar to the downlink CE with feedback, where the BS performs beam sweeping along different angular directions, possibly with different beam widths. For each TX beam, the BS transmits D reference symbols, followed by a sequence of primary (PSS) and secondary synchronization sequences (SSS). The RX performs PACE, and provides uplink feedback to the BS upon successfully detecting a PSS. However due to lack of prior timing synchronization during IA phase, the 'filter, sample and hold' circuit in Section 3.2 cannot be used directly for the PACE. One alternative is to allow continuous transmission of the reference tone even during the PSS and SSS with the following suggested symbol structure:

$$\bar{s}_{tx}^{(ia)}(t) = \sqrt{\frac{2}{T_{cs}}} t \left[\sqrt{E^{(r)}} + \sum_{k \in \mathcal{K} \setminus \mathcal{G}} x_k^{(p)} e^{j2\pi f_k t}\right] e^{j2\pi f_c t} \quad (2.27)$$

where $\mathcal{G}$ defines a guard band around the reference tone, to reduce the impact of the data sub-carriers on the PLL output. The amplitude and phase estimation can then be performed similar to Section 3.2, by multiplying the received signal at each antenna with the PLL output and then filtering with a low pass filter with cut-off frequency $1/(D_2 Tc)$. Due to the continuous availability of the reference tone, the filter outputs can be directly used to control the phase shifter at each antenna without the 'sample and hold' operation. Since $D=O(1)$, the IA latency does not scale with $M_{rx}$ and yet the PSS/SSS symbols can exploit the RX beamforming gain, thus improving cell discovery radius and/or reducing IA overhead.

VI. Simulation Results

For the simulation results, we consider a single cell scenario with a $\lambda/2$-spaced 32×8 ($M_{tx}=256$) antenna BS and one representative UE with a $\lambda/2$-spaced 16×4 ($M_{rx}=64$) antenna array, having one down-conversion chain and using PACE aided beamforming. The BS has perfect aCSI and transmits one spatial OFDM data stream to this UE with $K=1024$ sub-carriers and the beamformer t aligned with the strongest channel MPC. The RX beamformer design phase is assumed to last $D=6$ symbols with $D_2=2$, where the BS transmits reference symbols with power $E^{(r)}=20E_{cs}/K$ (to satisfy spectral mask regulations). The system parameters for the one PLL and weighted arraying case, respectively, are as given in Table 1. For comparison to existing schemes, we include the performance of RTAT—the continuous ACE based beamforming scheme in (V. V. Ratnam and A. Molisch, "Reference tone aided transmission for massive MIMO: analog beamforming without CSI," in IEEE International Conference on Communications (ICC), (Kansas City, USA), May 2018), and of statistical RX analog beamforming (P. Sudarshan, N. Mehta, A. Molisch, and J. Zhang, "Channel statistics-based RF pre-processing with antenna selection," IEEE Transactions on Wireless Communications, vol. 5, pp. 3501-3511, December 2006), where the beamformer is the largest eigen-vector of the RX spatial correlation matrix:

$$R_{rx}(t) = \frac{1}{K}\sum_{k \in \mathcal{K}} \hat{\mathcal{H}}(f_k)tt^\dagger \hat{\mathcal{H}}(f_k)^\dagger.$$

For both these schemes we ignore impact of phase noise and additionally, for statistical beamforming we consider two cases: (a) perfect knowledge of $R_{rx}(t)$ at the RX and (b) estimate of $R_{rx}(t)$ obtained using sparse-ruler sampling (P. Pal and P. P. Vaidyanathan, "Nested arrays: A novel approach to array processing with enhanced degrees of freedom," IEEE Transactions on Signal Processing, vol. 58, pp. 4167-4181, August 2010)—a reduced complexity digital CE technique. Note that PACE uses 6 reference symbols per beamformer update phase, RTAT avoids reference symbols but requires continuous transmission of the reference and sparse-ruler sampling requires 21 pilot symbols for $M_{rx}=64$. $\hat{\tau}_\ell$ We first consider a sparse multi-path channel having $L=3$ MPCs with delays $\hat{\tau}_\ell = \{0, 20, 40\}$ns, angles of arrival $\psi_{azi}^{rx}=\{0, \pi/6, -\pi/6\}$, $\omega_{ele}^{rx}=\{0.45\pi, \pi/2, \pi/2\}$ and effective amplitudes $$\frac{\alpha_\ell a_{rx}(t)^\dagger t}{\sqrt{\beta(0,0)}} = \{\sqrt{0.6}, -\sqrt{0.3}, \sqrt{0.1}\},$$

respectively, during the RX beamformer design phase and $\tau_\ell = \hat{\tau}_\ell + \{30, 25, 25\}$ ps for one snapshot of the data transmission phase. For this channel, the mean iSE of PACE aided beamforming, obtained using Monte-Carlo simulations with the non-linear PLL equations (2.7), (2.16), (2.17), is compared to the analytical approximation (2.25b), and the performance other schemes in FIG. 14A. Since the RX beamformer $I_{PACE}$ in (2.14) is random, the one sigma interval of iSE is also depicted as a shaded region here. As is evident from the results, the beamforming gain with PACE aided beamforming is only 2 dB lower than that of statistical beamforming, above a certain SNR threshold. Below this threshold, however, PACE experiences an exponential decay in performance due to the oscillator phase noise, as also predicted by Theorem 4.1. As is expected, this SNR threshold is lower for weighted carrier arraying than for one PLL. Furthermore, the derived analytical approximations are also accurate above this SNR threshold. PACE also outperforms RTAT at high SNR due to the judicious transmission of the reference, while the deceptively better performance of RTAT at low SNR is due to neglect of phase-noise. Note that these PACE results are obtained for an oscillator offset of 5 MHz (see Table 1). Better performance can be achieved if the PLL is optimized for more accurate local oscillators.

To study the impact of more realistic channels and number of MPCs, we next model the channel as a rich scattering stochastic channel with L resolvable MPCs, each with 10 unresolved sub-paths. Here the MPCs and sub-paths are generated identically to the clusters and rays, respectively, in the 3GPP TR38.900 Rel 14 channel model (UMi NLoS scenario)(TR38.900, "Study on channel model for frequency spectrum above 6 GHz (release 14)," Tech. Rep. V14.3.1, 3GPP, 2017). The only difference from (TR38.900, "Study on channel model for frequency spectrum above 6 GHz (release 14)," Tech. Rep. V14.3.1, 3GPP, 2017) is that we use an intra-cluster delay spread of 1ns and an intra-cluster angle spread of $\pi/50$ (for all elevation, azimuth, arrival and departure), to ensure that the sub-paths of each MPC are unresolvable. The channel SNR at each RX antenna (including the TX beamforming gain) is fixed at 0 dB, and the channel variation between beamformer design phase and one snapshot of the data transmission phase is modeled by assuming that the RX moves a distance of $d=2$ cm in a random azimuth direction without changing its orientation. Note that this channel can also be represented by our system model by replacing L in (2.2) with 10L. For this stochastic channel model, the mean iSE for PACE aided beamforming, averaged over channel realizations, is compared to RTAT and statistical beamforming in FIG. 14B. For computational tractability, we skip the non-linear PLL simulation and use the analytical expressions (2.15) and (2.24) to quantify performance of PACE. These expressions are accurate at 0 dB SNR as observed from FIG. 14A. As observed from the results, the loss in beamforming gain for PACE aided beamforming increases with L, and therefore PACE is mainly suitable for channels with $L \leq 10$ resolvable MPCs. It must be emphasized that such cases may frequently occur at mm-wave frequencies, where the number of resolvable MPCs/clusters with significant energy (within 20 dB of the strongest) is on the order 3-10 (M. Akdeniz, Y. Liu, M. Samimi, S. Sun, S. Rangan, T. Rappaport, and E. Erkip, "Millimeter wave channel modeling and cellular capacity evaluation," IEEE Journal on Selected Areas in Communications, vol. 32, pp. 1164-1179, June 2014; TR38.900, "Study on channel model for frequency spectrum above 6 GHz (release 14)," Tech. Rep. V14.3.1, 3GPP, 2017).

Note that for the iSE results in this section, we did not include the CE overhead. While digital approaches like sparse ruler sampling (S. Haghighatshoar and G. Caire, "Massive MIMO channel subspace estimation from low-dimensional projections," IEEE Transactions on Signal Processing, vol. 65, pp, 303-318, January 2017; P. Pal and P. P. Vaidyanathan, "Nested arrays: A novel approach to array processing with enhanced degrees of freedom," IEEE Transactions on Signal Processing, vol. 58. pp. 4167-4181, August 2010) require 21 pilots (for $M_{rx}=64$), PACE uses only D=6 pilots. The corresponding overhead reduction is significant when downlink CE with feedback is used for aCSI acquisition at the BS, such as in frequency division duplexing systems. For example with exhaustive beamscanning (C. Jeong, J. Park, and H. Yu, "Random access in millimeter-wave beamforming cellular networks: issues and approaches," IEEE Communications Magazine, vol. 53, pp. 180 ... 185, January 2015) at the TX and an aCSI coherence time of 10 ms, the BS aCSI acquisition overhead reduces from 40% for sparse ruler techniques to 11% for PACE (see Section 5 for protocol). The overhead reduction is expected to be higher if the additional time required for beam switching and settling (O. S. Sands, "Beam-switch transient effects in the RF path of the ICAPA receive phased array antenna," tech. rep., NASA Technical Memorandum TM-2003-212588, February 2002; K. Venugopal, A. Alkhateeb, N. G. Prelcic, and R. W. Heath, "Channel estimation for hybrid architecture-based wideband millimeter wave systems," IEEE Journal on Selected Areas in Communications, vol. 35, pp. 1996-2009, September 2017) are also taken into account. Thus, PACE aided beamforming shows potential in solving the CE overhead issue of hybrid massive MIMO systems, with minimal degradation in performance.

VII. Conclusions

This paper proposes the use of PACE for designing the RX beamformer in massive MIMO systems. This process involves transmission of a reference sinusoidal tone during each beamformer design phase, and estimation of its received amplitude and phase at each RX antenna using analog hardware. A one PLL based carrier recovery circuit is proposed to enable the PACE receiver, and its analysis suggests that the quality of obtained channel estimates decay exponentially with inverse of the SNR at the PLL input. To remedy this and also to obtain diversity against fading, a multiple PLL based weighted carrier arraying architecture is also proposed. The performance analysis suggests that PACE aided beamforming can be interpreted as using the channel estimates on one sub-carrier to perform beamforming on other sub-carriers, with an additional loss factor corresponding to the circuit phase-noise. Simulation results suggest that PACE aided beamforming suffers only a small beamforming loss in comparison to conventional analog beamforming in sparse channels, at sufficiently high SNR. This loss however increases with the number of channel MPCs L, and hence PACE is mostly suitable for sparse channels with few MPCs. The CE overhead reduction with PACE is significant when downlink CE with feedback is required. Benefits of PACE aided beamforming during IA phase are also discussed, although a more detailed analysis will be a subject for future work. Similarly the performance of PACE at very low SNR and with system mismatches/imperfections also requires more attention.

3. Multi-Antenna FSR Receivers: Low Complexity, Non-Coherent, Massive Antenna Receivers I. Introduction In the present embodiment, a novel multi-antenna frequency shift reference (MA-FSR) receiver is provided. The MA-FSR receiver (RX) uses only one down-conversion chain, supports wide-band transmission with non-coherent demodulation, and can perform receive beamforming without requiring phase-shifters, explicit channel estimation, or complicated signal processing—thus alleviating the drawbacks of the above mentioned schemes. Inspired by the frequency shift reference (FSR) schemes for single-input-single-output (SISO) ultra-wideband (UWB) systems, in this scheme the transmitter (TX) transmits a reference signal and several data signals on different frequency sub-carriers via orthogonal frequency division multiplexing (OFDM). At each RX antenna, the received waveform corresponding to the data sub-carriers is then correlated with the received waveform corresponding to the reference signal via a simple squaring operation. The outputs are then summed up and fed to a single down-conversion chain for data demodulation. As shall be shown later, this operation emulates maximal ratio combining (MRC) at the RX with imperfect channel estimates. Since the RX beamforming is enabled without channel estimation, MA-FSR is especially suitable for fast time-varying channels, such as in V2V or V2X networks. Furthermore, due to the non-coherent RX architecture, the phase noise of the transmit signal has negligible influence on the performance. The RX also exploits power from all the channel multi-path components (MPCs) and is therefore resilient to blocking of MPCs. Unlike conventional UWB FSR systems, there is no bandwidth spreading of the data signal involved. Therefore, the noise enhancement due to the non-linear RX architecture is significantly smaller, making it practically viable. On the flip side, the proposed scheme only uses 50% of frequency sub-carriers for data transmission, can only support a single spatial data-stream, cannot suppress interference and can only be used for beamforming in the receive mode of a node. Therefore, MA-FSR is more suitable for scenarios with abundant spectrum and where beamforming at the TX is unnecessary or where beamforming at TX is achieved using conventional channel estimation methods. Examples include device-to-device networks where beamforming at RX provides sufficient link margin or infrastructure based networks where down-link traffic is dominant. The contributions of the present embodiment, include:

1. Development of an MA-FSR RX architecture for massive MIMO systems, that allows non-coherent transmission, lowers implementation cost and energy consumption at the cost of 50% bandwidth efficiency and that does not require phase-shifters or channel estimation at the RX.

2. Characterization of the achievable throughput for the proposed MA-FSR system, both analytically and via simulations, for the single-input-multiple-output (SIMO) scenario in a wide-band channel.

3. Presentation of a class of improved MA-FSR architectures that can further improve performance, albeit, with a higher hardware complexity.

Notation: scalars are represented by light-case letters; vectors by bold-case letters; and sets by calligraphic letters. Additionally, $j=\sqrt{-1}$,* $\mathbb{E}\{\ \}$ represents the expectation operator, $c^*$ is the complex conjugate of a complex scalar c, $c^\dagger$ is the Hermitian transpose of a complex vector c, $\delta(t)$ represents the Dirac delta function, $\delta_{a,b}$ represents the Kronecker delta function and $\mathrm{Re}\{\cdot\}/\mathrm{Im}\{\cdot\}$ refer to the real/imaginary component, respectively. Furthermore $a^*$ and $a^\dagger$ denote the complex conjugate and the conjugate transpose of a vector a, respectively.

II. General Assumptions and System Model

We consider a SIMO link (which can be part of a larger system) where the TX has a single antenna and the RX has $M \gg 1$ antennas and one down-conversion chain. Note that this model also covers a MIMO link where the TX transmits a single spatial data stream, since the combination of TX precoding vector and propagation channel creates an effective SIMO link. The TX transmits OFDM symbols with 2K sub-carriers, indexed as $(0, \ldots, 2K-1)$. A reference signal is transmitted on the 0-th sub-carrier and K−g data signals are transmitted on the sub-carrier set $\mathcal{K} \triangleq \{K, K+1, \ldots, 2K-g-1\}$. Here g ensures that the transmit signal lies within the system bandwidth, and is usually small, determined by the TX phase noise. The remaining sub-carriers, i.e., $\{1, \ldots, K-1\} \cup \{2K-g, \ldots, 2K-1\}$ are unused. While it uses only ≈50% of the sub-carriers for data transmission, this OFDM structure is necessary to prevent inter-stream interference, as shall be shown in section 3. Then, the complex equivalent transmit signal for the 0-th symbol (for $-T_p \le t \le T_s$) can be expressed as:

$$s(t) = \sqrt{\frac{2}{T_s}} \left[ \sqrt{E_r} + \sum_{k \in \mathcal{K}} x_k e^{j2\pi f_k t} \right] e^{j(2\pi f_c t + \theta(t))}, \quad (3.1)$$

where $E_r$ is the energy allocated to the reference signal, $x_k$ is the data signal for k-th OFDM sub-carrier, $f_c$ is the carrier frequency, $f_k = k/T_s$ represents the frequency offset of k-th sub-carrier from the reference signal, $\theta(t)$ represents the phase noise process at the TX and $T_s$, $T_p$ are the symbol duration and the cyclic prefix duration, respectively. Here we define the complex equivalent signal such that the actual (real) transmit signal is given by $\mathrm{Re}\{s(t)\}$. We assume further that the data signals on the sub-carriers $\{x_k | k \in \mathcal{K}\}$ are mutually independently distributed with zero means. The total average transmit symbol energy is then given by $E_s = E_r + \sum_{k \in \mathcal{K}} E_d^{(k)}$, where $E_d^{(k)} = \mathbb{E}\{|x_k|^2\}$ is the energy allocated to the k-th sub-carrier.

The channel is assumed to have L≪M scatterers with the M×1 channel impulse response vector given as (M. Akdeniz, Y. Liu, M. Samimi, S. Sun, S. Rangan, T. Rappaport, and E. Erkip, "Millimeter wave channel modeling and cellular capacity evaluation," IEEE Journal on Selected Areas in Communications, vol. 32, pp. 1164-1179, June 2014):

$$h(t) = \sum_{\ell=0}^{L-1} \alpha_\ell \mathbf{a}_\ell \, \delta(t - \tau_\ell), \quad (3.2)$$

where $\alpha_\ell$ is the complex gain, $\tau_\ell$ is the delay and $a_\ell$ is the RX array response vector, respectively, of the $\ell$-th MPC. As an illustration, the array response vector for a $\lambda/2$-spaced uniform linear array is given by: $[\mathbf{a}_\ell]_i = e^{j\pi(i-1)\sin(\phi_\ell)}$, where $\lambda$ is the wavelength of the carrier signal and $\phi_\ell$ is the angle of arrival of the $\ell$-th MPC. Note that here we implicitly assume the system bandwidth is small enough to ignore beam squinting effects. For ease of analysis, we assume that the array response vectors for the scatterers are mutually orthogonal i.e. $a_\ell^\dagger a_{\bar{\ell}} = M\delta_{\ell,\bar{\ell}}$. This assumption is reasonable if the scatterers are well separated and M»L (O. El Ayach, R. Heath, S. Abu-Surra, S. Rajagopal, and Z. Pi, "The capacity optimality of beam steering in large millimeter wave MIMO systems," in IEEE International Workshop on Signal Processing Advances in Wireless Communications (SPAWC), pp. 100-104, June 2012). Later, in section 5 we shall also study the system performance when the above assumption is relaxed. To prevent inter symbol interference, we let the cyclic prefix be longer than maximum channel delay: $T_p \geq \tau_{L-1}$. To model a generic time varying channel, we assume that the MPC parameters remain constant for at least a coherence time interval $T_{coh}$, and may/may not change afterwards.

The RX front-end is assumed to have a low noise amplifier followed by a band-pass filter (BPF) at each antenna element, as depicted in FIG. 5. The BPF has a cut-off frequency of $f_{2K}$ and leaves the transmitted signal undistorted but suppresses the out-of-band noise. We also assume the RX to have perfect timing and clock synchronization with the TX. The filtered complex equivalent received waveform for the 0-th symbol for $0 \leq t \leq T_s$ can then be expressed as:

$$r(t) = \sum_{\ell=0}^{L-1} \alpha_\ell \mathbf{a}_\ell s_{BB}(t-\tau_\ell)e^{j2\pi f_c(t-\tau_\ell)} + n(t)e^{j2\pi f_c t}, \quad (3.3)$$

where $s_{BB}(t) \triangleq s(t)e^{-j2\pi f_c t}$ is the baseband transmit signal including the carrier phase noise, and $n(t)$ is the M×1 baseband equivalent, stationary, complex additive Gaussian noise process vector, with individual entries being circularly symmetric, independent and identically distributed (i.i.d.), and having a power spectral density $S_n(f) = 2N_0$ for $0 \leq f \leq f_{2K}$. The filtered signals at each antenna are then squared and summed up, as depicted in FIG. 5. Note that such a squaring operation can be performed using square law devices or multipliers with identical inputs. For the purpose of this paper we shall assume that the squaring operation, and also the filtering, mixing and adding operations at the RX can be implemented exactly. Since it is the actual, real received signal which gets squared, the output for the 0-th symbol, after the squaring and summing, can be expressed as:

$$r_{sq}(t) = \sum_{m=1}^{M} \text{Re}\{r_m(t)\}^2 \quad (3.4)$$

$$= \sum_{m=1}^{M} \frac{|r_m(t)|^2}{2} + \frac{r_m(t)^2 + r_m^*(t)^2}{4},$$

where $r_m(t) = [r(t)]_m$ is the complex equivalent received signal at the m-th antenna. Note that both $r_m(t)^2$, $r_m^*(t)^2$ are high pass signals with a carrier frequency of $2f_c$. This summed signal $r_{sq}(t)$ is then low-pass filtered (with a cut-off frequency of $2K/T_s$) to get:

$$r_{LPF}(t) = \frac{\|r(t)\|^2}{2} = \sum_{\ell=0}^{L-1} \frac{M|\alpha_\ell|^2}{2}|s_{BB}(t-\tau_\ell)|^2 + \quad (3.5)$$

-continued $$\frac{\|n(t)\|^2}{2} + \sum_{\ell=0}^{L-1} \text{Re}[\alpha_\ell s_{BB}(t-\tau_\ell)n(t)^\dagger a_\ell e^{-j2\pi f_c \tau_\ell}],$$

where we use the orthogonality assumption for the array response vectors. Finally, $r_{LPF}(t)$ is sampled by an ADC at a sampling rate of $4K/T_s$ samples/sec and conventional OFDM demodulation follows. Note that since $r_{LPF}(t)$ is a real signal with maximum frequency $2K/T_s$, the ADC sampling rate must be at least $4K/T_s$ samples/sec to prevent aliasing. However it can be shown that the signal of interest i.e., the product between the reference and data sub-carriers only lies within the frequency range $K/T_s \leq |f| \leq (2K-g-1)/T_s$. Thus the same performance can also be obtained by replacing the low-pass filter by a band-pass filter with a pass-band of $K/T_s \leq |f| \leq 2K/T_s$, and using an ADC sampling rate of $2K/T_s$ samples/sec.

III. Analysis of the Demodulation Outputs

Inspired by our similar analysis for the UWB FSR RX in (V. V. Ratnam, A. F. Molisch, A. Alasaad, F. Alawwad, and H. Behairy, "Bit and power allocation in QAM capable multi-differential frequency-shifted reference UWB radio," in IEEE Global Communications Conference (GLOBECOM), pp. 1-7. December 2017), the current section analyzes the OFDM demodulation outputs. The OFDM demodulated output for the k-th subcarrier of the 0-th symbol can be expressed as ($-2K \leq k \leq 2K-1$):

$$Y_k = \frac{T_s}{4K}\sum_{u=0}^{4K-1} r_{LPF}\left(\frac{uT_s}{4K}\right)e^{-\frac{j2\pi ku}{4K}}. \quad (3.6)$$

We shall express each demodulation output as $Y_k = S_k + Z_k$ where $S_k$, referred to as the signal component, involves terms in (3.6) not containing the channel noise and $Z_k$, referred to as the noise component, containing the remaining terms. It can be verified from (3.5) and the expression for $s_{BB}(t)$ that only the demodulation outputs $\{Y_k | K \leq |k| \leq (2K-g)\}$ involve signal components. We shall therefore consider a sub-optimal, albeit simple, demodulation approach where only the outputs $\{Y_k | k \in \mathcal{K}\}$ are utilized for demodulating the data, and the noise components are treated as noise.

A. Signal Component Analysis

From (3.5)-(3.6), the signal components of the OFDM demodulated outputs $Y_k$, for $k \in \mathcal{K}$, can be expressed as:

$$S_k = \sum_{u,\ell} \frac{M|\alpha_\ell|^2}{4K}\left|\sqrt{E_r} + \sum_{k_1 \in \mathcal{K}} x_{k_1} e^{j2\pi f_{k_1}\left(\frac{uT_s}{4K}-\tau_\ell\right)}\right|^2 e^{-\frac{j2\pi ku}{4K}} \quad (3.7)$$

$$\stackrel{(1)}{=} M\sqrt{E_r}\left[\sum_{\ell=0}^{L-1}|\alpha_\ell|^2 e^{-j2\pi f_k \tau_\ell}\right]x_k,$$

where $\stackrel{(1)}{=}$ follows from the sub-carrier allocation, which ensures that, despite the non-linear RX architecture, only the cross-product between the reference signal and the data on the k-th sub-carrier contribute to $S_k$, for $k \geq K$. Essentially, the MA-FSR RX utilizes the received vector corresponding to the reference tone as weights to combine the received signal corresponding to the data, thus emulating maximal ratio combining of the contributions from the different antennas with imperfect channel estimates. Since this combining takes place via squaring in the analog domain, the proposed RX enables beamforming without channel estimation or use of phase-shifters. However, as is evident from (3.7), the signals from the L multi-path components do not add up in-phase, at the demodulation outputs. This is due to the fact that the reference signal and the k-th data stream pass through slightly different channels owing to the difference in modulating frequency. This leads to some amount of frequency selective fading, as shall be explained later in Section IV.

B. Noise Component Analysis

From (3.6), the noise component of the OFDM demodulation output $Y_k$, for $k \in \mathcal{K}$, can be expressed as:

$$Z_k = \sum_{u=0}^{4K-1} \frac{T_s e^{\frac{j2\pi ku}{4K}}}{4K} \left[\frac{1}{2}\left\|n\left(\frac{uT_s}{4K}\right)\right\|^2 + \right. \qquad (3.8)$$

$$\left. \sum_{\ell=0}^{i-1} \text{Re}\left[\alpha_\ell s_{BB}\left(\frac{uT_s}{4K}-\tau_\ell\right)n\left(\frac{uT_s}{4K}\right)^\dagger a_\ell e^{-j2\pi f_c \tau_\ell}\right]\right].$$

Note that the noise consists of both: noise-noise cross product and data-noise cross product terms. Given the transmit data vector x and channel impulse response h(t), the conditional mean of the noise components can be computed as:

$$\mathbb{E}\{Z_k|x,h\}=0,$$

where we use the fact that the noise process n(t) is stationary, has a zero mean and $$\sum_{u=0}^{4K-1} e^{-\frac{j2\pi ku}{4K}} = 0 \text{ for } k > 0.$$

Similarly, the conditional second order statistics of the noise components can be computed as (detailed steps are given in Appendix 8):

$$\mathcal{K}_{a,b}(x, h) \triangleq \mathbb{E}\{Z_a Z_b^*\} \approx \qquad (3.9a)$$

$$M\delta_{a,b}\left[(2K-b)N_0^2 + N_0\beta_{0,0}E_r\right] + \sum_{(k_1,k_2)\in\mathcal{A}(a,b)} MN_0\beta_{a,b}x_{k_1}x_{k_2}^*$$

$$\mathcal{K}_{a,b}(x, h) \triangleq \mathbb{E}\{Z_a Z_b\} \approx \sum_{(k_1,k_2)\in\mathcal{B}(a,b)} M\beta_{k_1,k_2}^* x_{k_1}^* x_{k_2} N_0, \qquad (3.9b)$$

where $a,b \geq K$, $\beta_{a,b}(h) \triangleq |\Sigma_\ell|^2 \alpha_\ell$, $e^{-j2\pi(f_a-f_b)\tau_\ell}$ $\mathcal{A}(a,b) \triangleq \{(k_1,k_2)|k_1, k_2 \in \mathcal{K} \, k_1-k_2=a-b, \, k_2 \geq b\}$ and $\mathcal{B}(a,b) \triangleq \{(k_1, k_2)|k_1,k_2 \in \mathcal{K}, \, k_1-k_2=a+b-4K, \, k_2 \geq b\}$. Clearly, from (3.9a)-(3.9b) we see that the noise components at the OFDM outputs are mutually correlated and are further dependent on the data vector x. For reducing computational complexity, we consider the sub-optimal approach where each sub-carrier data is decoded independently. Under this assumption, the noise variances, averaged over the transmit data vector x reduce to:

$$\mathcal{K}_{k,k}(h)=M[(2K-k)N_0^2$$

$$+N_0\oplus_{0,0}(E_r+\Sigma_{k_2=k}^{2K-g-1}E_d^{(k_2)})] \qquad (3.10a)$$

$$\tilde{\mathcal{K}}_{k,k}(h)=0, \qquad (3.10b)$$

where $k \in \mathcal{K}$ and we use the fact that the data streams have a zero mean and are mutually independent (see Section II). We shall henceforth approximate the noise component at each OFDM output $\{Z_k|k \in \mathcal{K}\}$ to be jointly Gaussian distributed. While this allows finding a lower bound to the system capacity, the accuracy of this assumption is also justified via simulations in Section V.

IV. Performance Analysis

Using (3.7) and (3.10), the effective SISO channel between the transmit data and the k-th demodulation output ($k \in \mathcal{K}$) can be expressed as:

$$Y_k=M\sqrt{E_r E_d^{(k)}}\beta_{k,0}(h)\bar{x}_k+Z_k, \qquad (3.11)$$

where $\bar{x}_k \triangleq x_k/\sqrt{E_d^{(k)}}$ and $Z_k \sim \mathcal{CN}(0, \mathcal{K}_{k,k}(h))$. We assume that at regular intervals the TX transmits pilot symbols using which the RX can estimate the "fading coefficients" $\{\beta_{k,0}|k \in \mathcal{K}\}$. Similarly, using blanked pilots i.e., symbols where no signal is transmitted, the RX can also estimate $N_0$. Note that since $\beta_{k,0}$, $N_0$ and $\beta_{0,0}$ are average channel parameters, they change slowly and can be tracked accurately and with low overhead. Henceforth, we shall assume the RX has perfect knowledge of these channel parameters for each channel realization h(t). These values are further assumed to be fed back to the TX, via a feedback channel, for bit and power allocation. Note that since these pilots are used only to estimate the average channel parameters and not the actual SIMO channel, the advantages of simplified channel estimation are still applicable for MA-FSR RX. From the Gaussian assumption for $\{Z_k|k \in \mathcal{K}\}$ and from (3.10), note that (3.11) represents a parallel Gaussian channel across the sub-carriers. The effective SNR for the k-th demodulation output ($k \in \mathcal{K}$) is then given by:

$$\gamma_k(h(t)) = \frac{ME_r E_d^{(k)}|\beta_{k,0}(h)|^2}{(2K-k)N_0^2 + N_0\beta_{0,0}\left(E_r + \sum_{k_2=k}^{2K-g-1} E_d^{(k_2)}\right)}. \qquad (3.12)$$

Note that even though the RX does not explicitly perform channel estimation, we still observe a beamforming gain of M in $\gamma_k(h(t))$. However since the different MPCs do not add up in phase at the RX and the noise power varies with k, the system suffers from frequency selective fading, which causes some loss in performance. Similarly, we define the instantaneous sum rate (iSR) as:

$$iSR(h(t)) \triangleq \sum_{k \in \mathcal{K}} \frac{1}{T_s}\log(1+\gamma_k(h(t))), \qquad (3.13)$$

where we neglect the cyclic prefix overhead for convenience.

A. Power Allocation

Since both the signal and noise variances in (3.11) are affected by the transmit powers in a non-linear way, finding the iSR maximizing power allocation to the data and reference tone is difficult. We shall therefore rely on the following sub-optimal solution.

Lemma 1 For any feasible power allocation $\{E_r, E_d^{(k)}|k \in \mathcal{K}\}$, we have: $\gamma_k(h(t)) \leq 2\tilde{\gamma}_k(h(t))$ for all $k \in \mathcal{K}$, where $\tilde{\gamma}_k(h(t))$ is the effective SNR with:

$$\bar{E}_r = \frac{E_s}{2}, \bar{E}_d^{(k)} = \frac{E_d^{(k)}(E_s-\bar{E}_r)}{E_s-E_r}. \qquad (3.14)$$

Proof Case 1: Let $E_r \geq E_s/2$. Then for any power allocation $\{E_r, E_d^{(k)}|k \in \mathcal{K}\}$ and an $k \in \mathcal{K}$ we have:

$$\frac{\bar{E}_r \bar{E}_d^{(k)}}{E_r} = \frac{E_s^2 E_d^{(k)}}{4E_r(E_s-E_r)} \overset{(1)}{\geq} E_d^{(k)}, \text{ and} \qquad (3.15a)$$

-continued $$\tilde{E}_r + \sum_{k_2=k}^{2K-g-1} \bar{E}_d^{(k_2)} = \bar{E}_r + \frac{\sum_{k_2=k}^{2K-g-1} E_d^{(k_2)}}{E_s - E_r}(E_s - \bar{E}_r) \overset{(2)}{\leq}$$

$$E_r + \sum_{k_2=k}^{2K-g-1} E_d^{(k_2)}, \quad (3.15b)$$

where $\overset{(1)}{\geq}$ follows from the AM-GM inequality, and $\overset{(2)}{\leq}$ follows by noting that $\sum_{k_2=k}^{2K-g-1} E_d^{(k_2)}/(E_s - E_r) \leq 1$, and hence the right hand side is a non-increasing function of $\tilde{E}_r$. From (3.15), it is clear that $\gamma_k(h(t)) \leq \tilde{\gamma}_k(h(t))$.

Case 2: If on the other hand $E_r < E_s/2$, then from (3.12), we can write for any $k \in \mathcal{K}$:

$$2\tilde{\gamma}_k(h(t)) = \frac{ME_r(2\bar{E}_d^{(k)})|\beta_{k,0}(h)|^2}{(2K-k)N_0^2 + N_0\beta_{0,0}\left(\bar{E}_r + \sum_{k_2=k}^{2K-g-1}\bar{E}_d^{(k_2)}\right)} \overset{(3)}{\geq}$$

$$\frac{ME_r E_d^{(k)}|\beta_{k,0}(h)|^2}{(2K-k)N_0^2 + N_0\beta_{0,0}\left(E_r + \sum_{k_2=k}^{2K-g-1}E_d^{(k_2)}\right)} = \gamma_k(h(t)),$$

where $\overset{(3)}{\geq}$ follows from the fact that $\tilde{E}_r > E_r$ and $2\tilde{E}_d^{(k)} > E_d^{(k)} > \tilde{E}_d^{(k)}$ (see (3.14)). Therefore the theorem follows.

As a consequence of Lemma 1, using $E_r = E_s/2$ can at-worst cause a 3 dB loss in the SNR of the data streams. Note that the SNR expression in (3.12) can be approximated as:

$$\hat{\gamma}_k(h(t)) = \frac{ME_r E_d^{(k)}|\beta_{k,0}(h)|^2}{(2K-k)N_0^2 + N_0\beta_{0,0}\left[E_r + \frac{2K-g-k}{K-g}(E_s - E_r)\right]},$$

which is obtained by using by replacing $E_d^{(k)}$ by $(E_s - E_r)/(K-g)$. Now using $\hat{\gamma}_k(h(t))$ instead of $\gamma_k(h(t))$ in W. Bar and F. Dittrich, "Useful formula for moment computation of normal random variables with nonzero means," IEEE Transactions on Automatic Control, vol. 16, pp. 263-265, June 1971. (3.13) with $E_r = E_s/2$ and $\sum_k E_d^{(k)} = E_s/2$, a sub-optimal iSR maximizing power allocation for $\{E_d^{(k)}|k \in \mathcal{K}\}$ can be obtained by the water-filling algorithm. In fact, it can be shown that this allocation is optimal, as $$\frac{\beta_{0,0}(h)E_s}{N_0} \to 0.$$

IV. Simulation Results

For simulations we consider a SIMO system, where the RX has a half-wavelength spaced uniform linear array (M=64) with one down-conversion chain and is equipped with a MA-FSR RX. The TX transmits OFDM symbols with $T_s$=2 μs, $T_{cp}$=0.2 μs, g=5 and $f_c$=30 GHz. The phase noise at the TX is modeled as a Wiener process with $\mathbb{E}\{|\theta(t+T_s) - \theta(t)|^2\} = \pi^2$. We consider a sample channel impulse response h(t) with: L=3, $\tau_\ell$=50|$\ell$−1|ns, $\phi_\ell = (\ell−1)\pi/10$, $\alpha_\ell = \{-1)^{\ell+1} \exp \phi_\ell / \sigma_\phi\}$, $\sigma_\phi = \pi/10$ and $[\alpha_\ell]_i = e^{j\pi(i-1)\sin(\phi_\ell)}$. We also assume perfect timing synchronization, and perfect knowledge of $\{\beta_{k,0}|k \in \mathcal{K}\}$ at the RX. For this h(t), the symbol error rate (SER) for (3.6), obtained by Monte-Carlo simulations, is compared to the analytical SER for the effective channel (3.11) in FIG. 15. The perfect match between the analytical and simulation results validates our analysis and the effective channel model (3.11). Due to the frequency selective signal and noise powers, we also observe that the SER changes with k.

We next compare the analytical iSR of MA-FSR (3.13) to the iSR of a coherent RX with analog beamforming that only occupies half the bandwidth, i.e., $|f| \leq K/T_s$, in FIG. 16. For analog beamforming, we assume the use of statistical beamforming with perfect channel estimates, where the beamformer is $a_1/|a_1|$, assume perfect phase noise cancellation, and do not include the channel estimation overhead.

The results show that for $\beta_{0,0}E_s/N_0 \geq 10$ dB, MA-FSR suffers from an SNR loss of $\leq 9$ dB in comparison to analog beamforming. However at lower values, the SNR loss increases significantly, as is also evident from (3.13). Note that $\beta_{0,0}E_s/N_0 = 10$ dB corresponds to a per sub-carrier SNR of around −10 dB without the RX beamforming gain, and thus, indeed represents a scenario where the RX beamforming gain is essential. Furthermore, we observe that the performance of equal data power allocation is comparable to water-filling. However these results depend on L. Larger values of L intensify the frequency selective fading of MA-FSR, thereby possibly increasing the SNR loss in FIG. 16. Therefore, MA-FSR is more suited to sparse channels with very few MPCs.

VI. Improved MA-FSR Designs

Note that the MA-FSR RX performance degrades significantly below a certain threshold SNR. This is mainly due to the noise enhancement resulting from the squaring operation, which leads to the large noise-noise cross term in (3.8). Since the transmit signal is mainly restricted to frequencies $$|f| \leq \frac{1}{T_s} \text{ and } \frac{K}{T_s} \leq |f - f_c| \leq \frac{2K}{T_s}$$

(ignoring phase noise), the impact of this noise enhancement can be significantly reduced by suppressing the noise at lower frequencies by a factor of $\sqrt{\epsilon}$ using a filter, as illustrated in FIG. 17A. Using a similar analysis as presented here, it can be shown that the effective SNR on the k-th sub-carrier for this design (with no phase noise) is:

$$\gamma_k^A(h(t)) = \frac{ME_r E_d^{(k)}|\beta_{k,0}(h)|^2}{[(2K-k+1)\epsilon+1]N_0^2 + N_0\beta_{0,0}E_{sum}^{(k)}}, \quad (3.16)$$

where $E_{sum}^{(k)} = E_r + E_d^{(k)} + \sum_{k_2=k+1}^{2K-g-1} \epsilon E_d^{(k_2)}$. While this design reduces the noise enhancement of the RX, note that the RX still only has a 50% bandwidth efficiency. This efficiency can be boosted to $\approx 100\%$ by using an alternate design where the squaring circuit is replaced by a multiplier, with one input being the received signal processed via a narrow bandpass filter that isolates only the reference sub-carrier, as illustrated in FIG. 17B. This design, called reference tone aided transmission has been analyzed in detail in (V. V. Ratnam and A. F. Molisch, "Reference tone aided transmission for massive MIMO: Analog beamforming without CSI," in IEEE International Conference on Communications (ICC), pp. 1-7, May 2018). Note that while these designs show significant improvements in performance, implementing such sharp filters at the carrier frequency is difficult and may have to rely on carrier recovery techniques, thus increasing RX complexity.

VII. Conclusion

In this work a novel non-coherent massive antenna RX is proposed, that only requires a single down-conversion chain, can support high data-rates and can perform RX beamforming without phase shifters or channel estimation. The MA-FSR RX essentially uses the received signal for a reference tone to combine the received signal corresponding to the data, via a squaring operation at each antenna. The carefully designed sub-carrier allocation prevents inter-carrier interference. The analysis suggests that the effective channel between the sub-carrier inputs and the demodulated outputs behaves like a parallel Gaussian channel with frequency selective fading, where the frequency selectivity arises due to modulating frequency mismatch between the reference and data sub-carriers and due to the varying noise levels. These varying noise levels arise due to the noise enhancement experienced by the squaring operation at the RX. The simulation results show that MA-FSR suffers only ≈6 dB SNR loss in comparison to analog beamforming in sparse channels, as long as the mean received power is above a certain threshold. This threshold behavior is due to the noise enhancement due to the squaring operation, and several improved FSR designs that can reduce its impact are also proposed,

APPENDIX 3.A

From (3.8), the conditional cross-covariance between the noise components at the a-th and b-th sub-carriers can further be computed as:

$$\mathcal{K}_{a,b}(x, h) \stackrel{(1)}{=}$$

$$\sum_{u,v=0}^{4K-1} \frac{T_s^2 e^{-\frac{j2\pi(au-bv)}{4K}}}{16K^2} \mathbb{E}\left\{ \frac{1}{4} \left\| n\left(\frac{uT_s}{4K}\right) \right\|^2 \left\| n\left(\frac{vT_s}{4K}\right) \right\|^2 + \right.$$

$$\sum_{\ell_1,\ell_2=0}^{L-1} \text{Re}\left[ \alpha_{\ell_1} s_{BB}\left(\frac{uT_s}{4K} - \tau_{\ell_1}\right) n\left(\frac{uT_s}{4K}\right)^\dagger a_{\ell_1} e^{-j2\pi f_c \tau_{\ell_1}} \right] \times$$

$$\text{Re}\left[ \alpha_{\ell_2} s_{BB}\left(\frac{vT_s}{4K} - \tau_{\ell_2}\right) n\left(\frac{vT_s}{4K}\right)^\dagger a_{\ell_2} e^{-j2\pi f_c \tau_{\ell_2}} \right] \right\} \stackrel{(2)}{=}$$

$$\sum_{u,v=0}^{4K-1} \frac{T_s^2 e^{-\frac{j2\pi(au-bv)}{4K}}}{16K^2} \mathbb{E}\left\{ \frac{1}{4} \left\| n\left(\frac{uT_s}{4K}\right) \right\|^2 \left\| n\left(\frac{vT_s}{4K}\right) \right\|^2 + \right.$$

$$\sum_{\ell_1,\ell_2=0}^{L-1} \frac{1}{2} \text{Re}\left[ \alpha_{\ell_1} \alpha_{\ell_2}^* s_{BB}\left(\frac{uT_s}{4K} - \tau_{\ell_1}\right) s_{BB}^*\left(\frac{vT_s}{4K} - \tau_{\ell_2}\right) \times \right.$$

$$\left. a_{\ell_2}^\dagger n\left(\frac{vT_s}{4K}\right) n\left(\frac{uT_s}{4K}\right)^\dagger a_{\ell_1} e^{-j2\pi f_c(\tau_{\ell_1} - \tau_{\ell_2})} \right] \right\} \stackrel{(3)}{=}$$

$$\sum_{u,v=0}^{4K-1} \frac{T_s^2 e^{-\frac{j2\pi(au-bv)}{4K}}}{16K^2} \left[ \frac{1}{4}(M^2 R_n[0]^2 + M |R_n[v-u]|^2) + \right.$$

$$\sum_{\ell_1=1}^{L-1} \frac{1}{2} \text{Re}\left[ |\alpha_{\ell_1}|^2 s_{BB}\left(\frac{uT_s}{4K} - \tau_{\ell_1}\right) s_{BB}^*\left(\frac{vT_s}{4K} - \tau_{\ell_1}\right) \times \right.$$

$$\left. M R_n[v-u] \right] \right],$$

where $\stackrel{(1)}{=}$ follows from the fact that n(t) is zero-mean Gaussian and therefore the odd moments of n(t) are zero; $\stackrel{(2)}{=}$ follows by using the identity Re{A}Re{B}=½Re{AB*+AB} for any scalars A, B, and by ignoring the terms involving pseudo-covariance of the circularly symmetric Gaussian noise and $\stackrel{(3)}{=}$ follows by defining $$R_n[u] \triangleq \mathbb{E}\left\{ [n(t)]_i \left[ n\left(t + \frac{uT_s}{4K}\right) \right]_i \right\}$$

for any 1≤i≤M, using the results on expectation of a product of four Gaussian random variables [15], and from the orthogonality of the array response vectors. Defining a new variable w=v−u and using change of variables, we can approximate $\mathcal{K}_{a,b}(x, h)$ as:

$$\mathcal{K}_{a,b}(x, h) \stackrel{(4)}{\approx} \sum_{u=0}^{4K-1} \sum_{w=-u}^{4K-u-1} \frac{MT_s^2 e^{-\frac{j2\pi((a-b)u-bw)}{4K}}}{16K^2} \left[ \frac{|R_n[w]|^2}{4} + \right.$$

$$\sum_{\ell_1=0}^{L-1} \frac{|\alpha_{\ell_1}|^2}{T_s} \text{Re}\left\{ \left( E_r + \sum_{k_1 \in \mathcal{K}} \sqrt{E_r} x_{k_1} e^{\frac{j2\pi uk_1}{4K}} e^{-\frac{j2\pi k_1 \tau_{\ell_1}}{T_s}} + \right. \right.$$

$$\sum_{k_1 \in \mathcal{K}} \sum_{k_2 \in \mathcal{K}} x_{k_1} x_{k_2}^* e^{\frac{j2\pi[(k_1-k_2)u-wk_2]}{4K}} e^{-\frac{j2\pi(k_1-k_2)\tau_{\ell_1}}{T_s}} +$$

$$\left. \left. \sum_{k_2 \in \mathcal{K}} \sqrt{E_r} x_{k_2}^* e^{-\frac{j2\pi(w+u)k_2}{4K}} e^{\frac{j2\pi k_2 \tau_{\ell_1}}{T_s}} \right) R_n[w] \right\} \right] \stackrel{(5)}{\approx}$$

$$\sum_{u=0}^{4K-1} \sum_{w=-\infty}^{\infty} \frac{MT_s^2 e^{-\frac{j2\pi((a-b)u-bw)}{4K}}}{16K^2} \left[ \frac{1}{4} |R_n[w]|^2 + \right.$$

$$\frac{1}{T_s} \text{Re}\left\{ \left( \beta_{0,0} E_r + \sum_{k_1 \in \mathcal{K}} \beta_{k_1,0} \sqrt{E_r} x_{k_1} e^{\frac{j2\pi uk_1}{4K}} + \right. \right.$$

$$\sum_{k_1 \in \mathcal{K}} \sum_{k_2 \in \mathcal{K}} x_{k_1} x_{k_2}^* e^{\frac{j2\pi[u(k_1-k_2)-wk_2]}{4K}} \right) \beta_{k_1,k_2} +$$

$$\left. \left. \sum_{k_2 \in \mathcal{K}} \beta_{0,k_2} \sqrt{E_r} x_{k_2}^* e^{-\frac{j2\pi(w+u)k_2}{4K}} \right) R_n[w] \right\} \right],$$

where $\stackrel{(4)}{\approx}$ follows by assuming that the phase noise $e^{j\Theta(t)}$ is constant within the support of the noise auto-correlation function $R_n[w]$ and $\stackrel{(5)}{\approx}$ follows by changing the summation limits since $R_n[w]$ has a very narrow support of around O(1) and by defining $\beta_{a,b} \triangleq \sum_{\ell=0}^{L-1} |\alpha_\ell|^2 e^{-j2\pi(f_a-f_b)\tau_\ell}$. Note that $\stackrel{(4)}{\approx}$ is accurate as long as the system bandwidth is much larger than the phase noise bandwidth [16]. Now taking a summation over u, we obtain:

$$\mathcal{K}_{a,b}(x, h) = \sum_{w=-\infty}^{\infty} \frac{MT_s e^{\frac{j2\pi bw}{4K}}}{8K} \left[ \frac{T_s}{2} \delta_{a,b} |R_n[w]|^2 + \right.$$

$$\left( \beta_{0,0} \delta_{a,b} E_r + \sum_{(k_1,k_2) \in \mathcal{A}(a,b)} \beta_{k_1,k_2} x_{k_1} x_{k_2}^* e^{-\frac{j2\pi wk_2}{4K}} \right) R_n[w] +$$

$$\left. \left( \delta_{a,b} \beta_{0,0} E_r + \sum_{(k_2,k_1) \in \mathcal{A}(a,b)} \beta_{k_1,k_2}^* x_{k_1}^* x_{k_2} e^{\frac{j2\pi wk_2}{4K}} \right) R_n[w]^* \right],$$

where we define $\mathcal{A}(a, b) \triangleq \{(k_1,k_2) | k_1, k_2 \in \mathcal{K}, k_1-k_2=a-b\}$ and the remaining terms vanish since $|a-b| \leq K-1 < k_1$, $k_2 \leq 2K-g-1$. Note that the sampled noise auto-correlation function can be expressed in terms of the power spectral density as:

$$R_n[w] = \int_{-\infty}^{\infty} S_n(f) e^{\frac{j2\pi fwT_s}{4K}} df.$$

Thus, substituting $R_n[w]$ we have:

$$\mathcal{K}_{a,b}(x, h) \stackrel{(6)}{=} \frac{M}{2} \left[ \frac{T_s}{2} \delta_{a,b} \int_{-\infty}^{\infty} S_n(f_1) S_n^*\left(f_1 + \frac{b}{T_s}\right) df_1 + \right. \quad (3.17)$$

$$\delta_{a,b} \beta_{0,0} E_r S_n\left(\frac{-b}{T_s}\right) + \sum_{(k_1,k_2) \in \mathcal{A}(a,b)} \beta_{k_1,k_2} x_{k_1} x_{k_2}^* S_n\left(\frac{k_2-b}{T_s}\right) +$$

-continued $$\delta_{a,b}\beta_{0,0}E_r S_n\left(\frac{b}{T_s}\right)+$$

$$\Sigma_{(k_2,k_1)\in\mathcal{A}(a,b)}\beta^*_{k_1,k_2}x^*_{k_1}x_{k_2}S_n\left(\frac{k_2+b}{T_s}\right)\Big]=$$

$$M\delta_{a,b}(2K-b)N_0^2+M\delta_{a,b}N_0\beta_{0,0}E_r+$$

$$\Sigma_{(k_1,k_2)\in\mathcal{A}(a,b)}MN_0\beta_{a,b}x_{k_1}x^*_{k_2},$$

where $\stackrel{(6)}{=}$ follows from the identity:

$$\Sigma_{w=-\infty}^{\infty}e^{-j2\pi fwT}=\frac{1}{T}\Sigma_{g=-\infty}^{\infty}\delta(f-g/T)$$

and using the fact that $S_n(f)$ is non-zero only in the range $0 \leq f \leq 2K/T_s$ and we define $\mathcal{A}(a, b) \triangleq \{(k_1, k_2) \in \mathcal{A}(a, b) | k_2 \geq b\}$. Using a similar sequence of steps the noise pseudo-covariance can be computed as:

$$\tilde{\mathcal{K}}_{a,b}(x,h)=\Sigma_{(k_2,k_1)\in\tilde{\mathcal{B}}(a,b)}M\beta_{k_1,k_2}*x_{k_1}*x_{k_2}N_0, \quad (3.18)$$

where we define $\tilde{\mathcal{B}}(a,b) \triangleq \{(k_1, k_2) | k_1, k_2 \in \mathcal{K}, k_1-k_2=a+b-4K, k_2 \geq b\}$.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A MIMO system that applies continuous analog channel estimation, the MIMO system comprising:
   a transmitter (TX) that transmits a transmitted signal that includes a data signal combined with a predetermined reference signal; and
   a receiver (RX) including:
      a plurality of antennas wherein each antenna receives the transmitted signal and outputs an associated received signal;
      a baseband conversion processor that either includes an independent oscillator or recovers the predetermined reference signal including either or both of signal amplitude and phase, each associated received signal being multiplied with an independent oscillator signal or a recovered reference signal and with its quadrature component in the analog domain, resulting in processor output signals that are low-pass signals with at least partially compensated inter-antenna phase shift;
      an amplitude and phase compensation processor that adjusts outputs from the baseband conversion processor via analog phase shifters;
      an analog adder that receives output signals from the amplitude and phase compensation processor, the output signals including an in-phase-derived control signal and a quadrature output signal for each antenna in the plurality of antennas, the analog adder configured to emulate signal combining and beamforming by performing a weighted sum of the output signals from the amplitude and phase compensation processor to form a summed signal output, the analog adder including a first component configured to sum in-phase-derived output signals and a second part configured to sum quadrature output signals, wherein the summed signal output includes a real component $Re(\omega_{LPF}(t))$ and an imaginary component $Im(\omega_{LPF}(t))$; and
      an analog to digital converter that samples the real component $Re(\omega_{LPF}(t))$ and imaginary component $Im(\omega_{LPF}(t))$ of the summed signal output.

2. The MIMO system of claim 1 wherein the amplitude and phase compensation processor applies a baseband reference signal in the outputs from the baseband conversion processor as control signals to the analog phase shifters to further compensate for inter-antenna phase-shifts in the outputs from the baseband conversion processor.

3. The MIMO system of claim 1 wherein the transmitter transmits the transmitted signal by orthogonal frequency division multiplexing (OFDM).

4. The MIMO system of claim 1 wherein the analog adder applies a weight sum when summing the processor output signals.

5. The MIMO system of claim 1 wherein the baseband conversion processor includes a local oscillator instead of a signal recovery circuit.

6. The MIMO system of claim 1 wherein the baseband conversion processor includes:
   at least one reference signal recovery circuit;
   a plurality of first mixers with each antenna having an associated first mixer; and
   a plurality of second mixers with each antenna having a second mixer.

7. The MIMO system of claim 6 wherein each antenna has an associated signal recovery circuit.

8. The MIMO system of claim 6 wherein the reference signal recovery circuit includes a secondary phase locked loop array that receives signals-from a subset of the plurality of antennas and wherein outputs from each secondary phase locked loop are summed and fed as control signals to a primary phase locked loop.

9. The MIMO system of claim 8 wherein the outputs from each phase locked loop are summed as a weighted sum.

10. The MIMO system of claim 6 wherein:
    an associated reference signal recovery circuit of each antenna isolates and recovers the predetermined reference signal as an associated isolated reference signal from the associated received signal;
    the associated first mixer of each antenna multiplies the associated isolated reference signal with the associated received signal to produce an associated in-phase-derived output signal; and
    an associated second mixer of each antenna multiplies the quadrature component of the associated isolated reference signal with the associated received signal to produce a quadrature-derived output signal such that the associated in-phase-derived output signal and the quadrature-derived output signal are the processor output signals.

11. The MIMO system of claim 10 further comprising a plurality of low noise amplifiers positioned between each antenna and the baseband conversion processor.

12. The MIMO system of claim 10 wherein each associated reference signal recovery circuit includes an injection locked oscillator, a phase locked loop, or a bandpass filter.

13. The MIMO system of claim 10 wherein sufficient frequency separation may be provided between the predetermined reference signal and the data signal to enable each reference recovery circuit.

14. The MIMO system of claim 10 wherein a plurality of filters extract a baseband signal and filter out noise from the associated in-phase-derived output signal outputted by the plurality of first mixers and a second plurality of low pass filters extract associated quadrature-derived signals outputted by the plurality of second mixers.

15. The MIMO system of claim 14 further comprising a low pass filter and/or down converter that receives the summed signal output and outputs an analog baseband signal.

16. The MIMO system of claim 10 wherein a sparse nature of wireless channels is exploited to ensure a large beamforming gain after the summed signal output.

17. The MIMO system of claim 12 that can perform receive beamforming without digital channel estimation.

18. The MIMO system of claim 12 further comprising an analog to digital converter that converts an analog baseband signal to digital baseband signal and a demodulator that demodulates the digital baseband signal.

19. The MIMO system of claim 1 comprising the amplitude and phase compensation processor which includes associated phase shifters, each phase shifter receiving in-phase-derived control signal and a quadrature-derived control signal such that outputs from the baseband conversion processor are phase adjusted.

20. The MIMO system of claim 19, wherein the amplitude and phase compensation processor includes lowpass filters that filter in-phase and quadrature output signals from the baseband conversion processor to generate the in-phase-derived control signal and the quadrature-derived control signal to be used for the associated phase shifters, the baseband conversion processor including:
 at least one reference signal recovery circuit;
 a plurality of first mixers with each antenna having an associated first mixer; and
 a plurality of second mixers with each antenna having a second mixer.

21. The MIMO system of claim 1 wherein the baseband conversion processor recovers the predetermined reference signal.

22. The MIMO system of claim 1 wherein signal combining and beamforming is emulated without the receiver applying explicit channel estimation.

23. A MIMO system that applies continuous analog channel estimation, the MIMO system comprising:
 a transmitter (TX) that transmits a transmitted signal that includes a data signal combined with a predetermined reference signal; and
 a receiver (RX) including:
  at least three antennas wherein each antenna receives the transmitted signal and outputs an associated received signal;
  a baseband conversion processor that either includes an independent oscillator or recovers the predetermined reference signal including either or both of signal amplitude and phase, each associated received signal being multiplied with an independent oscillator signal or a recovered reference signal and with its quadrature component in the analog domain, resulting in processor output signals that are low-pass signals with at least partially compensated inter-antenna phase shift; and
  an analog adder configured to emulate signal combining and beamforming by performing a weighted sum of output signals from the baseband conversion processor to form a summed signal output, the output signals including an in-phase-derived output signal for each antenna and the summed signal output having a real component $Re(\omega_{LPF}(t))$ and imaginary component $Im(\omega_{LPF}(t)$; and
  an analog to digital converter that samples the summed signal output.

24. The MIMO system of claim 23 wherein the transmitter transmits the transmitted signal by orthogonal frequency division multiplexing (OFDM).

25. The MIMO system of claim 23 wherein the analog adder applies a weighted sum when summing the processor output signals.

26. The MIMO system of claim 23 wherein the baseband conversion processor includes a local oscillator instead of a signal recovery circuit.

27. The MIMO system of claim 23 wherein the baseband conversion processor includes:
 at least one reference signal recovery circuit;
 a plurality of first mixers with each antenna having an associated first mixer; and
 a plurality of second mixers with each antenna having a second mixer.

28. The MIMO system of claim 27 wherein each antenna has an associated signal recovery circuit.

29. The MIMO system of claim 27 wherein the reference signal recovery circuit includes a secondary phase locked loop array that receives signals from a subset of the at least three antennas and wherein outputs from each secondary phase locked loop are summed and fed as control signals to a primary phase locked loop.

30. The MIMO system of claim 29 wherein the outputs from each phase locked loop are summed as a weighted sum.

31. The MIMO system of claim 26 wherein:
 an associated reference signal recovery circuit of each antenna isolates and recovers the predetermined reference signal as an associated isolated reference signal from the associated received signal;
 an associated first mixer of each antenna multiplies the associated isolated reference signal with the associated received signal to produce an associated in-phase-derived output signal; and
 an associated second mixer of each antenna multiplies the quadrature component of the associated isolated reference signal with the associated received signal to produce a quadrature-derived output signal such that the associated in-phase-derived output signal and the quadrature-derived output signal are the processor output signals.

32. The MIMO system of claim 31 further comprising a plurality of low noise amplifiers positioned between each antenna and the baseband conversion processor.

33. The MIMO system of claim 31 wherein each associated reference signal recovery circuit includes an injection locked oscillator, a phase locked loop, or a bandpass filter.

34. The MIMO system of claim 31 wherein sufficient frequency separation may be provided between the predetermined reference signal and the data signal to enable each reference recovery circuit.

35. The MIMO system of claim 32 wherein a plurality of filters extract a baseband signal and filter out noise from the associated in-phase-derived output signal outputted by a plurality of first mixers and a second plurality of low pass filters extract associated quadrature-derived signals outputted by a plurality of second mixers.

36. The MIMO system of claim 35 further comprising a low pass filter and/or down converter that receives the summed signal output and outputs an analog baseband signal.

37. The MIMO system of claim 31 wherein a sparse nature of wireless channels is exploited to ensure a large beamforming gain after the summed signal output.

38. The MIMO system of claim 33 that can perform receive beamforming without digital channel estimation.

39. The MIMO system of claim 33 further comprising an analog to digital converter that converts an analog baseband signal to digital baseband signal and a demodulator that demodulates the digital baseband signal.

40. The MIMO system of claim 23 wherein signal combining and beamforming is emulated without the receiver applying explicit channel estimation.

41. A MIMO system that applies continuous analog channel estimation, the MIMO system comprising:
- a transmitter (TX) that transmits a transmitted signal that includes a data signal combined with a predetermined reference signal; and
- a receiver (RX) including:
  - a plurality of antennas wherein each antenna receives the transmitted signal and outputs an associated received signal and wherein each antenna has an associated signal recovery circuit;
  - a baseband conversion processor that either includes an independent oscillator or recovers the predetermined reference signal including either or both of signal amplitude and phase, each associated received signal being multiplied with an independent oscillator signal or a recovered reference signal and with its quadrature component in the analog domain, resulting in processor output signals that are low-pass signals with at least partially compensated inter-antenna phase shift, the baseband conversion processor further including at least one reference signal recovery circuit, a plurality of first mixers with each antenna having an associated first mixer, and a plurality of second mixers with each antenna having a second mixer, wherein the reference signal recovery circuit includes a secondary phase locked loop array that receives signals-from a subset of the plurality of antennas and wherein outputs from each secondary phase locked loop are summed and fed as control signals to a primary phase locked loop;
  - an amplitude and phase compensation processor that adjusts outputs from the baseband conversion processor via analog phase shifters;
  - an analog adder that receives and sums output signals from the amplitude and phase compensation processor as a summed signal output thereby emulating signal combining and beamforming, the output signals including an in-phase-derived output signal for each antenna in the plurality of antennas, the summed signal output having a real component $Re(\omega_{LPF}(t))$ and imaginary component $Im(\omega_{LPF}(t)$; and
  - an analog to digital converter that samples a real component $Re(\omega_{LPF}(t))$ and imaginary component $Im(\omega_{LPF}(t)$ of the summed signal output.

* * * * *